(12) United States Patent
De La Rosa

(10) Patent No.: US 10,916,156 B2
(45) Date of Patent: Feb. 9, 2021

(54) MULTISENSORY APPARATUS FOR FACILITATING THE LEARNING OF HANDWRITING

(71) Applicant: Raquel B. De La Rosa, Pasadena, TX (US)

(72) Inventor: Raquel B. De La Rosa, Pasadena, TX (US)

( * ) Notice: Subject to any disclaimer, the term of this patent is extended or adjusted under 35 U.S.C. 154(b) by 374 days.

(21) Appl. No.: 15/901,735

(22) Filed: Feb. 21, 2018

(65) Prior Publication Data

US 2019/0259296 A1 Aug. 22, 2019

(51) Int. Cl.
  *G09B 11/04* (2006.01)
  *G09B 5/06* (2006.01)
  *G09B 19/06* (2006.01)

(52) U.S. Cl.
  CPC ............... *G09B 11/04* (2013.01); *G09B 5/06* (2013.01); *G09B 19/06* (2013.01)

(58) Field of Classification Search
  None
  See application file for complete search history.

(56) References Cited

U.S. PATENT DOCUMENTS

2005/0069205 A1* 3/2005 Khomo .................... G09B 7/02
                                                                         382/187
2005/0266386 A1* 12/2005 Marggraff ............... G09B 19/12
                                                                         434/317

(Continued)

*Primary Examiner* — Nathan Hillery
(74) *Attorney, Agent, or Firm* — Jeffrey Streets; Leela Madan

(57) ABSTRACT

Handwriting learning apparatuses and associated methods that facilitate the ability of a user to learn how to correctly and/or preferably form at least one character are disclosed. In an aspect, handwriting learning apparatuses and associated methods of use are disclosed that comprise at least one substantially flat at least partially rigid medium within which one or more segments of one or more characters may be defined by one or more grooves. At least one protruding element may extend outwardly from at least one portion of at least one inner surface of the grooved character(s) at an angle such that when the user attempts to use an elongated insertion device to trace the grooved character segment(s), the insertion device may only slide in one single direction. This may help prevent users, such as children and other students, from forming characters incorrectly (e.g., writing them backwards) when they practice handwriting in an at least partially unsupervised setting, thereby minimizing the potential for bad writing habits to go unnoticed when handwritten characters may otherwise appear to have been formed correctly. Additionally, the at least one protruding element may be at least partially flexible so that, when the insertion device makes at least partial physical contact with at least one portion of the at least one protruding element, the at least one portion of the at least one protruding element may be temporarily displaced, thereby producing one or more sounds and/or vibrations that may be heard and/or felt by the user, respectively, thereby creating a multisensory learning experience for the user that may increase the user's ability to learn and retain one or more correct and/or preferred character formation techniques.

20 Claims, 12 Drawing Sheets

(56) References Cited

U.S. PATENT DOCUMENTS

| | | | |
|---|---|---|---|
| 2008/0131852 A1* | 6/2008 | Van Hofwegen | G09B 11/04 434/165 |
| 2008/0241802 A1* | 10/2008 | Hachey | G09B 11/04 434/90 |
| 2009/0253107 A1* | 10/2009 | Marggraff | G06F 3/0317 434/162 |
| 2015/0099247 A1* | 4/2015 | Bryant | G09B 23/28 434/157 |
| 2015/0302757 A1* | 10/2015 | Bansal | G09B 5/02 434/164 |
| 2015/0336421 A1* | 11/2015 | Neubauer | G09B 11/00 434/159 |
| 2017/0330479 A1* | 11/2017 | Bowman | G09B 5/125 |
| 2019/0206275 A1* | 7/2019 | Sust | G09B 5/02 |
| 2020/0219415 A1* | 7/2020 | Johnson | G09B 21/02 |

\* cited by examiner

MULTISENSORY APPARATUS FOR FACILITATING THE LEARNING OF HANDWRITING

FIELD OF THE DISCLOSURE

The present disclosure generally relates to learning apparatuses and more particularly to learning apparatuses configured to teach one or more correct and/or preferred handwriting techniques to at least one individual or user via a multisensory experience.

BACKGROUND

The statements in this section merely provide background information related to the present disclosure and may not constitute prior art.

Writing is one of humanity's oldest forms of communication. Even in modern society, writing is an essential communication tool as is evidenced by the thousands of emails, texts, instant messages, and social media posts that get transmitted daily. Although many forms of modern written communication are typed, handwritten communication also occurs regularly as individuals fill out paper work, send notes, make lists, and perform similar tasks.

In order to engage in effective handwritten communication, the handwriting must be legible and understandable to others. Schools and parents start teaching the skill of handwriting to children at a relatively young age, with an early focus being on correct and/or preferred letter/character formation. Learning how to write letters/characters properly enables children to eventually write words and/or numbers in a clear and timely fashion.

While many methods and tools currently exist that facilitate the teaching of handwriting, they generally require a teacher or supervisor to continuously monitor individuals as they are practicing letter/character formation in order to ensure correct and/or preferred techniques are being utilized, which can be rather difficult and/or time consuming. Such monitoring becomes almost impossible when large numbers of individuals are being taught simultaneously. This issue is compounded by the fact that even though a completed letter/character may appear correct to a teacher or supervisor, the technique that was used to write the letter/character cannot be judged retroactively if it was not witnessed firsthand. In this way, poor handwriting habits may go unnoticed and uncorrected for substantial periods of time, and these poor habits can be detrimental to an individual's overall handwriting proficiency.

Currently available handwriting teaching methods and tools are also not as effective at helping individuals retain cognition of correct and/or preferred handwriting techniques than they could be. That is, most current handwriting teaching methods and tools are solely based on visual aspects, wherein an individual observes examples of how to correctly and/or preferably form various letters/characters and/or sees examples of correctly and/or preferably completed letters/characters and then tries to mimic/recreate those examples either by free-hand practice or by unrestricted tracing. Though some individuals may get some benefit from these methods/tools, it is believed that engaging multiple senses in the learning of a new skill increases the cognitive ability of an individual to master the skill in a timely fashion and to retain such mastery. Additionally, not everyone is a visual learner, so learning a skill such as handwriting almost exclusively via visual means may be very difficult for some students.

Given the foregoing, handwriting learning apparatuses are needed that facilitate the learning of correct and/or preferred character formation by at least one individual or user with minimal supervision. Handwriting learning apparatuses that enable one or more individuals or users to learn correct and/or preferred character formation in a multisensory fashion are also desired.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure meet the above-identified needs by providing handwriting learning apparatuses that facilitate the ability of one or more individuals or users to learn the correct and/or preferred manner of forming of at least one handwritten character in a multisensory fashion with minimal supervision. Specifically, in an aspect, handwriting learning apparatuses are disclosed that comprise at least one groove within a substantially flat, at least partially rigid medium, wherein the at least one groove is in the shape of at least one character for which formation is to be learned. An inner surface portion of the at least one groove may comprise at least one protruding element. In some aspects, the at least one groove may comprise a plurality of such protruding elements. The protruding element(s) may be configured such that an insertion device that may be received by the groove(s) may be configured to interact with at least one portion of each protruding element in a way that allows the insertion device to move in only one direction within the groove(s), thereby forcing an individual to use the insertion device to trace a grooved character in the correct/preferred manner (e.g., by tracing it in the correct/preferred direction and/or by tracing portions or segments of the grooved character(s) in the correct/preferred order). The protruding element(s) may also comprise an at least partially flexible, yet durable configuration so that at least one portion of them may be temporarily displaced as the insertion device is slid through the space occupied by the at least one portion of each of the protruding element(s) within the groove(s).

When tracing a grooved character with an insertion device, an individual may hear the sound (e.g., a clicking sound) of a distal end of the insertion device interacting with (e.g., temporarily displacing) at least one portion of each of the protruding element(s) as it passes through the region occupied by the at least one portion of each of the protruding element(s). Additionally, the individual may feel various vibrational sensations as the distal end of the insertion device passes along and interacts with (e.g., temporarily displaces) at least one portion of each of the protruding element(s), particularly as it displaces and then releases the at least one portion of each protruding element. Thus, in addition to visually seeing the character(s) being traced, an individual using the handwriting learning apparatuses of the present disclosure may also hear and feel the tracing of the character(s), thereby engaging in a multisensory learning experience and improving overall cognition with regard to learning the skill of handwriting as it pertains to those character(s).

In some aspects, an insertion device used with the handwriting learning apparatuses of the present disclosure may comprise a substantially rigid elongated member. In some additional aspects, the insertion device may comprise an elongated cylindrical member. In still some additional aspects, a distal end of the insertion device may be tapered, similar to a pen, pencil, stylus, or other writing instrument. In yet some additional aspects, a distal end of the insertion device may comprise one or more prongs, gears, detents, and/or similar structures configured to interact with at least one portion of each of the protruding element(s) within the grooved character(s) to be traced. In still some further additional aspects, the insertion device may be connected to a portion of a given handwriting learning apparatus via an at least partially flexible elongated member (e.g., a piece of plastic, wire, string, rope, yarn, or cable).

In some aspects, handwriting learning apparatuses in accordance with the present disclosure may comprise multiple characters arranged in the form of various words, numbers, sounds, and even sentences to be traced. For example, handwriting learning apparatuses in accordance with the present disclosure may comprise one or more characters arranged in the form of one or more Dolch sight words, which may include commonly used words that children may be instructed to memorize as a whole by sight, so that they can automatically recognize these words in print without having to use any strategies in order to decode them. Many individuals believe that these words must be easily recognized in order to achieve sufficient reading fluency in the English language. These words may include "a," "and," "away," "in," and the like. In some additional aspects, handwriting learning apparatuses in accordance with the present disclosure may comprise one or more characters arranged in one or more combinations to represent one or more sounds (e.g., digraphs) such as, for example, "th," "ch," and "gh." In still some additional aspects, handwriting learning apparatuses in accordance with the present disclosure may include multiple characters arranged in any order. In such aspects, a given handwriting learning apparatus may be moved such that consecutively traced characters may form one or more words, numbers, sounds (e.g., digraphs), and/or sentences.

In some aspects, at least one portion of the medium that houses the at least one grooved character may be securely or removably contained within at least one casing component. The casing component may comprise a substantially planar, at least partially rigid configuration and may comprise a size similar to the at least one medium. The casing component may serve to provide a relatively hard surface upon which a distal end of the insertion device may physically contact and interface with as the distal end of the insertion device is received by and slides within the at least one grooved character. In some additional aspects, the casing component may also provide a receiving mechanism (e.g., a slot, notch, clamp, tube, holster, etc.) for the insertion device when it is not in use.

In some aspects, a second at least one medium comprising at least one grooved character may be used in conjunction with the at least one medium. The second at least one medium may be substantially similar to the at least one medium in size and configuration, with a difference being that the grooved characters of the second at least one medium may not include any protruding elements. The second at least one medium may be placed over the at least one medium, either permanently or removably, so that the grooved characters of the at least one medium substantially align with the grooved characters of the second at least one medium. This may give the combined aligned grooved characters more depth, thereby making it easier for an individual to keep the insertion device (or a portion thereof) within the grooved character(s) being traced.

In some aspects, handwriting learning apparatuses in accordance with the present disclosure may be used in conjunction with one or more supplementary devices, such as dry-erase boards, chalkboards, interactive whiteboards (such as, for example and not limitation, a SMART Board® available from the Smart Technologies Corporation of Calgary, Alberta, Canada), interactive touchscreen monitors, tablet computer surfaces or devices, pieces of paper, and smartphones. In such aspects, the at least one medium of the handwriting learning apparatuses may be placed over and thus be removably received by a top surface portion of the supplementary device(s) so that a user may "mark" (either physically or digitally) the top surface portion of the supplementary device(s) while tracing one or more grooved characters. In order to make the appropriate marks, whenever a supplementary device(s) is used, the insertion device may comprise a device that is configured to appropriately mark the given supplementary device(s) (e.g., a dry-erase marker may be used with a dry-erase board, a digital stylus may be used with a tablet computer, etc.) so that the user may view the completed character(s) (or word(s), number(s), or sentence(s)) once tracing is completed.

In some aspects, handwriting learning apparatuses in accordance with the present disclosure may further comprise at least one indicator device, such as a lighting element, audio emitting device, and/or sensory device. The indicator device(s) may serve to indicate to a user whether a character has been traced correctly by presenting the user with one or more visual outputs, audio outputs, and/or tactile outputs. For example, at the start of, during, and/or upon completion of the tracing of at least one character, at least one green or red lighting element may illuminate, one or more audio emitting devices may produce various chimes, rings, and/or motivational and/or instructional phrases, and/or one or more sensory devices may produce various vibrational and/or pulsating effects in order to signify whether a character has been traced correctly and/or to communicate to a user what to do. In some additional aspects, handwriting learning apparatuses in accordance with the present disclosure may further comprise at least one sensing device communicatively coupled to the indicator device(s) and configured to detect pressure (e.g., pressure applied by a user via an insertion device), at least one physical presence (e.g., the physical presence of at least one portion of an insertion device), friction (e.g., friction between an insertion device and one or more protruding elements within at least one portion of at least one grooved character and/or friction between an insertion device and one or more portions of at least one inner surface of at least one grooved character), and/or movement (e.g., the movement of at least one portion of an insertion device within at least one portion of at least one grooved character to be traced and/or movement of at least one portion of each of the protruding element(s) associated therewith. In still some additional aspects, the at least one sensing device and/or the at least one indicator device may be controlled by computational instructions, or code, in the form of software or one or more software applications that, when executed on at least one computer processor, causes the at least one computer processor to perform certain steps or processes (e.g., controlling the output of the at least one insertion device).

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

Figure 1:
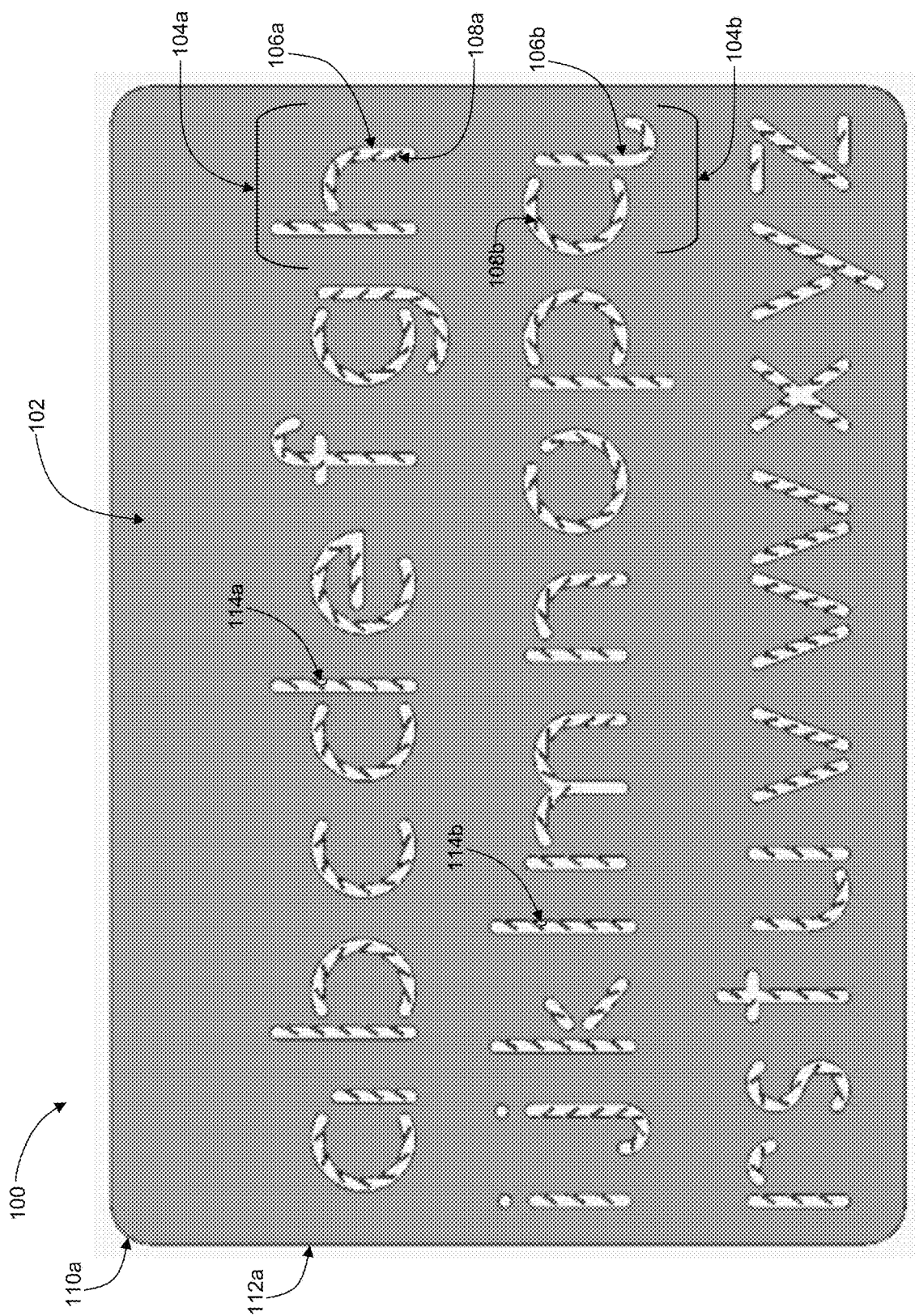
FIG. 1 is a front view an exemplary handwriting learning apparatus for facilitating the learning of a correct and/or preferred formation technique for at least one character, according to an aspect of the present disclosure.

The present disclosure is directed to handwriting learning apparatuses for facilitating at least one user's learning of how to correctly and/or preferably form one or more characters that may be written by hand. Specifically, in an aspect, handwriting learning apparatuses are disclosed that comprise at last one at least partially rigid medium that comprises one or more grooves in the shape of one or more characters and/or one or more portions or segments of the one or more characters. The characters may be traced by a user using at least one insertion device. One or more protruding elements may extend outwardly from at least one portion of at least one inner surface of the grooved character (s). The protruding element(s) may be configured such that the insertion device may be able to move in only one direction within each grooved character, thereby forcing the user to trace the characters using a correct technique. By way of example and not limitation, a correct grooved character tracing technique (and also a correct character formation technique) may comprise using the correct/preferred starting and end points for a given grooved character (or a portion or segment thereof) being traced, tracing a given grooved character (or a portion or segment thereof) in the correct/preferred direction, tracing multiple portions or segments of a given grooved character in the correct/preferred order, and the like. The interaction between the insertion device and at least one portion of each of the protruding element(s) may produce, by way of example and not limitation, various sounds and/or vibrational sensations that may be heard and/or felt by the user, respectively, while tracing a given character, thereby giving the user a multi-sensory learning experience that may improve handwriting technique cognition.

In some aspects, the handwriting learning apparatuses in accordance with the present disclosure may comprise multiple characters arranged in the form of various words, numbers, sounds (e.g., digraphs), and even sentences to be traced. For example, handwriting learning apparatuses in accordance with the present disclosure may comprise one or more preformed Dolch sight words, which may include commonly used words that children may be instructed to memorize as a whole by sight, so that they can automatically recognize these words in print without having to use any strategies in order to decode them. Many individuals believe that these words must be easily recognized in order to achieve sufficient reading fluency in the English language. These words may include "a," "and," "away," "in," and the like. In some additional aspects, handwriting learning apparatuses in accordance with the present disclosure may comprise one or more characters arranged in one or more combinations to represent one or more sounds (e.g., digraphs) such as, for example, "th," "ch," and "gh." In still some additional aspects, handwriting learning apparatuses in accordance with the present disclosure may include multiple characters arranged in any order. In such aspects, a given handwriting learning apparatus may be moved such that consecutively traced characters may form one or more words, numbers, sounds (e.g., digraphs), and/or sentences.

In some aspects, at least one portion of the at least one medium may be securely or removably housed with at least one casing component. Among other things, the casing component may provide a user with an at least partially rigid substantially planar surface upon which to press against with the insertion device while tracing one or more grooved character(s). Additionally, in some nonlimiting exemplary embodiments, the insertion device may be stored within a portion of the casing component when it is not in use (or any other portion of the handwriting learning apparatuses of the present disclosure) and/or the insertion device may be connected to a portion of the casing component (or any other portion of the handwriting learning apparatuses of the present disclosure) using an at least partially flexible elongated member.

In some aspects, a second at least one at least partially rigid medium may be permanently or removably received by a top surface portion of the at least one medium. The second at least one medium may comprise a size and configuration substantially similar to the at least one medium. Additionally, the second at least one medium may further comprise one or more grooved characters substantially similar to the grooved character(s) of the at least one medium; however, the grooved character(s) of the second at least one medium may be configured without any protruding elements so that when they are arranged in substantial alignment with the grooved character(s) of the at least one medium, they may give the grooved character(s) greater depth, thereby making it easier for a user to maintain the insertion device (or a portion thereof) within the grooved character(s) during tracing.

In some aspects, the handwriting learning apparatuses of the present disclosure may further comprise at least one indicator device, such as at least one lighting element, at least one audio emitting device, at least one sensory device, and/or similar mechanism, that may be illuminated and/or display one or more animations, that may produce one or more sounds, and/or that may produce one or more vibrations and/or pulsations, respectively, to indicate whether a user has correctly traced and/or is correctly tracing one or more given characters. Correct character tracing may be detected by one or more sensing devices (such as, for example and not limitation, one or more motion detectors, one or more pressure sensors, one or more proximity sensors, one or more position sensors, and the like) that may be integrated with at least one portion of the protruding element(s), at least one portion of the grooved character(s), at least one portion of the at least one medium and/or at least one portion of the second at least one medium, at least one portion of the at least one casing component, at least one portion of the insertion device, and/or any other appropriate portion(s) of the handwriting learning apparatuses of the present disclosure as may be apparent to those skilled in the relevant art(s) after reading the description herein. In some additional aspects, the at least one sensing device and/or the at least one indicator device may be controlled by computational instructions, or code, in the form of software or one or more software applications that, when executed on at least one computer processor, causes the at least one computer processor to perform certain steps or processes (e.g., controlling the output of one or more indicator devices).

In some aspects, handwriting learning apparatuses in accordance with the present disclosure may further comprise one or more braille symbols in the form of one or more words, numbers, symbols, punctuation marks, letters, sounds (e.g., digraphs), geometric shapes, other shapes, sentences, and/or one or more other characters and/or combinations thereof that correspond to those that may be already present on a given handwriting learning apparatus.

In some aspects, handwriting learning apparatuses in accordance with the present disclosure may be used in conjunction with one or more supplementary devices, such as dry-erase boards, chalkboards, interactive whiteboards (such as, for example and not limitation, a SMART Board® available from the Smart Technologies Corporation of Calgary, Alberta, Canada), interactive touchscreen monitors, tablet computer surfaces or devices, pieces of paper, and smartphones. In such aspects, the at least one medium of the handwriting learning apparatuses may be placed over and thus be removably received by a top surface portion of the supplementary device(s) so that a user may "mark" (either physically or digitally) the top surface portion of the supplementary device(s) while tracing one or more grooved characters. In order to make the appropriate marks, whenever a supplementary device(s) is used, the insertion device may comprise a device that is configured to appropriately mark the given supplementary device(s) (e.g., a dry-erase marker may be used with a dry-erase board, a digital stylus may be used with a tablet computer, etc.) so that the user may view the completed character(s) (or word(s), number(s), or sentence(s)) once tracing is completed. In exemplary aspects wherein the utilized supplementary device(s) may include the appropriate equipment (e.g., one or more display screens, speakers, vibrating motors, etc.), then such supplementary device(s) may perform one or more of the functions of the various indicator devices that may be included or otherwise associated with an exemplary handwriting learning apparatus in accordance with the present disclosure.

The term "character" and/or the plural form of this term are used throughout herein to refer to any traceable form that may comprise one or more grooves within an at least partially rigid medium associated with the handwriting learning apparatuses of the present disclosure, such as letters (including uppercase and lowercase letters of the English alphabet, uppercase and lowercase letters of a foreign language, hieroglyphs characters of a foreign language (e.g., Chinese characters, etc.) and/or others), numbers, punctuation marks, writing symbols (e.g., the "@," "$," "#," "%," and "&" symbols), other symbols, combinations of letters that represent sounds (e.g., digraphs), geometric shapes (e.g., circles, squares, triangles), other shapes, punctuation marks, and the like, as well as any portion(s) or segment(s) thereof.

The term "user" and/or the plural form of this term are used throughout herein to refer to any individual or being that may utilize and/or receive one or more benefits associated with the use of handwriting learning apparatuses in accordance with the present disclosure, such as children, students, individuals learning a new language, individuals recovering from traumatic brain injuries, and the like.

The term "sensing device" and/or the plural form of this term are used throughout herein to refer to any device, mechanism, or apparatus capable of sensing, detecting, and/or measuring at least one physical property (e.g., force, friction, position, orientation, etc.) and/or at least one physical occurrence (e.g., movement, motion, physical presence, etc.), such as motion detectors, pressure sensors, position sensors, accelerometers, tilt sensors, tactile sensors, force gauges, force sensors, proximity sensors, tribometers, microwave sensors, acoustic sensors, infrared sensors, and the like.

The term "sensory device" and/or the plural form of this term are used throughout herein to refer to any device, mechanism, or apparatus capable of providing at least one form of tactile or similar sensory output that may provide at least one type of haptic or similar feedback to at least one user in order to facilitate the user's ability to engage in kinesthetic and/or other tactile based learning, such as vibrating devices (vibrating motors, vibrating pads, etc.), pulsating devices, and the like.

The term "lighting element" and/or the plural form of this term are used throughout herein to refer to any device, element, mechanism, or apparatus capable of providing at least one form of visual output that may be seen by at least one user, such as light-emitting diodes (LEDs), fluorescent lights, incandescent lights, touchscreen display monitors, LED monitors/display screens, plasma display panels (PDPs), liquid-crystal monitors/display screens, organic light-emitting diode (OLED) monitors/display screens, and the like. A given lighting element may or may not be directly integrated with at least one portion of a given exemplary handwriting learning apparatus in accordance with the present disclosure The term "audio emitting device" and/or the plural form of this term are used throughout herein to refer to any device, mechanism, or apparatus capable of providing at least one form of audio output to at least one user, such as speakers (including wireless speakers (such as Bluetooth® (a wireless technology standard standardized as IEEE 802.15.1) speakers), bells, horns, chimes, sirens, and the like. A given audio emitting device may or may not be directly integrated with at least one portion of a given exemplary handwriting learning apparatus in accordance with the present disclosure.

Referring now to FIG. 1, a front view an exemplary handwriting learning apparatus 100 for facilitating the learning of a correct and/or preferred formation technique for at least one character, according to an aspect of the present disclosure, is shown.

In an aspect, handwriting learning apparatus 100 may comprise at least one substantially planar at least partially rigid medium 102, at least one groove forming at least one grooved character 104 (labeled only as grooved characters 104a-b in FIG. 1, for clarity), and at least one protruding element 108 (labeled only as protruding elements 108a-b in FIG. 1, for clarity). In some aspects, medium 102 may comprise a plurality of grooved characters 104, a plurality of segments 410 (not labeled in FIG. 1) thereof, and/or a plurality of protruding elements 108.

Grooved character(s) 104 may at least partially penetrate a portion of medium 102. In some aspects, by way of example and not limitation, grooved character(s) 104 may comprise alphabetic letters (such as any or all of the 26 letters of the English alphabet, in uppercase and/or lowercase form), numbers, punctuation marks, writing symbols, other symbols, shapes (such as, for example and not limitation, geometric shapes), and/or symbols or characters associated with other languages (e.g., Chinese characters or Egyptian hieroglyphs). Each grooved character 104 and/or segment 410 thereof may comprise at least one inner surface 106 (labeled only as inner surfaces 106a-b in FIG. 1, for clarity). Protruding element(s) 108 may extend outwardly from at least one portion of each inner surface 106 and may be configured such that a distal end 208 (not shown in FIG. 1) of an insertion device 206 (not shown in FIG. 1) that may be at least partially removably received by a particular grooved character 104 and/or segment 410 thereof may be able to move in only one single direction therein, thereby forcing a user to trace a given grooved character 104 and/or segment 410 thereof in the correct/preferred manner without needing continuous supervision from an instructor, teacher, parent, or similar handwriting learning authority. This may allow the user to repeatedly practice the correct/preferred way to form a grooved character 104 so that when the user attempts to write the character freehandedly, the user may be able to do so efficiently and legibly. By way of example and not limitation, protruding element(s) 108 may extend outwardly from at least one portion of at least one inner surface 106 associated with each grooved character 104 and/or segment 410 thereof. In some nonlimiting exemplary embodiments, each protruding element 108 may be configured at a slanted downward facing angle 114 (labeled only as angles 114a-b in FIG. 1, for clarity) relative to the at least one portion of inner surface 106 and the direction of correct/preferred motion of insertion device 206, thereby traversing at least one portion of each grooved character 104 and/or segment 410 thereof and allowing insertion device 206 to slidably move in one single (i.e., correct/preferred) direction within each grooved character 104 or any portion or segment 410 thereof. This single direction of movement may, in some nonlimiting exemplary embodiments, comprise the same direction in which protruding element(s) 108 may be oriented. By way of further example and not limitation, each protruding element 108 may be configured relative to at least one portion of at least one inner surface 106 associated with at least one grooved character 104 and/or segment 410 thereof at an angle 114 that may comprise a measurement of approximately 11.2500 degrees, 22.5000 degrees, 30.0000 degrees, 45.0000 degrees, any measurement between 0.0000 degrees and 30.0000 degrees, any measurement between 30.0000 degrees and 60.0000 degrees, any measurement between 60.0000 degrees and 90.0000 degrees, or any other appropriate measurement as may be apparent to those skilled in the relevant art(s) after reading the description herein. In some additional aspects, protruding element(s) 108 may comprise a durable yet at least partially flexible configuration so that at least one portion of each protruding element 108 may be at least partially temporarily displaced as it makes physical contact with one or more portions of insertion device 206 (such as, by way of example and not limitation, distal end 208), thereby allowing insertion device 206 to slide through the region of a grooved character 104 and/or segment 410 thereof occupied by at least one portion of that protruding element 108. In order to achieve the desired configuration, by way of example and not limitation, protruding element(s) may be comprised of plastic, rubber, other polymers, as well as any other appropriate material(s) as may be apparent to those skilled in the relevant art(s) after reading the description herein. Protruding element(s) 108 may be configured to be rigid enough so as to not be displaceable enough to allow insertion device 206 to move in the opposite (i.e., incorrect) direction when sliding of insertion device 206 within a grooved character 104 and/or segment 410 thereof is attempted in a direction opposite the direction of orientation of protruding element(s) 108. Once insertion deice 206 passes by and is free of physical contact with at least one portion of a particular protruding element 108, that protruding element 108 may return to its original, nondisplaced position.

In some aspects, medium 102 may comprise, by way of example and not limitation, grooved characters 104 that may comprise at least one letter in at least one sequence to form at least one word, such as, by way of further example and not limitation, at least one word from the Dolch sight word list and/or at least one word of any language; at least one number in at least one sequence to form at least one single and/or multidigit number; and/or at least one word, number, sound (e.g., digraph), punctuation mark, and/or symbol in at least one sequence to form at least one sentence.

As insertion device 206 pushes past and/or temporarily at least partially displaces at least one portion of each protruding element 108, the interaction between distal end 208 (or any other appropriate portion) of insertion device 206 may trigger one or more friction and/or contact based forces that produce various sounds and vibrations within protruding element(s) 108 and insertion device 206 that may be heard and felt by a user, respectively. This may give the user a multisensory learning experience that may enhance the cognitive ability of the user to learn one or more correct and/or preferred character formation techniques more efficiently and/or more effectively. In some aspects, protruding element(s) 108 may comprise an at least partially flexible material, such as, by way of example and not limitation, plastic, rubber, and/or other polymers, so that insertion device 206 may contact and/or temporarily displace them without causing damage. The at least partially flexible configuration of protruding element(s) 108 may also enhance the vibrations experienced by protruding element(s) 108, thereby increasing the volume and/or intensity of the sound (e.g., clicking) they produce when interacting with insertion device 206 and thereby enhancing the user's multisensory learning experience. In some additional aspects, the interaction between insertion device 206 and at least one portion of each of protruding element(s) 108 may be enhanced by incorporating one or more prongs, gears, detents, and/or similar structures as may be apparent to those skilled in the relevant art(s) after reading the description herein with at least one portion (such as, by way of example and not limitation, distal end 208) of insertion device 206. Such structures may be configured to increase or decrease the sound(s) produced and/or cause more or less vibrations as insertion device 206 interacts with at least one portion of each of protruding element(s) 108.

In some aspects, medium 102 may comprise at least one corner 110 (labeled only as corner 110a in FIG. 1, for clarity) and at least one side 112 (labeled only as side 112a in FIG. 1, for clarity). In some additional aspects, medium 102 may comprise four corners 110 and four sides 112 so as to form a parallelogram. In still some additional aspects, each corner 110 may be at least partially rounded in order to, for example and not limitation, make handwriting learning apparatus 100 more ergonomic to hold, more aesthetic, and/or to otherwise enhance the functionality and/or appearance of handwriting learning apparatus 100. In yet some additional aspects, medium 102 may comprise an at least partially flexible yet durable material, such as, by way of example and not limitation, nylon 12, polycarbonate, plastic, rubber, metal, wood, any other polymer(s), any other similar material(s) as may be apparent to those skilled in the relevant art(s) after reading the description herein, as well as any combination thereof.

By way of example and not limitation, in some aspects, handwriting learning apparatus 100 may comprise a length of approximately 1.000 cm to 25.4000 cm and a height of approximately 1.000 cm to 25.4000 cm. By way of further example and not limitation, handwriting learning apparatus 100 may comprise a length and/or height that is greater than 25.4000 cm. By way of still further example and not limitation, each grooved character 104 and/or segment 410 thereof may comprise a height and/or width ranging from approximately 1.0000 mm to 100.0000 mm. By way of yet further example and not limitation, each grooved character 104 and/or segment 410 thereof may comprise a height and/or width between 100.0000 mm and 200.0000 mm or a height and/or width that is 200.0000 mm or greater. By way of still further example and not limitation, the width of the groove that forms each grooved character 104 and/or segment 410 thereof may be substantially similar to the width of distal end 208 of insertion device 206 (or any portion of insertion device 206 that may be at least partially removably received by grooved character(s) 104 and/or segment(s) 410 thereof).

Figure 2:
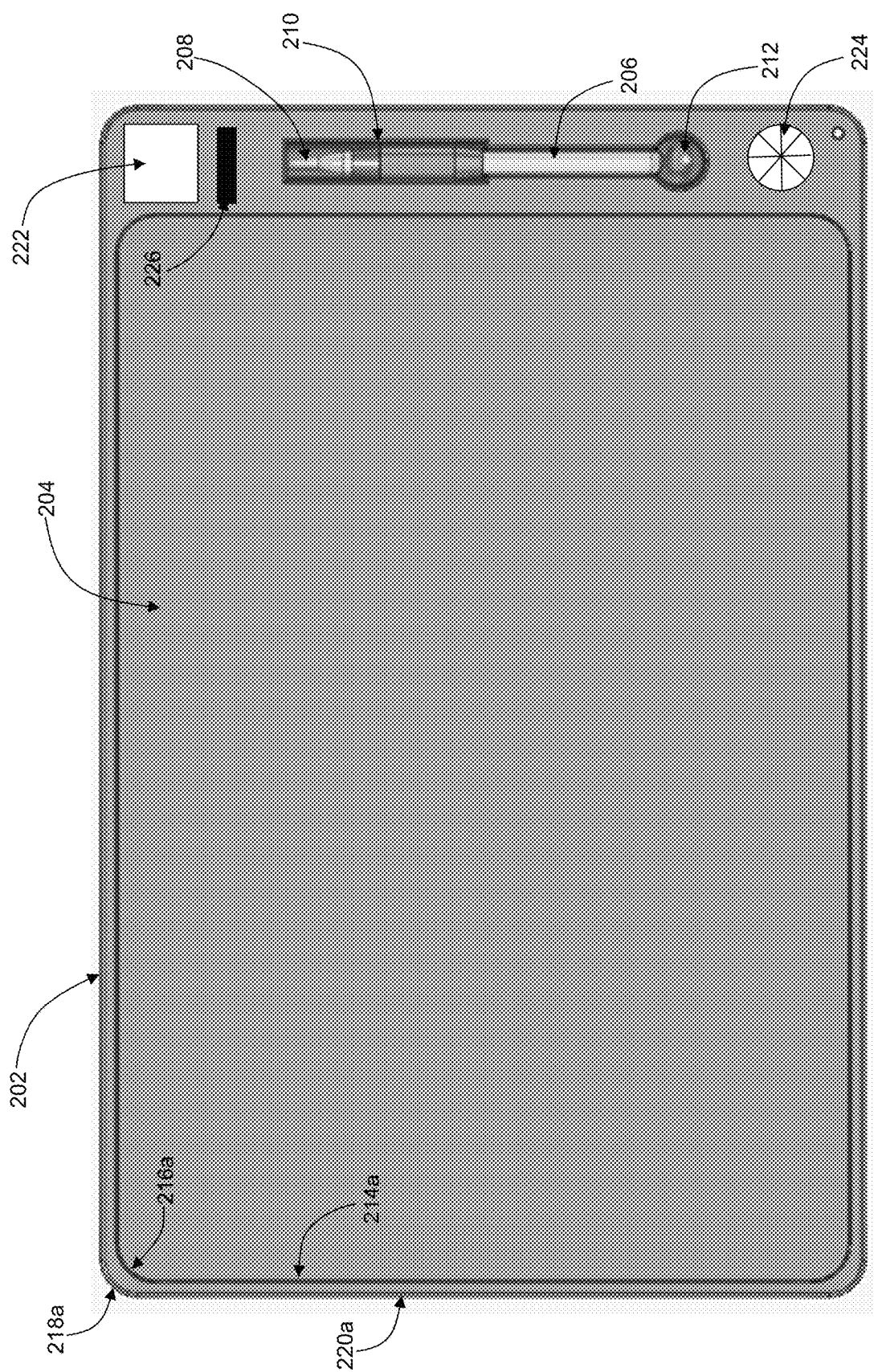
FIG. 2 is a front view of an exemplary casing component for use with a handwriting learning apparatus for facilitating the learning of a correct and/or preferred formation technique for at least one character, according to an aspect of the present disclosure.

Referring now to FIG. 2, a front view of an exemplary casing component 202 for use with handwriting learning apparatus 100 for facilitating the learning of a correct and/or preferred formation technique for of at least one character, according to an aspect of the present disclosure, is shown.

In some aspects, handwriting learning apparatus 100 may further comprise at least one casing component 202. In some aspects, casing component 202 may comprise a substantially planar at least partially rigid configuration. Among other things, casing component 202 may function, at least partially, to permanently or removably retain at least one portion of medium 102 (not shown in FIG. 2) and/or to provide a substantially planar at least partially rigid surface upon which distal end 208 of insertion device 206 may physically contact and interface with while a user traces at least one grooved character 104 (not shown in FIG. 2) or at least one portion or segment 410 (not shown in FIG. 2) thereof that may slidably receive distal end 208.

In some aspects, casing component 202 may comprise at least one recessed area 204 within which at least one portion of medium 102 may be at least partially received, either permanently or removably. By way of example and not limitation, medium 102 may be snapped, locked, or otherwise secured into place within recessed area 204 using one or more catches, detents, tabs, ridges, channels, grooves, nooks, screws, nails, pins, bolts, nuts, washers, hooks, clamps, clasps, clips, brackets, adhesives, hook-and-loop fasteners, and/or similar structures, mechanisms, and/or connective and/or fastening elements as may be recognized by those skilled in the relevant art(s) after reading the description herein. Recessed area 204 may comprise a cross section and/or thickness substantially similar to the shape and size of the cross section and/or thickness of medium 102. In some exemplary nonlimiting embodiments, recessed area 204 may comprise a parallelogram bordered by four side portions 214 (labeled only as side portion 214a in FIG. 2, for clarity) and four corners 216 (labeled only as corner 216a in FIG. 2, for clarity). In such embodiments, side portions 214 may substantially align with sides 112 (not shown in FIG. 2) of medium 102 and corners 216 may substantially align with corners 110 (not shown in FIG. 2) of medium 102. In aspects wherein corners 110 may be rounded, corners 216 may be similarly rounded as well. In some additional aspects, the structures and/or mechanisms used to retain medium 102 within recessed area 204 may be at least partially integrated or associated with side portions 214, corners 216, sides 112, and/or corners 110. Such structures and/or mechanisms may be formed as a part of side portions 214, corners 216, sides 112, and/or corners 110 or may be removably or securely attached thereto using one or more adhesives, nails, nuts, bolts, screws, washers, clips, clamps, clasps, hooks, pins, brackets, and/or similar connective and/or fastening elements. The retaining structures and/or mechanisms may additionally be integrated or associated with any other appropriate portion(s) of casing component 202 and/or medium 102 as may be apparent to those skilled in the relevant art(s) after reading the description herein.

In some aspects, by way of example and not limitation, casing component 202 may comprise a shape in the form of a parallelogram, with four corners 218 (labeled only as corner 218a in FIG. 2, for clarity) and four sides 220 (labeled only as side 220a in FIG. 2, for clarity). In some additional aspects, corners 218 may be rounded in order to, for example and not limitation, make handwriting learning apparatus 100 more ergonomic to hold, more aesthetic, and/or to otherwise enhance the functionality and/or appearance of handwriting learning apparatus 100.

In some aspects, casing component 202 (or medium 102 or any other appropriate portion of handwriting learning apparatus 100) may comprise at least one means for housing insertion device 206 or a portion thereof. By way of example and not limitation, insertion device 206 may be at least partially contained within a compartment or slot 210. Slot 210 may removably receive at least one portion of insertion device 206 using one or more catches, detents, tabs, notches, clamps, tubes, holsters, ridges, channels, grooves, nooks, crannies, holes, nails, nuts, bolts, screws, washers, clips, clasps, hooks, pins, brackets and/or similar structures and/or mechanisms as may be apparent to those skilled in the relevant art(s) after reading the description herein. By way of further example and not limitation, insertion device 206 may be stored within slot 210 in a substantially vertical orientation; however, as will be appreciated by those skilled in the relevant art(s) after reading the description herein, any orientation may suffice for storage. In some additional nonlimiting exemplary embodiments, slot 210 may be configured to secure insertion device 206 in an orientation that is substantially vertical relative to casing component 202, medium 102, and/or any appropriate portion of handwriting learning apparatus 100 such that insertion device 206 at least partially traverses a portion of casing component 202/medium 102/handwriting learning apparatus 100 when secured within slot 210.

In some additional aspects, when insertion device 206 is removed from slot 210, it may maintain a secure connection to casing component 202 by means of an at least partially flexible elongated member, such as, by way of example and not limitation, an at least partially flexible piece of plastic, wire, string, rope, cable, yarn, and/or one or more similar elements as may be apparent to those skilled in the relevant art(s) after reading the description herein. The at least partially flexible member may be secured to or integrated with one or more portions of casing component 202. In some nonlimiting exemplary embodiments, the at least partially flexible elongated member may be secured to or integrated with a portion of medium 102, as well as any other appropriate portion of handwriting learning apparatus 100 as may be apparent to those skilled in the relevant art(s) after reading the description herein.

In some aspects, casing component 202 (or, when appropriate, medium 102 or any other portion of handwriting learning apparatus 100 as may be apparent to those skilled in the relevant art(s) after reading the description herein) may further comprise a retrieval recess 212. By way of example and not limitation, retrieval recess 212 may be configured as an at least partial indentation within casing component 202, medium 102, secondary medium 302 (not shown in FIG. 2), and/or any appropriate portion of handwriting learning apparatus 100 as may be apparent to those skilled in the relevant art(s) after reading the description herein. By way of further example and not limitation, retrieval recess 212 may be configured to receive at least part of a user's thumb and/or finger and/or one or more tools in order to facilitate the removal and/or securing of insertion device 206 from/within slot 210, respectively. Additionally, in some nonlimiting exemplary embodiments, retrieval recess 212 may be used to contain at least a portion of an at least partially flexible elongated member that may be used to secure insertion device 206 to at least one portion of casing component 202 (or, when appropriate, medium 102 or any other portion of handwriting learning apparatus 100).

By way of example and not limitation, insertion device 206 may comprise a generally elongated shape. In some nonlimiting embodiments, the elongated shape of insertion device 206 may comprise a cylinder similar in shape and/or size to a pen, pencil, or marker. In some nonlimiting exemplary embodiments, insertion device 206 may be tapered at a distal end 208 such that distal end 208 may be configured to engage in a slidable friction fit within grooved character(s) 104 and/or segment(s) 410 thereof and interact with at least one portion of each of protruding element(s) 108 (not shown in FIG. 2) therein. In some additional aspects, at least one portion of insertion device 206 may be encased within a foam, rubber, or similar supportive grip to facilitate user comfort when holding insertion device 206 and using it to trace one or more grooved characters 104 and/or one or more segments 410 thereof. By way of further example and not limitation, insertion device 206 may comprise a pen, pencil, marker, digital stylus, colored pencil, crayon, drawing stylus, piece of chalk, dry-erase marker, or any other similar devices or writing or drawing tools as may be apparent to those skilled in the relevant art(s) after reading the description herein, particularly those that may be configured to physically and/or digitally mark one or more supplementary devices that may be used with handwriting learning apparatus 100.

In some aspects, casing component 202, medium 102, and/or any other appropriate portion of handwriting learning apparatus 100 as may be apparent to those skilled in the relevant art(s) after reading the description herein may further comprise at least one indicator device configured at any appropriate location thereon and/or therein as may be apparent to those skilled in the relevant art(s) after reading the description herein including, by way of example and not limitation, near a top and/or bottom front portion of casing component 202 and/or medium 102. In some nonlimiting exemplary embodiments, the at least one indicator device may comprise at least one lighting element 222 configured to produce at least one visual output; at least one audio emitting device 224 configured to produce at least one audio output; at least one sensory device configured to produce at least one type of tactile output, such as, for example and not limitation, a vibration, pulsation, and/or similar sensation or haptic feedback as may be apparent to those skilled in the relevant art(s) after reading the description herein; and/or any other similar indicator device(s) configured to produce one or more similar appropriate outputs as may be apparent to those skilled in the relevant art(s) after reading the description herein. By way of further example and not limitation, lighting element(s) 222 may be configured to be illuminated (such as, for example and not limitation, by displaying a green light and/or by displaying various light colors in various sequences) when a user correctly traces at least one grooved character 104 or at least one portion or segment 410 thereof or a particular grouping of grooved characters 104 (e.g., such as to form one or more words, numbers, sounds (e.g., digraphs), and/or sentences). By way of still further example and not limitation, lighting element(s) 222 may be configured to be illuminated when a user inserts insertion device 206 at a correct/preferred groove start location 404 (not shown in FIG. 2) for a given grooved character 104 and/or segment 410 thereof, as a user correctly traces a grooved character 104 and/or segment 410 thereof with insertion device 206, when a user physically contacts a correct/preferred groove end location 406 (not shown in FIG. 2) with insertion device 206 for a given grooved character 104 and/or segment 410 thereof, and/or lighting element(s) 222 may be configured to remain illuminated for a period of time after a grooved character 104 or a particular grouping of grooved characters 104 has/have been correctly traced (such as, by way of example and not limitation, being configured to remain illuminated for two seconds after such correct tracing). In aspects wherein lighting element(s) 222 may be configured to be illuminated as a user traces a particular grooved character 104 and/or segment 410 thereof, by way of example and not limitation, lighting element(s) 222 may comprise a meter or bar form that gets fuller and/or brighter as more lighting element(s) 222 become illuminated as the user's tracing of the grooved character 104 and/or segment 410 thereof progresses and/or lighting element(s) 222 may be configured behind grooved character(s) 104 (such as, for example and not limitation, within at least one portion of recessed area 204) and such lighting element(s) 222 may be configured to become illuminated so as to correspond to the portion(s) or segment(s) 410 of grooved character(s) 104 that have been successfully traced (such as, by way of example and not limitation, by displaying at least one digital line upon lighting element(s) 222 in the form of at least one touchscreen display monitor as such touchscreen display monitor is digitally marked via physical contact with at least one portion of insertion device 206 (e.g., distal end 208) as a given grooved character 104 or portion or segment 410 thereof is being traced) and/or to indicate the next segment(s) 410 of grooved character(s) 104 (or portion thereof) to be traced. In aspects wherein grooved character(s) 104 may be arranged in at least one sequence to form one or more words, numbers, sounds (e.g., digraphs), and/or sentences, lighting element(s) 222 may be configured behind grooved character(s) 104 and such lighting element(s) 222 may be configured to become illuminated so as to indicate the next grooved character 104 in the sequence to be traced. In some additional aspects wherein lighting element(s) 222 may comprise at least one display monitor, lighting element(s) may be configured to display at least one animation corresponding to any one or more of the various circumstances described above.

In order to detect when a grooved character(s) 104 (or at least one portion or segment 410 thereof) has been or is being traced correctly or incorrectly, the various indicator devices, such as, by way of example and not limitation, lighting element(s) 222, may be communicatively coupled (such as, by way of example and not limitation, via wireless connectivity, via hardwired connectivity, or via direct integration) to/with one or more sensing devices (such as, for example and not limitation, one or more motion detectors, one or more pressure sensors, one or more proximity sensors, one or more position sensors, and the like) associated with at least one portion of grooved character(s) 104 (such as a start location 404 and/or end location 406 thereof), at least one portion of segment(s) 410 (such as a start location 404 and/or end location 406 thereof), at least one portion of one or more protruding element(s) 108, at least one portion of insertion device 206, at least one portion of medium 102, at least one portion of casing component 202, at least one portion of secondary medium 302, and/or any other appropriate portion(s) of handwriting learning apparatus 100 as may be apparent to those skilled in the relevant art(s) after reading the description herein. Such sensing device(s) may be housed within any appropriate portion of medium 102, casing component 202, insertion device 206, secondary medium 302, and/or any other appropriate portion(s) of handwriting learning apparatus 100 as may be apparent to those skilled in the relevant art(s) after reading the description herein. In some aspects, the sensing device(s) may be communicatively coupled (such as, by way of example and not limitation, via wireless connectivity, via hardwired connectivity, or via direct integration) to/with one or more computer processors, computer components, and/or software modules that may include computational instructions, or code, that may be executed in order to control the functioning of the various indicator device(s) that may be included with handwriting learning apparatus 100, including, by way of example and not limitation, lighting element(s) 222, and thereby may cause the indicator device(s) to present one or more outputs to the user(s) to communicate the detection of correct or incorrect character tracing and/or to communicate an indication as to which grooved character(s) 104 and/or segment(s) 410 thereof (and or which portion(s) of such segment(s) 410) to trace next. Other types of sensing devices may be used with handwriting learning apparatus 100 as well as may be apparent to those skilled in the relevant art(s) after reading the description herein.

In some aspects, if a user does not correctly trace a grooved character(s) 104 and/or a segment(s) 410 thereof, then lighting element(s) 222 may not be illuminated at all, or lighting element(s) 222 may display a different color from a correct tracing (such as, by way of example and not limitation, red) and/or by displaying different various light colors in various sequences than those that may be displayed after a correct tracing. By way of example and not limitation, lighting element(s) 222 may comprise one or more light-emitting diodes (LEDs), fluorescent lights, incandescent lights, LED monitors/display screens, plasma display panels (PDPs), liquid-crystal monitors/display screens, organic light-emitting diode (OLED) monitors/display screens, and/or similar elements, devices, or configurations as may be apparent to those skilled in the relevant art(s) after reading the description herein. Additionally, in some further aspects, the indicator device(s) of handwriting learning apparatus 100 may take the form of one or more audio emitting devices 224 (for example and not limitation, speakers, bells, horns, chimes, sirens, etc.) that may be configured to play one or more sounds associated with the correct and/or incorrect tracing of grooved character(s) 104 (or one or more portions or segments 410 thereof) (such as, in some nonlimiting examples, a chime or bell ring that may be played when a user performs a correct tracing or a buzzer or beep that may be played when a user performs an incorrect tracing). Other audio recordings may be played for a user as well, including phrases in various languages such as "Good job!", "You can do it!", "Trace the letter 'A'," and the like. Audio emitting device(s) 224 may also be configured to provide a verbal indication of the current grooved character(s) 104 being traced (e.g., "You are currently tracing the letter 'A'"). Similarly, one or more sensory devices (for example and not limitation, vibrating devices (vibrating motors, vibrating pads, etc.), pulsating devices, and the like) may be configured to indicate to a user when the tracing of grooved character(s) 104 (or one or more portions or segments 410 thereof) is correct or incorrect. By way of example and not limitation, relatively soft, short, and/or quick vibrations and/or pulsations may be produced by the sensory device(s) in various sequences when a user performs a correct tracing, while longer, harder, and/or more intense vibrations and/or pulsations may be produced when a user performs an incorrect tracing. Lighting element(s) 222, audio emitting device(s) 224, the sensory device(s), and/or any other indicator device(s) used with handwriting learning apparatus 100 may be configured in any orientation and in any appropriate location upon or within handwriting learning apparatus 100 as may be apparent to those skilled in the relevant art(s) after reading the description herein.

The various types of indicator device(s) and/or sensing device(s) may be powered by one or more batteries (including lithium batteries), alternating current (AC) or direct current (DC) power sources, solar power, wind power, and/or any other appropriate power source(s) as may be apparent to those skilled in the relevant art(s) after reading the description herein.

In some aspects, any indicator device(s); sensing device(s); and/or computer processor(s), computer component(s), and/or software modules that may be included with handwriting learning apparatus 100 may be contained within one or more areas, such as, by way of example and not limitation, within recessed area 204 between casing component 202 and medium 102. In some additional aspects, one or more indicator device(s); sensing device(s); and/or computer processor(s), computer component(s), and/or software modules may be contained between medium 102 and secondary medium 302, contained within one or more portions of medium 102, contained within one or more portions of casing component 202, contained within one or more portions of secondary medium 302, and/or configured within or at any other appropriate location(s) as may be apparent to those skilled in the relevant art(s) after reading the description herein.

In some aspects, handwriting learning apparatus 100 may further comprise at least one Universal Serial Bus (USB) port 226 configured to removably receive at least one USB connector associated with one or more computer processors, computer components, computer modules, and/or computer/ digital storage devices (e.g., one or more thumb drives, one or more flash drives, etc.) and/or one or more power sources (e.g., one or more AC power sources, one or more DC power sources, one or more battery based power sources, etc.) that, when connected to USB port 226 of handwriting learning apparatus 100, serve to install, program, and/or update one or more software modules associated with handwriting learning apparatus 100, provide software that may be accessible and/or useable by handwriting learning apparatus 100, provide at least a portion of the power required for handwriting learning apparatus 100 to function (including at least partially charging one or more batteries that may be associated with handwriting learning apparatus 100), and/or perform one or more similar tasks or functions as may be apparent to those skilled in the relevant art(s) after reading the description herein. In some additional aspects, handwriting learning apparatus 100 may comprise one or more wireless means to update one or more software modules associated with handwriting learning apparatus 100, provide at least a portion of the power required for handwriting learning apparatus 100 to function (including at least partially charging (via, for example and not limitation, induction charging) one or more batteries that may be associated with handwriting learning apparatus 100), and/or perform one or more similar tasks or functions as may be apparent to those skilled in the relevant art(s) after reading the description herein. By way of example and not limitation, such wireless means may comprise one or more Bluetooth® (a wireless technology standard standardized as IEEE 802.15.1) transceivers or antennas and/or one or more wireless (e.g., induction) charging devices.

In some aspects, such as when handwriting learning apparatus 100 may comprise one or more computer processors, computer components, software modules, and/or other electronic components, handwriting learning apparatus 100 may require the receipt of at least one form of user authentication prior to being used and/or updated. By way of example and not limitation, such user authentication may comprise the user submitting a username, password, passcode, key code, pin number, visual identification, facial recognition, fingerprint scan, retinal scan, voice authentication, and/or any similar identifying and/or security elements as may be apparent to those skilled in the relevant art(s) after reading the description herein as being able to securely determine the identity of the user.

In some aspects, casing component 202 and/or insertion device 206 may comprise one or more materials substantially similar to the material(s) that may comprise medium 102, including but not limited to plastic, nylon 12, polycarbonate, rubber, metal, wood, any other polymer(s), any other similar material(s) as may be apparent to those skilled in the relevant art(s) after reading the description herein, as well as any combination thereof.

Figure 3:
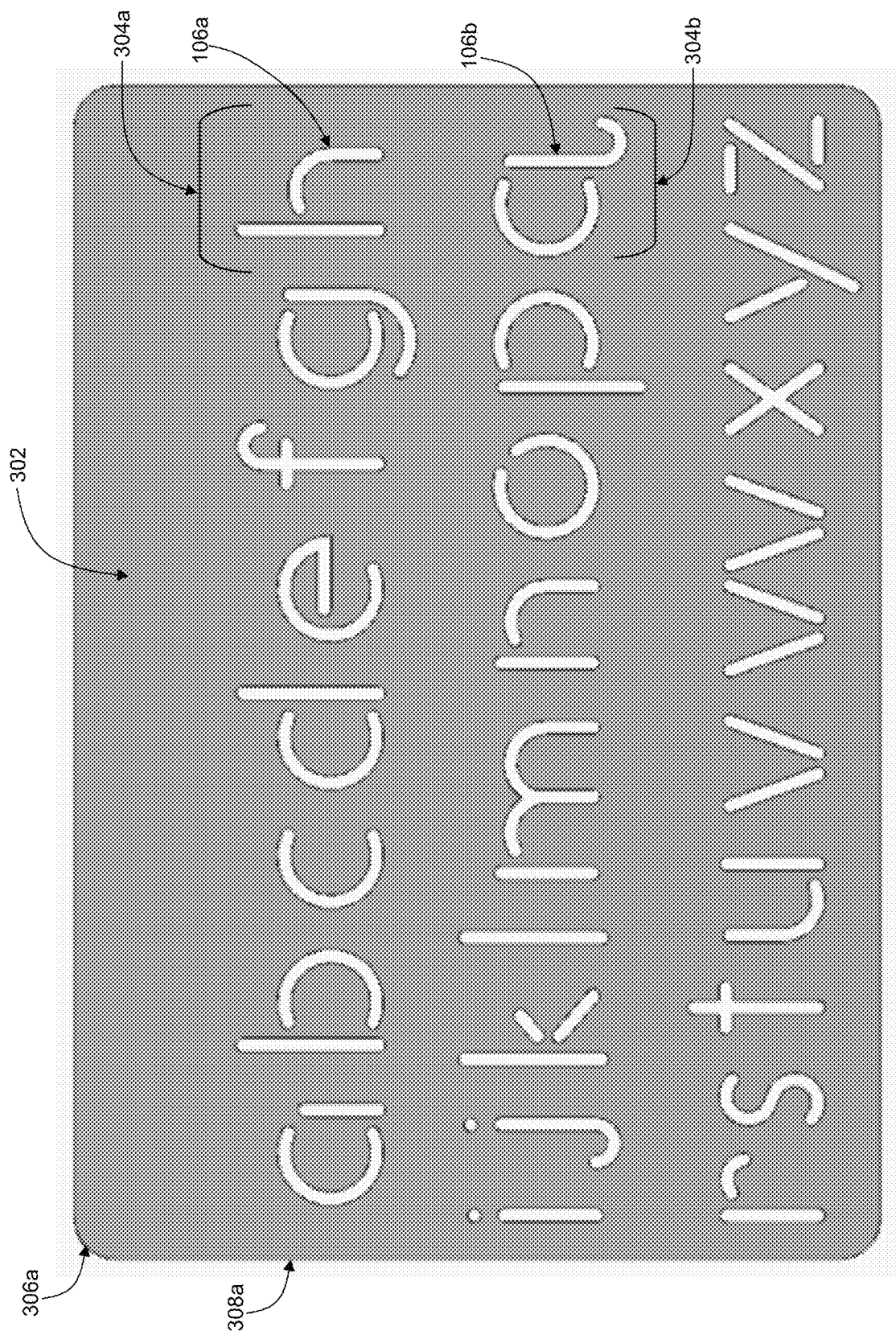
FIG. 3 is a front view of an exemplary secondary medium for use with a handwriting learning apparatus for facilitating the learning of a correct and/or preferred formation technique for at least one character, according to an aspect of the present disclosure.

Referring now to FIG. 3, a front view of an exemplary secondary medium 302 for use with a handwriting learning apparatus 100 for facilitating the learning of a correct and/or preferred formation technique for at least one character, according to an aspect of the present disclosure, is shown.

In some aspects, handwriting learning apparatus 100 may further comprise a second at least one substantially planar at least partially rigid medium in the form of secondary medium 302 in addition to medium 102 (not shown in FIG. 3). Secondary medium 302 may be substantially similar to medium 102, with one exemplary difference being that grooved character(s) 304 (labeled only as grooved characters 304a-b in FIG. 3, for clarity) comprised within secondary medium 302 may not include any protruding element(s) 108. However, each grooved character 302 may include at least one inner surface 106 (labeled only as inner surfaces 106a-b in FIG. 3, for clarity) that may be substantially similar to inner surface(s) 106 of grooved character(s) 104 (not shown in FIG. 3) of medium 102.

Secondary medium 302 may be permanently or removably placed over and received by medium 102 such that grooved character(s) 304 of secondary medium 302 may substantially align with grooved character(s) 104 of medium 102. The depth of the combined grooved character(s) 104 and 304 may be greater than the depth of grooved character(s) 104 alone such that it may be easier for a user to maintain distal end 208 (not shown in FIG. 3) (or any other appropriate portion) of insertion device 206 (not shown in FIG. 3) within the combined grooved character(s) 104 and 304 instead of grooved character(s) 104 alone.

Secondary medium 302 may be removably or permanently received by medium 102 and/or casing component 202 using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be recognized by those skilled in the relevant art(s) after reading the description herein. In some aspects, such as when medium 102 may comprise a parallelogram, secondary medium 302 may comprise a shape in the form of a parallelogram with four corners 306 (labeled only as corner 306a in FIG. 3, for clarity) that substantially align with corners 110 (not shown in FIG. 3) of medium 102 (and, when appropriate, corners 216 (not shown in FIG. 3) of casing component 202) and four sides 308 (labeled only as side 308a in FIG. 3, for clarity) that substantially align with sides 112 (not shown in FIG. 3) of medium 102 (and, when appropriate, sides 214 (not shown in FIG. 3) of casing component 202). In aspects wherein corners 110 of medium 102 (and, when appropriate, corners 216 of casing component 202) may be rounded, corners 306 may be rounded as well in order to, for example and not limitation, facilitate the reception of secondary medium 302 by medium 102 (and, when appropriate, casing component 202), make handwriting learning apparatus 100 more ergonomic to hold, more aesthetic, and/or to otherwise enhance the functionality and/or appearance of handwriting learning apparatus 100. In some additional nonlimiting embodiments, the one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements that may secure secondary medium 102 to medium 102 may be comprised within a portion of one or more corners 306, sides 308, corners 110, sides 112, corners 216, and/or sides 214. In still some additional aspects, at least one portion of corners 306 and/or sides 308 may at least partially protrude from a rear surface portion of secondary medium 302 in order to fit around corners 110 and/or sides 112 of medium 102 (and, when appropriate, within corners 216 and/or sides 214 to be at least partially received within recessed area 204 (not shown in FIG. 3) of casing component 202) or to be at least partially received within/upon at least one portion of casing component 202.

In some aspects, secondary medium 302 may comprise one or more materials substantially similar to the material(s) that may comprise medium 102, including but not limited to plastic, nylon 12, polycarbonate, rubber, metal, wood, any other polymer(s), any other similar material(s) as may be apparent to those skilled in the relevant art(s) after reading the description herein, as well as any combination thereof. Additionally, by way of example and not limitation, secondary medium 302 may comprise a size and/or shape substantially similar to the size and/or shape of medium 102, and the size and/or arrangement of grooved character(s) 304 may be substantially similar to the size and/or arrangement of grooved character(s) 104, including, when appropriate, in such an arrangement so as to form one or more words, numbers, sounds (e.g., digraphs), and/or sentences.

In some aspects, medium 102, casing component 202, secondary medium 302, insertion device 206, and/or any other appropriate portion(s) of handwriting learning apparatus 100 may be fabricated, at least partially, by using one or more additive manufacturing processes, including, by way of example and not limitation, one or more 3D printing processes.

Figure 4:
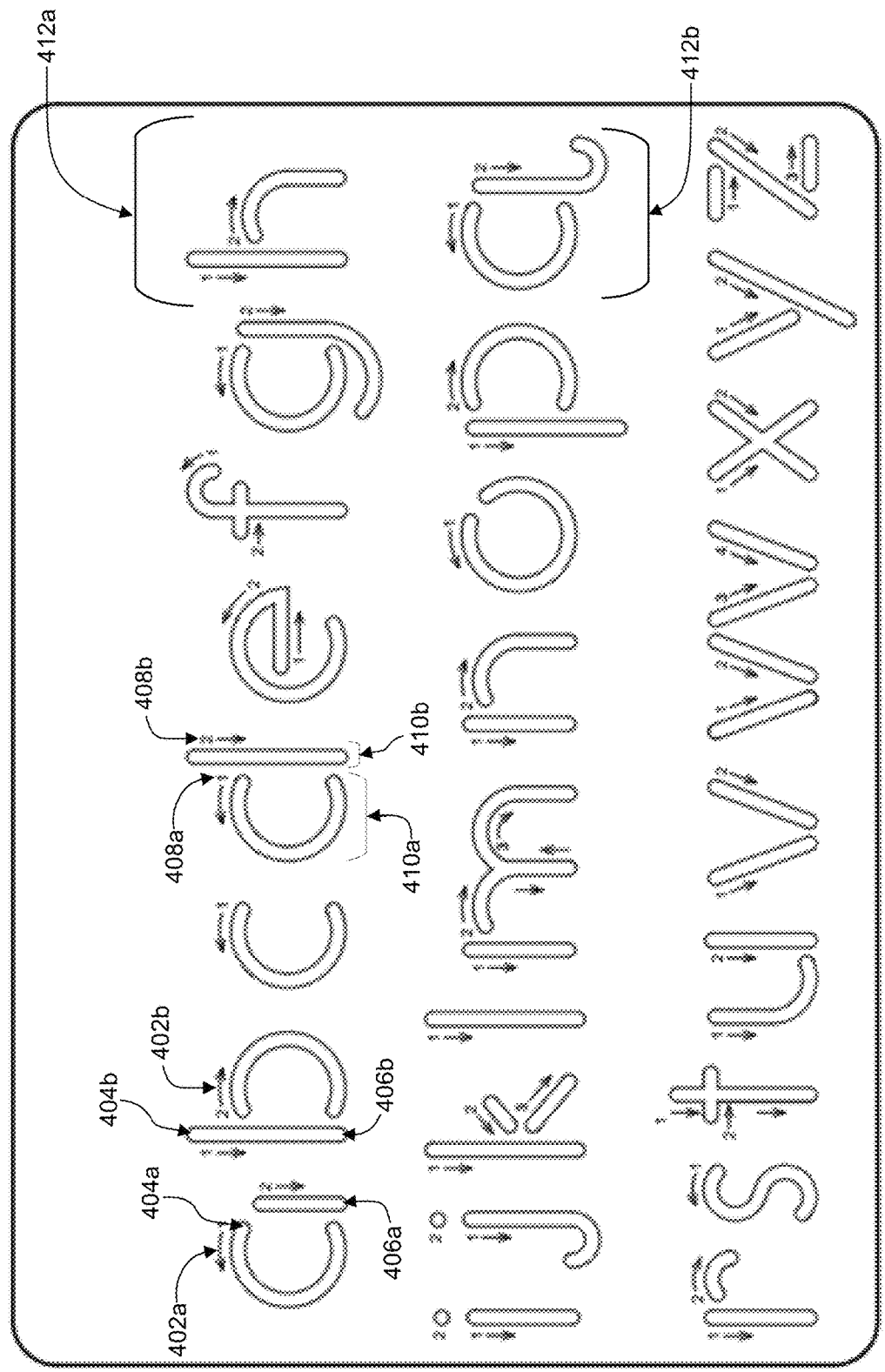
FIG. 4 is an image depicting correct and/or preferred character tracing techniques as dictated by the orientation of one or more protruding elements associated with an exemplary handwriting learning apparatus when the characters to be traced comprise lowercase letters of the English alphabet, according to an aspect of the present disclosure.

Referring now to FIG. 4, an image depicting correct and/or preferred character tracing techniques as dictated by the orientation of one or more protruding elements 108 associated with exemplary handwriting learning apparatus 100 when the characters to be traced comprise lowercase letters of the English alphabet, according to an aspect of the present disclosure, is shown.

In some aspects, correct and/or preferred grooved character 104 (not shown in FIG. 4) (and 304 (not shown in FIG. 4), when appropriate) (represented generally by characters 412 in FIG. 4 (labeled only as characters 412a-b in FIG. 4, for clarity)) tracing using handwriting learning apparatus 100 may be achieved, by way of example and not limitation, by following the motions depicted by directional arrows 402 (labeled only as directional arrows 402a-b in FIG. 4, for clarity). To correctly trace a grooved character 104/304, a user may begin at a grooved character 104/304 start location 404 (labeled only as start locations 404a-b in FIG. 4, for clarity) for a given grooved character 104/304 and keep tracing until an end location 406 (labeled only as end locations 406a-b in FIG. 4, for clarity) is reached for that grooved character 104/304 (such as, for example and not limitation, by making physical contact therewith via insertion device 206 (not shown in FIG. 4)). In some aspects, directional arrow(s) 402, start location(s) 404, and/or end location(s) 406 may be labeled upon a portion of medium 102, secondary medium 302, casing component 202, recessed area 204, and/or within at least one portion of grooved character(s) 104/304. In some additional aspects, directional arrow(s) 402 may be ordered by numbers 408 (labeled only as numbers 408a-b in FIG. 4, for clarity) so that a user may understand the order that the portions or segments 410 (labeled only as segments 410a-b in FIG. 4, for clarity) of a grooved character 104/304 are to be completed when the grooved character 104/304 has multiple portions or segments 410. In such aspects, each portion or segment 410 may comprise its own start location 404, end location 406, and directional arrow(s) 402. In still some additional aspects, sensing device(s) that may be communicatively coupled to one or more indicator devices and/or one or more computer processors, computer components, and/or software modules may be configured to detect when a user has traced each segment 410 of a multi-segment grooved character 104/304 correctly or incorrectly and the indicator devices may present one or more outputs to the user to communicate such detection.

Figure 5:
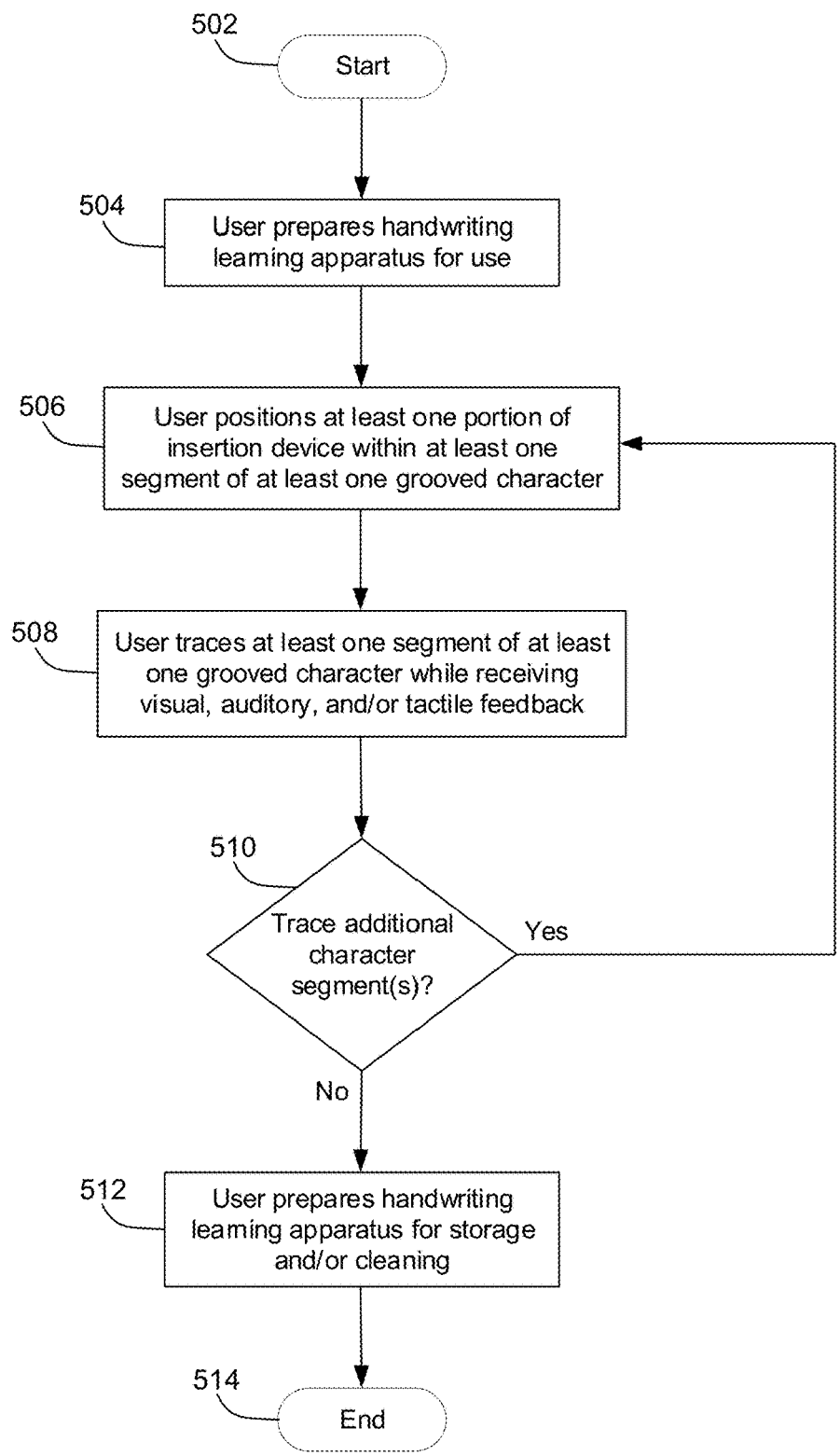
FIG. 5 is a flowchart illustrating an exemplary process for using a handwriting learning apparatus to learn how to correctly and/or preferably form at least one character, according to an aspect of the present disclosure.

Referring now to FIG. 5, a flowchart illustrating an exemplary process 500 for using handwriting learning apparatus 100 to learn how to correctly and/or preferably form at least one character, according to an aspect of the present disclosure, is shown.

Process 500 begins at step 502 with control passing immediately to step 504.

At step 504, a user prepares handwriting learning apparatus 100 (not shown in FIG. 5) for use. In some aspects, by way of example and not limitation, this may involve the user removing handwriting learning apparatus 100 from a storage location and/or assembling at least one portion of handwriting learning apparatus 100. By way of further example and not limitation, in some additional aspects, handwriting learning apparatus 100 may be at least partially assembled by attaching medium 102 (not shown in FIG. 5) to casing component 202 (not shown in FIG. 5) and/or attaching secondary medium 302 (not shown in FIG. 5) to medium 102 and, when applicable, to casing component 202. In some nonlimiting exemplary embodiments, medium 102 may be attached to casing component 202 by being received by recessed area 204 (not shown in FIG. 5). By way of still further example and not limitation, recessed area 204 may receive medium 102 when side(s) 112 (not shown in FIG. 5) and (if applicable) corner(s) 110 (not shown in FIG. 5) of medium 102 substantially line up with side portion(s) 214 (not shown in FIG. 5) and (if applicable) corner(s) 216 (not shown in FIG. 5) of casing component 202. In some additional aspects, medium 102 may be snapped, locked, or otherwise secured into place within recessed area 204 using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein.

In some additional nonlimiting exemplary embodiments, secondary medium 302 may be secured to a front surface portion of medium 102 such that side(s) 308 (not shown in FIG. 5) and (if applicable) corner(s) 306 (not shown in FIG. 5) of secondary medium 302 substantially line up with side(s) 112 and (if applicable) corner(s) 110 of medium 102. By way of example and not limitation, secondary medium 302 may be snapped, locked, or otherwise secured into place upon medium 102 using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein. In still some additional aspects, secondary medium 302 may be secured to a front surface portion of medium 102 such that side(s) 308 and (if applicable) corner(s) 306 of secondary medium 302 also substantially line up with side portion(s) 214 and (if applicable) corner(s) 216 of casing component 202. In such aspects, secondary medium 302 may be snapped, locked, or otherwise secured into place upon and/or within casing component 202 by using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein.

In some aspects, the user may also need to remove insertion device 206 (not shown in FIG. 5) from a storage location within or upon handwriting learning apparatus 100, such as, by way of example and not limitation, from within slot 210 (not shown in FIG. 5) integrated with or secured to medium 102, secondary medium 302, and/or casing component 202. In some instances, to assist with the removal of insertion device 206 from slot 210, the user may use retrieval recess 212 (not shown in FIG. 5) to help grip or grasp insertion device 206 and/or obtain better leverage to pry and/or pull insertion device 206 from slot 210, such as, for example and not limitation, by using a portion of one or more of the user's fingers, a portion of the user's thumb(s), and/or one or more tools.

In some aspects, the user may also need to remove handwriting learning apparatus 100 from one or more storage containers, such as, by way of example and not limitation, a box, receptacle, and/or bag, as well as any similar container(s) as may be apparent to those skilled the relevant art(s) after reading the description herein. Such container(s) may completely or partially contain at least one portion of handwriting learning apparatus 100.

Once handwriting learning apparatus 100 has been prepared for use, process 500 proceeds to step 506.

At step 506, the user positions at least one portion of insertion device 206, such as, by way of example and not limitation, distal end 208 (not shown in FIG. 5) within at least one portion or segment 410 (not shown in FIG. 5) of at least one grooved character 104 to be traced, typically at a start location 404 (not shown in FIG. 5) associated therewith. In aspects wherein handwriting learning apparatus 100 may comprise a secondary medium 302, at least one portion of insertion device 206 may also be positioned within at least one portion or segment 410 of at least one grooved character 304 (not shown in FIG. 5) to be traced, typically at a start location 404 associated therewith.

As a nonlimiting example, insertion device 206 may be held within the user's hand (typically in the user's writing hand) in a relatively vertical orientation substantially perpendicular to medium 102, casing component 202 (if applicable), secondary medium 302 (if applicable), and/or handwriting learning apparatus 100, generally. By way of example and not limitation, in some aspects, the user may push insertion device 206 into grooved character(s) 104 (and, if applicable, 304) and/or at least one portion or segment 410 thereof until at least one portion of insertion device 206 (such as, for example, distal end 208) makes physical contact with a portion of casing component 202 and/or the top surface portion of one or more supplementary devices, such as, by way of further example and not limitation, a piece of paper, a dry-erase board, a chalkboard, an interactive whiteboard (such as, for example and not limitation, a SMART Board® available from the Smart Technologies Corporation of Calgary, Alberta, Canada), an interactive touchscreen monitor, a tablet computer surface or device, a smartphone, and the like.

At step 508, the user engages in the tracing of at least one grooved character 104 (and 304, if applicable) and/or at least one portion or segment 410 thereof by sliding insertion device 206 therein, typically from a grooved character 104 (and 304, if applicable) and/or segment 410 start location 404 to a grooved character 104 (and 304, if applicable) and/or segment 410 end location 406 (not shown in FIG. 5). While engaging in such tracing, the user may experience at least one of: visual feedback; auditory feedback; and sensory, tactile, haptic, or kinesthetic feedback.

Visually, the user may see a character 104 (and 304, if applicable) and/or at least one portion or segment 410 thereof while it is being traced. Additionally, the user may hear one or more noises (such as, by way of example and not limitation, a clicking sound) as at least one portion of insertion device 206 (such as, for example and not limitation, distal end 208) physically contacts and interacts with at least one portion of one or more protruding elements 108 (not shown in FIG. 5) as it slidably moves past protruding element(s) 108 while temporarily displacing at least one portion of each of protruding element(s) 108. One or more audio emitting devices 224 may also provide one or more forms of audio feedback such as, by way of example and not limitation, a chime or bell ring that may be played when/as the user performs a correct tracing, a buzzer or beep that may be played when/as the user performs an incorrect tracing, and phrases in various languages such as "Good job!", "You can do it!", "Trace the letter 'A'," and the like to encourage, motivate, and/or direct the user. Furthermore, the user may experience sensory/tactile/haptic/kinesthetic feedback as at least one portion of insertion device 206 (such as, for example and not limitation, distal end 208) physically contacts and interacts with at least one portion of one or more protruding elements 108 as it slidably moves past protruding element(s) 108 and temporarily at least partially displaces at least one portion of each of protruding element(s) 108, thereby causing insertion device 206 to experience one or more vibratory and/or similar sensations that may be felt by the user's finger(s), thumb(s), hand(s), and/or similar body part(s). The physical act of tracing a given grooved character 104/304 and/or segment 410 thereof may add to the user's kinesthetic learning experience. Additionally, one or more sensory devices may also provide one or more forms of tactile/haptic/kinesthetic feedback, such as, by way of example and not limitation, one or more sensory devices that may produce various soft, short, intense, and/or long vibrations and/or pulsations in various sequences. By stimulating multiple senses during the learning of one or more correct and/or preferred character formation techniques, the user may be more likely to absorb and retain knowledge of the correct and/or preferred technique(s) in a timely and/or efficient manner, thereby increasing cognitive learning efficiency and effectiveness of the technique(s).

At step 510, the user determines whether to trace more grooved character(s) 104 (and 304, if applicable) and/or one or more portion(s) or segment(s) 410 thereof. Such determination may be made at least partially with regard to whether the user has the time and/or desire to trace additional character(s) 104/304 or segment(s) 410 and/or whether any segments 410 remain to be traced for a grooved character 104/304 that comprises multiple segments 410. In some aspects, the user may decide to repeat the tracing of one or more previously traced grooved character(s) 104/304 and/or segment(s) 410. If the determination is affirmative, process 500 proceeds back to step 506. If the determination is negative, process 500 proceeds to step 512.

At step 512, the user prepares handwriting learning apparatus 100 for storage and/or cleaning. This may involve, by way of example and not limitation, at least partially disassembling handwriting learning apparatus 100, securing insertion device 206 back into slot 210, and/or placing handwriting learning apparatus 100 into one or more storage containers, such as, by way of example and not limitation, a box, receptacle, and/or bag, as well as any similar container(s) as may be apparent to those skilled the relevant art(s) after reading the description herein. Such container(s) may completely or partially contain at least one portion of handwriting learning apparatus 100.

The disassembling of handwriting learning apparatus 100 may at least partially comprise, by way of example and not limitation, removing medium 102 from casing component 202 and/or removing secondary medium 302 from medium 102 and/or casing component 202. By way of further example and not limitation, the various portions of handwriting learning apparatus 100 may be separated by being pulled apart in order to disengage and/or separate one or more catches, detents, tabs, ridges, channels, grooves, nooks, adhesives, hook-and-loop fasteners, and/or similar structures and/or mechanisms associated or integrated with medium 102, casing component 202, and/or secondary medium 302 as may be apparent to those skilled in the relevant art(s) after reading the description herein. Additionally, by way of yet further example and not limitation, medium 102, casing component 202, and/or secondary medium 302 may be disassembled from each other by disengaging one or more nails, nuts, bolts, screws, washers, clips, clamps, clasps, hooks, pins, brackets, and/or similar connective and/or fastening elements that may be used to keep the various portions of handwriting learning apparatus 100 secured together as may be apparent to those skilled in the relevant art(s) after reading the description herein. By way of still further example and not limitation, insertion device 206 may be secured into slot 210 by being pushed, snapped, and/or slid therein and then held in place via a friction fit; via one or more structures and/or mechanisms such as one or more catches, detents, tabs, ridges, channels, grooves, nooks, crannies, and the like; and/or via one or more connective and/or fastening elements such as one or more nails, nuts, bolts, screws, washers, clips, clamps, clasps, hooks, pins, brackets, adhesives, hook-and-loop fasteners, and the like.

Handwriting learning apparatus 100 may be cleaned using any appropriate cleaning material(s) and/or technique(s) as may be apparent to those skilled in the relevant art(s) after reading the description herein, including being wiped with a damp cloth or disinfecting wipe, being soaked in water (if appropriate), being swept for dust, and the like. In some aspects, any computer processors, computer components, software modules, and/or other electronic components included with handwriting learning apparatus 100 may be separated or removed therefrom prior to cleaning in order to prevent or minimize damage to those element(s).

Once handwriting learning apparatus 100 has been prepared for storage and/or has been cleaned, it may be placed in a proper storage location, such as a shelf, drawer, or other appropriate location as may be apparent to those skilled in the relevant art(s) after reading the description herein.

At step 514 process 500 is terminated and process 500 ends.

Figure 6:
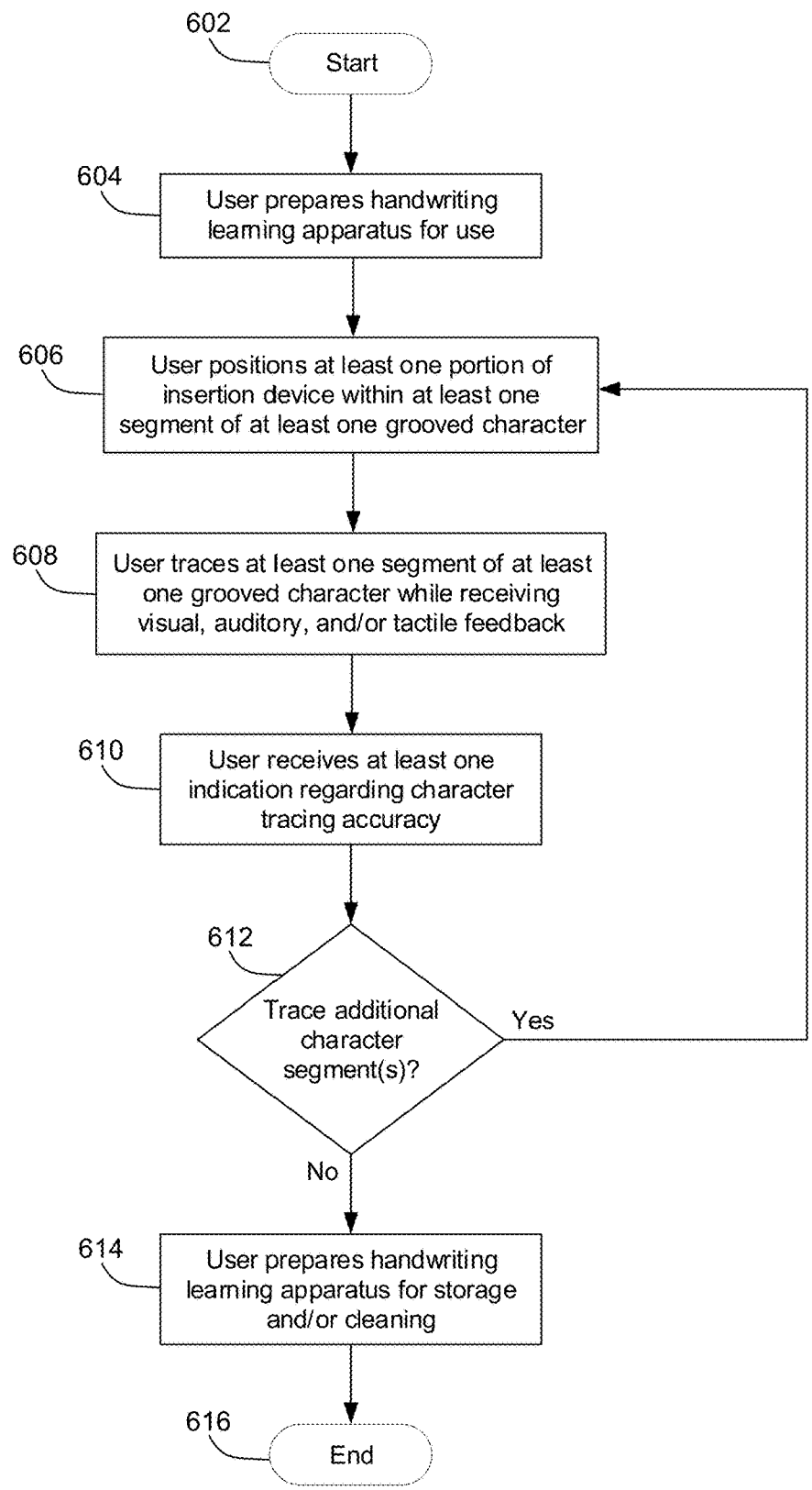
FIG. 6 is a flowchart illustrating an exemplary process for using a handwriting learning apparatus to learn how to correctly and/or preferably form at least one character while receiving at least one indication regarding character formation accuracy, according to an aspect of the present disclosure.

Referring now to FIG. 6, a flowchart illustrating an exemplary process 600 for using handwriting learning apparatus 100 to learn how to correctly and/or preferably form at least one character while receiving at least one indication regarding character formation accuracy, according to an aspect of the present disclosure, is shown.

Process 600 may begin at step 602 with control passing immediately to step 604.

At step 604, a user prepares handwriting learning apparatus 100 (not shown in FIG. 6) for use. In some aspects, by way of example and not limitation, this may involve the user removing handwriting learning apparatus 100 from a storage location and/or assembling at least one portion of handwriting learning apparatus 100. By way of further example and not limitation, in some additional aspects, handwriting learning apparatus 100 may be at least partially assembled by attaching medium 102 (not shown in FIG. 6) to casing component 202 (not shown in FIG. 6) and/or attaching secondary medium 302 (not shown in FIG. 6) to medium 102 and, when applicable, to casing component 202. In some nonlimiting exemplary embodiments, medium 102 may be attached to casing component 202 by being received by recessed area 204 (not shown in FIG. 6). By way of still further example and not limitation, recessed area 204 may receive medium 102 when side(s) 112 (not shown in FIG. 6) and (if applicable) corner(s) 110 (not shown in FIG. 6) of medium 102 substantially line up with side portion(s) 214 (not shown in FIG. 6) and (if applicable) corner(s) 216 (not shown in FIG. 6) of casing component 202. In some additional aspects, medium 102 may be snapped, locked, or otherwise secured into place within recessed area 204 using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein.

In some additional nonlimiting exemplary embodiments, secondary medium 302 may be secured to a front surface portion of medium 102 such that side(s) 308 (not shown in FIG. 6) and (if applicable) corner(s) 306 (not shown in FIG. 6) of secondary medium 302 substantially line up with side(s) 112 and (if applicable) corner(s) 110 of medium 102. By way of example and not limitation, secondary medium 302 may be snapped, locked, or otherwise secured into place upon medium 102 by using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein. In still some additional aspects, secondary medium 302 may be secured to a front surface portion of medium 102 such that side(s) 308 and (if applicable) corner(s) 306 of secondary medium 302 also substantially line up with side portion(s) 214 and (if applicable) corner(s) 216 of casing component 202. In such aspects, secondary medium 302 may be snapped, locked, or otherwise secured into place upon and/or within casing component 202 by using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein.

In some aspects, the user may also need to remove insertion device 206 (not shown in FIG. 6) from a storage location within or upon handwriting learning apparatus 100, such as, by way of example and not limitation, from within slot 210 (not shown in FIG. 6) integrated with or secured to medium 102, secondary medium 302, and/or casing component 202. In some instances, to assist with the removal of insertion device 206 from slot 210, the user may use retrieval recess 212 (not shown in FIG. 6) to help grip or grasp insertion device 206 and/or obtain better leverage to pry and/or pull insertion device 206 from slot 210, such as, for example and not limitation, by using a portion of one or more of the user's fingers, a portion of the user's thumb(s), and/or one or more tools.

In some aspects, the user may also need to remove handwriting learning apparatus 100 from one or more storage containers, such as, by way of example and not limitation, a box, receptacle, and/or bag, as well as any similar container(s) as may be apparent to those skilled the relevant art(s) after reading the description herein. Such container(s) may completely or partially contain at least one portion of handwriting learning apparatus 100.

In some aspects, such as when handwriting learning apparatus 100 may comprise one or more computer processors, computer components, software modules, and/or other electronic components, handwriting learning apparatus 100 may require the receipt of at least one form of user authentication prior to use. By way of example and not limitation, such user authentication may comprise the user submitting a username, password, passcode, key code, pin number, visual identification, facial recognition, fingerprint scan, retinal scan, voice authentication, and/or any similar identifying and/or security elements as may be apparent to those skilled in the relevant art(s) after reading the description herein as being able to securely determine the identity of the user.

Once handwriting learning apparatus 100 has been prepared for use, process 600 proceeds to step 606.

At step 606, the user positions at least one portion of insertion device 206, such as, by way of example and not limitation, distal end 208 (not shown in FIG. 6) within at least one portion or segment 410 (not shown in FIG. 6) of at least one grooved character 104 to be traced, typically at a start location 404 (not shown in FIG. 6) associated therewith. In aspects wherein handwriting learning apparatus 100 may comprise a secondary medium 302, at least one portion of insertion device 206 may also be positioned within at least one portion or segment 410 of at least one grooved character 304 (not shown in FIG. 6) to be traced, typically at a start location 404 associated therewith.

As a nonlimiting example, insertion device 206 may be held within the user's hand (typically in the user's writing hand) in a relatively vertical orientation substantially perpendicular to medium 102, casing component 202 (if applicable), secondary medium 302 (if applicable), and/or handwriting learning apparatus 100, generally. By way of example and not limitation, in some aspects, the user may push insertion device 206 into grooved character(s) 104 (and, if applicable, 304) and/or at least one portion or segment 410 thereof until at least one portion of insertion device 206 (such as, for example, distal end 208) makes physical contact with a portion of casing component 202 and/or the top surface portion of one or more supplementary devices, such as, by way of further example and not limitation, a piece of paper, a dry-erase board, a chalkboard, an interactive whiteboard (such as, for example and not limitation, a SMART Board® available from the Smart Technologies Corporation of Calgary, Alberta, Canada), an interactive touchscreen monitor, a tablet computer surface or device, a smartphone, and the like.

At step 608, the user engages in the tracing of at least one grooved character 104 (and 304, if applicable) and/or at least one portion or segment 410 thereof by sliding insertion device 206 therein, typically from a grooved character 104 (and 304, if applicable) and/or segment 410 start location 404 to a grooved character 104 (and 304, if applicable) and/or segment 410 end location 406 (not shown in FIG. 6). While engaging in such tracing, the user may experience at least one of: visual feedback; auditory feedback; and sensory, tactile, haptic, or kinesthetic feedback.

Visually, the user may see a character 104 (and 304, if applicable) and/or at least one portion or segment 410 thereof while it is being traced. Additionally, in some aspects, lighting element(s) 222 may illuminate sequentially to indicate to the user how a given grooved character 104/304 and/or segment 410 thereof is to be correctly and/or preferably traced by illuminating, for example and not limitation, the next portion or segment 410 of the grooved character 104/304 to be traced (or the next portion of such portion or segment 410 to be traced). Additionally, the user may hear one or more noises (such as, by way of example and not limitation, a clicking sound) as at least one portion of insertion device 206 (such as, for example and not limitation, distal end 208) physically contacts and interacts with at least one portion of one or more protruding elements 108 (not shown in FIG. 6) as it slidably moves past protruding element(s) 108 while temporarily displacing at least one portion of each of protruding element(s) 108. One or more audio emitting devices 224 may also provide one or more forms of audio feedback such as, by way of example and not limitation, a chime or bell ring that may be played when/as the user performs a correct tracing, a buzzer or beep that may be played when/as the user performs an incorrect tracing, and phrases in various languages such as "Good job!", "You can do it!", "Trace the letter 'A'," and the like to encourage, motivate, and/or direct the user. Furthermore, the user may experience sensory/tactile/haptic/kinesthetic feedback as at least one portion of insertion device 206 (such as, for example and not limitation, distal end 208) physically contacts and interacts with at least one portion of one or more protruding elements 108 as it slidably moves past protruding element(s) 108 and temporarily at least partially displaces at least one portion of each of protruding element(s) 108, thereby causing insertion device 206 to experience one or more vibratory and/or similar sensations that may be felt by the user's finger(s), thumb(s), hand(s), and/or similar body part(s). The physical act of tracing a given grooved character 104/304 and/or segment 410 thereof may add to the user's kinesthetic learning experience. Additionally, one or more sensory devices may also provide one or more forms of sensory/tactile/haptic/kinesthetic feedback, such as, by way of example and not limitation, one or more sensory devices that may produce various soft, short, intense, and/or long vibrations and/or pulsations in various sequences. By stimulating multiple senses during the learning of one or more correct and/or preferred character formation techniques, the user may be more likely to absorb and retain knowledge of the correct and/or preferred technique(s) in a timely and/or efficient manner, thereby increasing cognitive learning efficiency and effectiveness of the technique(s).

At step 610, the user receives at least one indication regarding an accuracy evaluation of at least one attempt to trace one or more grooved characters 104 (and 304, if applicable) and/or at least one portion or segment 410 thereof in the form of, by way of example and not limitation, one or more letters, numbers, punctuation marks, sounds (e.g., digraphs), geometric shapes, and/or symbols. In some nonlimiting exemplary embodiments, the accuracy evaluation may comprise at least one indication of a correct tracing of one or more grooved characters 104 (and 304, if applicable) and/or at least one portion or segment 410 thereof or an indication of an incorrect tracing of one or more grooved characters 104 (and 304, if applicable) and/or at least one portion or segment 410 thereof. By way of example and not limitation, such indication may comprise at least one output from at least one indicator device, such as at least one illumination and/or other visual output from lighting element(s) 222, at least one form of audio output from audio emitting device(s) 224, and/or at least one tactile output (such as a vibration and/or pulsation) from at least one sensory device. In some additional nonlimiting exemplary embodiments, lighting element(s) 222 may display at least one green light illumination when a grooved character 104/304 and/or at least one portion or segment 410 thereof is being or has been traced correctly, and may display no light or at least one red light illumination when a grooved character 104/304 and/or at least one portion or segment 410 thereof has been or is being traced incompletely and/or incorrectly (such as, for example and not limitation, the user did not start and/or stop the tracing at the correct/preferred start location 404 and/or end location 406, and/or the user incorrectly removed insertion device 206 from and then reinserted it into a grooved character 104/304 and/or at least one portion or segment 410 thereof during a tracing attempt). In some additional aspects, lighting element(s) 222 may be configured to be illuminated as the user traces a particular grooved character 104/304 and/or at least one portion or segment 410 thereof; and, in such aspects, by way of example and not limitation, lighting element(s) 222 may comprise a meter or bar form that gets fuller and/or brighter as more lighting elements 222 become illuminated as the user's tracing of the grooved character 104/304 and/or at least one portion or segment 410 thereof progresses and/or lighting element(s) 222 may be configured behind grooved character(s) 104/304 and/or at least one portion or segment 410 thereof and such lighting element(s) 222 may be configured to become illuminated so as to correspond to the portion(s) or segment(s) 410 of grooved character(s) 104 that have been successfully traced.

In some additional nonlimiting exemplary embodiments, audio emitting device(s) 224 may be configured to produce various sounds to indicate to the user when the tracing of a grooved character 104/304 and/or at least one portion or segment 410 thereof is being or has been done correctly or incorrectly. By way of example and not limitation, such sounds may comprise a chime sound that may be played when a grooved character 104/304 and/or at least one portion or segment 410 thereof has been or is being traced correctly and/or a buzzer sound that may be played when a grooved character 104/304 and/or at least one portion or segment 410 thereof has been or is being traced incorrectly. By way of further example and not limitation, audio emitting device(s) 224 may be configured to play one or more phrases in various languages to the user to indicate correct/preferred, incorrect, and/or incomplete character 104/304 and/or segment 410 tracing attempts and/or to encourage, motivate, and/or direct the user, wherein such phrases may include, for example and not imitation, the name of the grooved character 104/304 being traced, "Good job!", "You can do it!", "Almost there!", and "Good try!". By way of still further example and not limitation, one or more sensory devices may be configured to indicate to the user when the tracing of a grooved character 104/304 and/or at least one portion or segment 410 thereof is being or has been done correctly or incorrectly. By way of yet further example and not limitation, relatively soft, short, and/or quick vibrations and/or pulsations may be produced by the sensory devices in various sequences when/as the user performs a correct tracing, while longer, harder, and/or more intense vibrations and/or pulsations may be produced in various sequences when/as the user performs an incorrect tracing.

In some aspects, the accuracy evaluation of the at least one attempt to trace one or more grooved characters 104 (and 304, if applicable) and/or one or more portions or segments 410 thereof may be at least partially based on at least one detection made by at least one sensing device (such as, for example and not limitation, one or more motion detectors, one or more pressure sensors, one or more proximity sensors, one or more position sensors, and the like) which may be communicatively coupled (such as, for example and not limitation, via wireless connectivity (e.g., via one or more Bluetooth® (a wireless technology standard standardized as IEEE 802.15.1) transceivers or antennas), via hardwired connectivity, or via direct integration to/with at least one portion of at least one grooved character 104 (and 304, if applicable) (such as a start location 404 and/or end location 406 thereof), to at least one portion of at least one segment 410 (such as a start location 404 and/or end location 406 thereof) of at least one grooved character 104, to at least one portion of at least one protruding element 108, to at least one portion of insertion device 206, to at least one computer processor, to at least one computer component, to at least one software module, to at least one portion of medium 102 (and/or at least one portion of secondary medium 302, if applicable), to at least one portion of casing component 202, and/or to any other appropriate portion(s) and/or component(s) of handwriting learning apparatus 100 as may be apparent to those skilled in the relevant art(s) after reading the description herein. The sensing device(s) may be housed within any appropriate portion of medium 102 (and/or any appropriate portion of secondary medium 302, (if applicable), casing component 202 (if applicable), insertion device 206, and/or any other appropriate portion(s) of handwriting learning apparatus 100 as may be apparent to those skilled in the relevant art(s) after reading the description herein. In some nonlimiting exemplary embodiments, the sensing device(s) may be configured to detect pressure (e.g., pressure applied by a user via insertion device 206), at least one physical presence (e.g., the physical presence of at least one portion of insertion device 206), friction (e.g., friction between insertion device 206 and one or more protruding elements 108 within at least one portion or segment 410 of at least one grooved character 104 and/or friction between insertion device 206 and one or more portions of at least one inner surface 106 of at least one grooved character 104 (and 304, if applicable) and/or at least one segment 410 thereof), and/or movement (e.g., the movement of at least one portion of insertion device 206) within and/or upon at least one portion of the one or more portions of handwriting learning apparatus 100 to which the sensing device(s) may be communicatively coupled. In order to communicate any accuracy evaluation(s) to the at least one indicator device, the sensing device(s) may also be communicatively coupled (such as, for example and not limitation, via wireless connectivity (e.g., via one or more Bluetooth® (a wireless technology standard standardized as IEEE 802.15.1) transceivers or antennas), via hardwired connectivity, or via direct integration) to/with the indicator device(s) when appropriate. In some additional aspects, the one or more computer processors, computer components, and/or software modules may include computational instructions, or code, that may be executed in order to, among other things, receive at least one detection from the sensing device(s), determine whether the detection(s) represent a correct or incorrect tracing of one or more grooved characters 104 (and 304, if applicable) and/or one or more portions or segments 410 thereof, and/or initiate at least one output from the indicator device(s) to present the character tracing accuracy evaluation(s) to the user by controlling the functioning of the indicator device(s) that may be included with handwriting learning apparatus 100.

At step 612, the user determines whether to trace more grooved character(s) 104 (and 304, if applicable) and/or one or more portion(s) or segment(s) 410 thereof. Such determination may be made at least partially with regard to whether the user has the time and/or desire to trace additional character(s) 104/304 or segment(s) 410 and/or whether any segments 410 remain to be traced for a grooved character 104/304 that comprises multiple segments 410. In some aspects, the user may decide to repeat the tracing of one or more previously traced grooved character(s) 104/304 and/or segment(s) 410. If the determination is affirmative, process 600 proceeds back to step 606. If the determination is negative, process 600 proceeds to step 614.

At step 614, the user prepares handwriting learning apparatus 100 for storage and/or cleaning. This may involve, by way of example and not limitation, at least partially disassembling handwriting learning apparatus 100, securing insertion device 206 back into slot 210, and/or placing handwriting learning apparatus 100 into one or more storage containers, such as, by way of example and not limitation, a box, receptacle, and/or bag, as well as any similar container(s) as may be apparent to those skilled in the relevant art(s) after reading the description herein. Such container(s) may completely or partially contain at least one portion of handwriting learning apparatus 100.

The disassembling of handwriting learning apparatus 100 may at least partially comprise, by way of example and not limitation, removing medium 102 from casing component 202 and/or removing secondary medium 302 from medium 102 and/or casing component 202. By way of further example and not limitation, the various portions of handwriting learning apparatus 100 may be separated by being pulled apart in order to disengage and/or separate one or more catches, detents, tabs, ridges, channels, grooves, nooks, adhesives, hook-and-loop fasteners, and/or similar structures and/or mechanisms associated or integrated with medium 102, casing component 202, and/or secondary medium 302 as may be apparent to those skilled in the relevant art(s) after reading the description herein. Additionally, by way of yet further example and not limitation, medium 102, casing component 202, and/or secondary medium 302 may be disassembled from each other by disengaging one or more nails, nuts, bolts, screws, washers, clips, clamps, clasps, hooks, pins, brackets, and/or similar connective and/or fastening elements that may be used to keep the various portions of handwriting learning apparatus 100 secured together as may be apparent to those skilled in the relevant art(s) after reading the description herein. By way of still further example and not limitation, insertion device 206 may be secured into slot 210 by being pushed, snapped, and/or slid therein and then held in place via a friction fit; via one or more structures and/or mechanisms such as one or more catches, detents, tabs, ridges, channels, grooves, nooks, crannies, and the like; and/or via one or more connective and/or fastening elements such as one or more nails, nuts, bolts, screws, washers, clips, clamps, clasps, hooks, pins, brackets, adhesives, hook-and-loop fasteners, and the like.

Handwriting learning apparatus 100 may be cleaned using any appropriate cleaning material(s) and/or technique(s) as may be apparent to those skilled in the relevant art(s) after reading the description herein, including being wiped with a damp cloth or disinfecting wipe, being soaked in water (if appropriate), being swept for dust, and the like. In some aspects, any computer processors, computer components, software modules, and/or other electronic components included with handwriting learning apparatus 100 may be separated or removed therefrom prior to cleaning in order to prevent or minimize damage to those element(s).

Once handwriting learning apparatus 100 has been prepared for storage and/or has been cleaned, it may be placed in a proper storage location, such as a shelf, drawer, or other appropriate location as may be apparent to those skilled in the relevant art(s) after reading the description herein.

At step 616, process 600 is terminated and process 600 ends.

Figure 7:
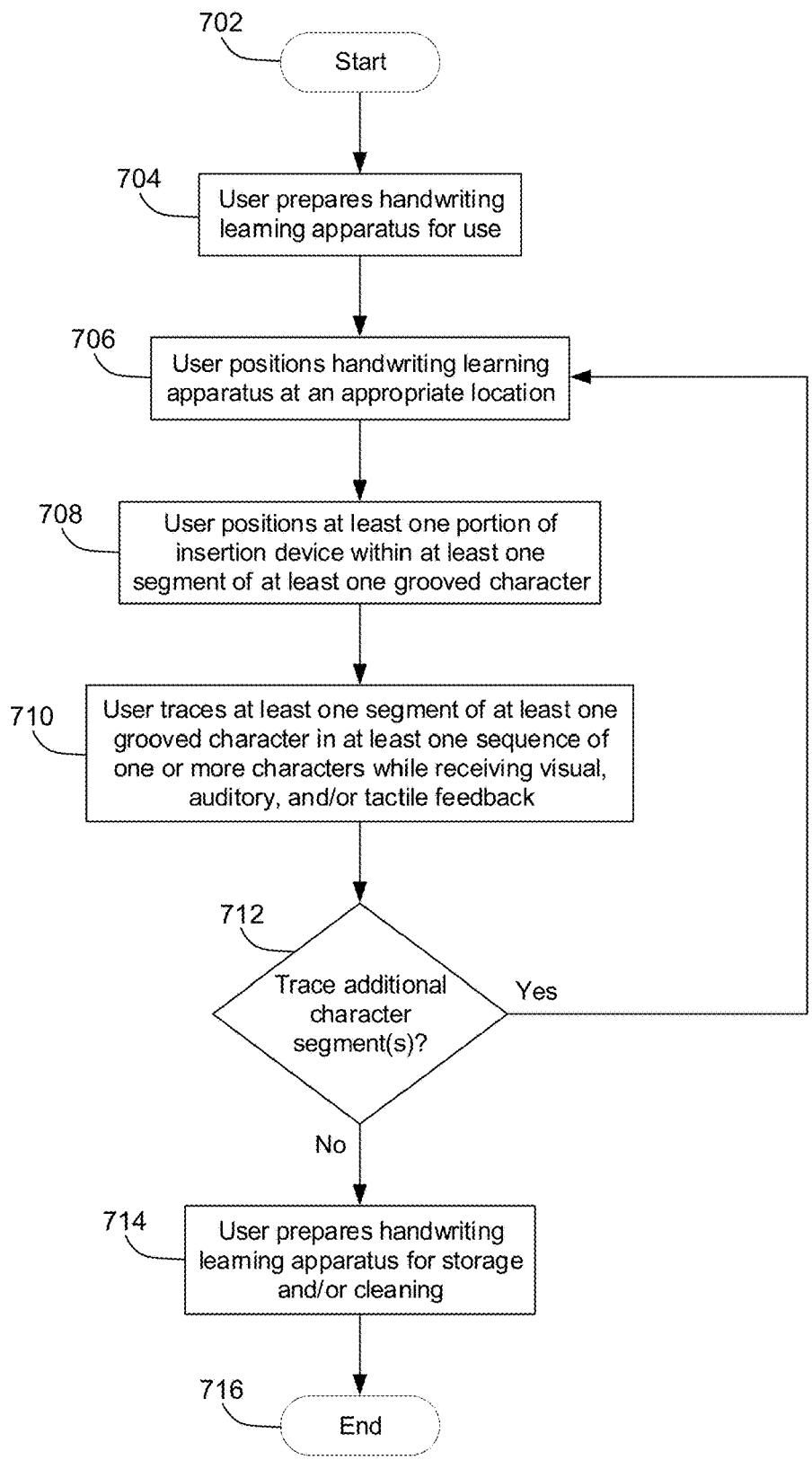
FIG. 7 is a flowchart illustrating an exemplary process for using a handwriting learning apparatus to learn how to correctly and/or preferably form one or more characters that comprise one or more words, numbers, sounds (e.g., digraphs), and/or sentences, according to an aspect of the present disclosure.

Referring now to FIG. 7, a flowchart illustrating an exemplary process 700 for using handwriting learning apparatus 100 to learn how to correctly and/or preferably form one or more characters that comprise one or more words, numbers, sounds (e.g., digraphs), and/or sentences, according to an aspect of the present disclosure, is shown.

Process 700 begins at step 702 with control passing immediately to step 704.

At step 704, a user prepares handwriting learning apparatus 100 (not shown in FIG. 7) for use. In some aspects, by way of example and not limitation, this may involve the user removing handwriting learning apparatus 100 from a storage location and/or assembling at least one portion of handwriting learning apparatus 100. By way of further example and not limitation, in some additional aspects, handwriting learning apparatus 100 may be at least partially assembled by attaching medium 102 (not shown in FIG. 7) to casing component 202 (not shown in FIG. 7) and/or attaching secondary medium 302 (not shown in FIG. 7) to medium 102 and, when applicable, to casing component 202. In some nonlimiting exemplary embodiments, medium 102 may be attached to casing component 202 by being received by recessed area 204 (not shown in FIG. 7). By way of still further example and not limitation, recessed area 204 may receive medium 102 when side(s) 112 (not shown in FIG. 7) and (if applicable) corner(s) 110 (not shown in FIG. 7) of medium 102 substantially line up with side portion(s) 214 (not shown in FIG. 7) and (if applicable) corner(s) 216 (not shown in FIG. 7) of casing component 202. In some additional aspects, medium 102 may be snapped, locked, or otherwise secured into place within recessed area 204 using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein.

In some additional nonlimiting exemplary embodiments, secondary medium 302 may be secured to a front surface portion of medium 102 such that side(s) 308 (not shown in FIG. 7) and (if applicable) corner(s) 306 (not shown in FIG. 7) of secondary medium 302 substantially line up with side(s) 112 and (if applicable) corner(s) 110 of medium 102. By way of example and not limitation, secondary medium 302 may be snapped, locked, or otherwise secured into place upon medium 102 by using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein. In still some additional aspects, secondary medium 302 may be secured to a front surface portion of medium 102 such that side(s) 308 and (if applicable) corner(s) 306 of secondary medium 302 also substantially line up with side portion(s) 214 and (if applicable) corner(s) 216 of casing component 202. In such aspects, secondary medium 302 may be snapped, locked, or otherwise secured into place upon and/or within casing component 202 by using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein.

In some aspects, the user may also need to remove insertion device 206 (not shown in FIG. 7) from a storage location within or upon handwriting learning apparatus 100, such as, by way of example and not limitation, from within slot 210 (not shown in FIG. 7) integrated with or secured to medium 102, secondary medium 302, and/or casing component 202. In some instances, to assist with the removal of insertion device 206 from slot 210, the user may use retrieval recess 212 (not shown in FIG. 7) to help grip or grasp insertion device 206 and/or obtain better leverage to pry and/or pull insertion device 206 from slot 210, such as, for example and not limitation, by using a portion of one or more of the user's fingers, a portion of the user's thumb(s), and/or one or more tools.

In some aspects, the user may also need to remove handwriting learning apparatus 100 from one or more storage containers, such as, by way of example and not limitation, a box, receptacle, and/or bag, as well as any similar container(s) as may be apparent to those skilled the relevant art(s) after reading the description herein. Such container(s) may completely or partially contain at least one portion of handwriting learning apparatus 100.

Once handwriting learning apparatus 100 has been prepared for use, process 700 proceeds to step 706.

At step 706, the user positions handwriting learning apparatus 100 at an appropriate location. By way of example and not limitation, an appropriate location may comprise at least one portion of any surface or may comprise a position at least partially upon one or more supplementary devices upon which one or more words, numbers, sounds (e.g., digraphs), and/or sentences are to be traced and/or written by leaving a physical and/or digital mark. If a word/number/sound/sentence has already been at least partially completed, then an appropriate location may comprise positioning handwriting learning apparatus 100 such that the next character of the word/number/sound/sentence, when traced and/or written, may appear adjacent to the last grooved character 104 (or a portion or segment 410 thereof) of the word/number/sound/sentence that was previously traced and/or written, such as on the right side thereof. If no supplementary devices are being used, then any location may be appropriate for handwriting learning apparatus 100, including at least one portion of one or more at least partially rigid surfaces. Other appropriate locations may be used for handwriting learning apparatus 100 as well as may be apparent to those skilled in the relevant art(s) after reading the description herein.

At step 708, the user positions at least one portion of insertion device 206, such as, by way of example and not limitation, distal end 208 (not shown in FIG. 7) within at least one portion or segment 410 (not shown in FIG. 7) of at least one grooved character 104 to be traced, typically at a start location 404 (not shown in FIG. 7) associated therewith. In some aspects, the at least one grooved character 104 to be traced may comprise, by way of example and not limitation, at least one letter in at least one sequence to form a combination that represents of at least one sound (e.g., such as a digraph); at least one letter in at least one sequence to form at least one word, such as, by way of further example and not limitation, at least one word from the Dolch sight word list and/or at least one word of any language; at least one number in at least one sequence to form at least one single and/or multidigit number; and/or at least one word, number, sound (e.g., digraph), punctuation mark, and/or symbol in at least one sequence to form at least one sentence. In aspects wherein handwriting learning apparatus 100 may comprise a secondary medium 302, at least one portion of insertion device 206 may also be positioned within at least one portion or segment 410 of at least one grooved character 304 (not shown in FIG. 7) to be traced, typically at a start location 404 associated therewith.

As a nonlimiting example, insertion device 206 may be held within the user's hand (typically in the user's writing hand) in a relatively vertical orientation substantially perpendicular to medium 102, casing component 202 (if applicable), secondary medium 302 (if applicable), and/or handwriting learning apparatus 100, generally. By way of example and not limitation, in some aspects, the user may push insertion device 206 into grooved character(s) 104 (and, if applicable, 304) and/or at least one portion or segment 410 thereof until at least one portion of insertion device 206 (such as, for example, distal end 208) makes physical contact with a portion of casing component 202 and/or the top surface portion of one or more supplementary devices, such as, by way of further example and not limitation, a piece of paper, a dry-erase board, a chalkboard, an interactive whiteboard (such as, for example and not limitation, a SMART Board® available from the Smart Technologies Corporation of Calgary, Alberta, Canada), an interactive touchscreen monitor, a tablet computer surface or device, a smartphone, and the like.

At step 710, the user engages in the tracing of at least one grooved character 104 (and 304, if applicable) and/or at least one portion or segment 410 thereof by sliding insertion device 206 therein, typically from a grooved character 104 (and 304, if applicable) and/or segment 410 start location 404 to a grooved character 104 (and 304, if applicable) and/or segment 410 end location 406 (not shown in FIG. 7). By way of example and not limitation, the at least one grooved character 104 (and 304, if applicable) may comprise at least one letter in at least one sequence to form a combination that represents at least one sound (e.g., such as a digraph), at least one letter in at least one sequence to form at least one word such as, by way of further example and not limitation, at least one word from the Dolch sight word list and/or at least one word of any language; at least one number in at least one sequence to form at least one single and/or multidigit number; and/or at least one word, number, punctuation mark, sound (e.g., digraph), and/or symbol in at least one sequence to form at least one sentence. While engaging in such tracing, the user may experience at least one of: visual feedback, auditory feedback, and sensory, tactile, haptic, or kinesthetic feedback.

Visually, the user may see a character 104 (and 304, if applicable) and/or at least one portion or segment 410 thereof while it is being traced. Additionally, the user may hear one or more noises (such as, by way of example and not limitation, a clicking sound) as at least one portion of insertion device 206 (such as, for example and not limitation, distal end 208) physically contacts and interacts with at least one portion of one or more protruding elements 108 (not shown in FIG. 7) as it slidably moves past protruding element(s) 108 while temporarily displacing at least one portion of each of protruding element(s) 108. One or more audio emitting devices 224 may also provide one or more forms of audio feedback such as, by way of example and not limitation, a chime or bell ring that may be played when/as the user performs a correct tracing, a buzzer or beep that may be played when/as the user performs an incorrect tracing, and phrases in various languages such as "Good job!", "You can do it!", "Trace the letter 'A'," and the like to encourage, motivate, and/or direct the user. By way of further example and not limitation, audio emitting device(s) 224 may provide audio feedback in the form of stating a word, number, sound (e.g., digraph), and/or sentence that has been successfully traced upon successful completion of tracing of the last character of the word/number/sound/sentence. Furthermore, the user may experience sensory/tactile/haptic/kinesthetic feedback as at least one portion of insertion device 206 (such as, for example and not limitation, distal end 208) physically contacts and interacts with at least one portion of one or more protruding elements 108 as it slidably moves past protruding element(s) 108 and temporarily at least partially displaces at least one portion of each of protruding element(s) 108, thereby causing insertion device 206 to experience one or more vibratory and/or similar sensations that may be felt by the user's finger(s), thumb(s), hand(s), and/or similar body part(s). The physical act of tracing a given grooved character 104/304 and/or segment 410 thereof may add to the user's kinesthetic learning experience. By stimulating multiple senses during the learning of one or more correct and/or preferred character formation techniques, the user may be more likely to absorb and retain knowledge of the correct/preferred technique(s), thereby increasing cognitive learning efficiency and effectiveness of the technique(s).

At step 712, the user determines whether to trace more grooved character(s) 104 (and 304, if applicable) and/or one or more portions or segments 410 thereof. Such determination may be made at least partially with regard to whether the user has the time and/or desire to trace additional character(s) 104/304 or segment(s) 410 thereof, whether any segments 410 remain to be traced for a grooved character 104/304 that comprises multiple segments 410, and/or whether any more character(s) 104/304 or segment(s) 410 thereof remain in the form of letters, numbers, punctuation marks, and/or symbols in a sequence of one or more words, numbers, sounds (e.g., digraphs), and/or sentences being traced. In some aspects, the user may decide to repeat the tracing of one or more previously traced grooved character(s) 104/304 or segment(s) 410 thereof (including one or more character(s) 104/304 or segment(s) 410 thereof in the form of one or more letters, numbers, punctuation marks, and/or symbols in a sequence of one or more previously traced words, numbers, sounds (e.g., digraphs, and/or sentences). If the determination is affirmative, process 700 proceeds back to step 706. If the determination is negative, process 700 proceeds to step 714.

At step 714, the user prepares handwriting learning apparatus 100 for storage and/or cleaning. This may involve, by way of example and not limitation, at least partially disassembling handwriting learning apparatus 100, securing insertion device 206 back into slot 210, and/or placing handwriting learning apparatus 100 into one or more storage containers, such as, by way of example and not limitation, a box, receptacle, and/or bag, as well as any similar container(s) as may be apparent to those skilled the relevant art(s) after reading the description herein. Such container(s) may completely or partially contain at least one portion of handwriting learning apparatus 100.

The disassembling of handwriting learning apparatus 100 may at least partially comprise, by way of example and not limitation, removing medium 102 from casing component 202 and/or removing secondary medium 302 from medium 102 and/or casing component 202. By way of further example and not limitation, the various portions of handwriting learning apparatus 100 may be separated by being pulled apart in order to disengage and/or separate one or more catches, detents, tabs, ridges, channels, grooves, nooks, adhesives, hook-and-loop fasteners, and/or similar structures and/or mechanisms associated or integrated with medium 102, casing component 202, and/or secondary medium 302 as may be apparent to those skilled in the relevant art(s) after reading the description herein. Additionally, by way of yet further example and not limitation, medium 102, casing component 202, and/or secondary medium 302 may be disassembled from each other by disengaging one or more nails, nuts, bolts, screws, washers, clips, clamps, clasps, hooks, pins, brackets, and/or similar connective and/or fastening elements that may be used to keep the various portions of handwriting learning apparatus 100 secured together as may be apparent to those skilled in the relevant art(s) after reading the description herein. By way of still further example and not limitation, insertion device 206 may be secured into slot 210 by being pushed, snapped, and/or slid therein and then held in place via a friction fit; via one or more structures and/or mechanisms such as one or more catches, detents, tabs, ridges, channels, grooves, nooks, crannies, and the like; and/or via one or more connective and/or fastening elements such as one or more nails, nuts, bolts, screws, washers, clips, clamps, clasps, hooks, pins, brackets, adhesives, hook-and-loop fasteners, and the like.

Handwriting learning apparatus 100 may be cleaned using any appropriate cleaning material(s) and/or technique(s) as may be apparent to those skilled in the relevant art(s) after reading the description herein, including being wiped with a damp cloth or disinfecting wipe, being soaked in water (if appropriate), being swept for dust, and the like. In some aspects, any computer processors, computer components, software modules, and/or other electronic components included with handwriting learning apparatus 100 may be separated or removed therefrom prior to cleaning in order to prevent or minimize damage to those element(s).

Once handwriting learning apparatus 100 has been prepared for storage and/or has been cleaned, it may be placed in a proper storage location, such as a shelf, drawer, or other appropriate location as may be apparent to those skilled in the relevant art(s) after reading the description herein.

At step 716, process 700 is terminated and process 700 ends.

Figure 8:
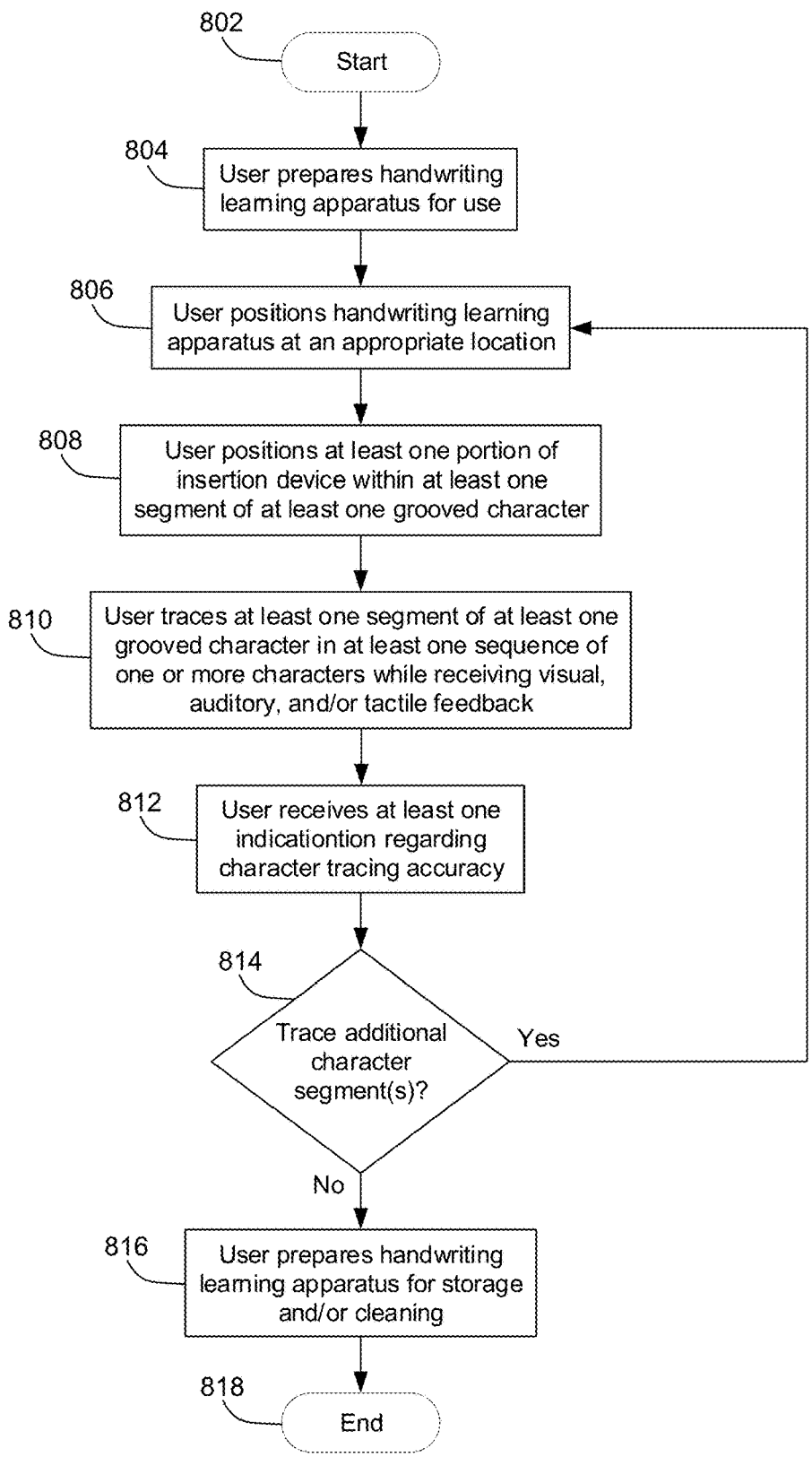
FIG. 8 is a flowchart illustrating an exemplary process for using a handwriting learning apparatus to learn how to correctly and/or preferably form one or more characters that comprise one or more words, numbers, sounds (e.g., digraphs), and/or sentences while receiving at least one indication regarding character formation accuracy, according to an aspect of the present disclosure.

Referring now to FIG. 8, a flowchart illustrating an exemplary process 800 for using handwriting learning apparatus 100 to learn how to correctly and/or preferably form one or more characters that comprise one or more words, numbers, sounds (e.g., digraphs), and/or sentences while receiving at least one indication regarding character formation accuracy, according to an aspect of the present disclosure, is shown.

Process 800 begins at step 802 with control passing immediately to step 804.

At step 804, a user prepares handwriting learning apparatus 100 (not shown in FIG. 8) for use. In some aspects, by way of example and not limitation, this may involve the user removing handwriting learning apparatus 100 from a storage location and/or assembling at least one portion of handwriting learning apparatus 100. By way of further example and not limitation, in some additional aspects, handwriting learning apparatus 100 may be at least partially assembled by attaching medium 102 (not shown in FIG. 8) to casing component 202 (not shown in FIG. 8) and/or attaching secondary medium 302 (not shown in FIG. 8) to medium 102 and, when applicable, to casing component 202. In some nonlimiting exemplary embodiments, medium 102 may be attached to casing component 202 by being received by recessed area 204 (not shown in FIG. 8). By way of still further example and not limitation, recessed area 204 may receive medium 102 when side(s) 112 (not shown in FIG. 8) and (if applicable) corner(s) 110 (not shown in FIG. 8) of medium 102 substantially line up with side portion(s) 214 (not shown in FIG. 8) and (if applicable) corner(s) 216 (not shown in FIG. 8) of casing component 202. In some additional aspects, medium 102 may be snapped, locked, or otherwise secured into place within recessed area 204 using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein.

In some additional nonlimiting exemplary embodiments, secondary medium 302 may be secured to a front surface portion of medium 102 such that side(s) 308 (not shown in FIG. 8) and (if applicable) corner(s) 306 (not shown in FIG. 8) of secondary medium 302 substantially line up with side(s) 112 and (if applicable) corner(s) 110 of medium 102. By way of example and not limitation, secondary medium 302 may be snapped, locked, or otherwise secured into place upon medium 102 by using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein. In still some additional aspects, secondary medium 302 may be secured to a front surface portion of medium 102 such that side(s) 308 and (if applicable) corner(s) 306 of secondary medium 302 also substantially line up with side portion(s) 214 and (if applicable) corner(s) 216 of casing component 202. In such aspects, secondary medium 302 may be snapped, locked, or otherwise secured into place upon and/or within casing component 202 by using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein.

In some aspects, the user may also need to remove insertion device 206 (not shown in FIG. 8) from a storage location within or upon handwriting learning apparatus 100, such as, by way of example and not limitation, from within slot 210 (not shown in FIG. 8) integrated with or secured to medium 102, secondary medium 302, and/or casing component 202. In some instances, to assist with the removal of insertion device 206 from slot 210, the user may use retrieval recess 212 (not shown in FIG. 8) to help grip or grasp insertion device 206 and/or obtain better leverage to pry and/or pull insertion device 206 from slot 210, such as, for example and not limitation, by using a portion of one or more of the user's fingers, a portion of the user's thumb(s), and/or one or more tools.

In some aspects, the user may also need to remove handwriting learning apparatus 100 from one or more storage containers, such as, by way of example and not limitation, a box, receptacle, and/or bag, as well as any similar container(s) as may be apparent to those skilled the relevant art(s) after reading the description herein. Such container(s) may completely or partially contain at least one portion of handwriting learning apparatus 100.

In some aspects, such as when handwriting learning apparatus 100 may comprise one or more computer processors, computer components, software modules, and/or other electronic components, handwriting learning apparatus 100 may require the receipt of at least one form of user authentication prior to use. By way of example and not limitation, such user authentication may comprise the user submitting a username, password, passcode, key code, pin number, visual identification, facial recognition, fingerprint scan, retinal scan, voice authentication, and/or any similar identifying and/or security elements as may be apparent to those skilled in the relevant art(s) after reading the description herein as being able to securely determine the identity of the user.

Once handwriting learning apparatus 100 has been prepared for use, process 800 proceeds to step 806.

At step 806, the user positions handwriting learning apparatus 100 at an appropriate location. By way of example and not limitation, an appropriate location may comprise at least one portion of any surface or may comprise a position at least partially upon one or more supplementary devices upon which one or more words, numbers, sounds (e.g., digraphs), and/or sentences are to be traced and/or written by leaving a physical and/or digital mark. If a word/number/sound/sentence has already been at least partially completed, then an appropriate location may comprise positioning handwriting learning apparatus 100 such that the next character of the word/number/sound/sentence, when traced and/or written, may appear adjacent to the last grooved character 104 (or a portion or segment 410 thereof) of the word/number/sound/sentence that was previously traced and/or written, such as on the right side thereof. If no supplementary devices are being used, then any location may be appropriate for handwriting learning apparatus 100, including at least one portion of one or more at least partially rigid surfaces. Other appropriate locations may be used as well as may be apparent to those skilled in the relevant art(s) after reading the description herein.

At step 808, the user positions at least one portion of insertion device 206, such as, by way of example and not limitation, distal end 208 (not shown in FIG. 8) within at least one portion or segment 410 (not shown in FIG. 8) of at least one grooved character 104 to be traced, typically at a start location 404 (not shown in FIG. 8) associated therewith. In some aspects, the at least one grooved character 104 to be traced may comprise, by way of example and not limitation, at least one letter in at least one sequence to form at least one word, such as, by way of further example and not limitation, at least one word from the Dolch sight word list and/or at least one word of any language; at least one number in at least one sequence to form at least one single and/or multidigit number; at least one letter in at least one sequence to form a combination that represents at least one sound (e.g., such as a digraph), and/or at least one word, number, punctuation mark, sound (e.g., digraph), and/or symbol in at least one sequence to form at least one sentence. In aspects wherein handwriting learning apparatus 100 may comprise a secondary medium 302, at least one portion of insertion device 206 may also be positioned within at least one portion or segment 410 of at least one grooved character 304 (not shown in FIG. 8) to be traced, typically at a start location 404 associated therewith.

As a nonlimiting example, insertion device 206 may be held within the user's hand (typically in the user's writing hand) in a relatively vertical orientation substantially perpendicular to medium 102, casing component 202 (if applicable), secondary medium 302 (if applicable), and/or handwriting learning apparatus 100, generally. By way of example and not limitation, in some aspects, the user may push insertion device 206 into grooved character(s) 104 (and, if applicable, 304) and/or at least one portion or segment 410 thereof until at least one portion of insertion device 206 (such as, for example, distal end 208) makes physical contact with a portion of casing component 202 and/or the top surface portion of one or more supplementary devices, such as, by way of further example and not limitation, a piece of paper, a dry-erase board, a chalkboard, an interactive whiteboard (such as, for example and not limitation, a SMART Board® available from the Smart Technologies Corporation of Calgary, Alberta, Canada), an interactive touchscreen monitor, a tablet computer surface or device, a smartphone, and the like.

At step 810, the user engages in the tracing of at least one grooved character 104 (and 304, if applicable) and/or at least one portion or segment 410 thereof by sliding insertion device 206 therein, typically from a grooved character 104 (and 304, if applicable) and/or segment 410 start location 404 to a grooved character 104 (and 304, if applicable) and/or segment 410 end location 406 (not shown in FIG. 8). By way of example and not limitation, the at least one grooved character 104 (and 304, if applicable) may comprise at least one letter in at least one sequence to form at least one word such as, by way of further example and not limitation, at least one word from the Dolch sight word list and/or at least one word of any language; at least one number in at least one sequence to form at least one single and/or multidigit number; at least one letter in at least one sequence to form a combination that represents at least one sound (e.g., such as a digraph); and/or at least one word, number, punctuation mark, sound (e.g., digraph), and/or symbol in at least one sequence to form at least one sentence. While engaging in such tracing, the user may experience at least one of: visual feedback, auditory feedback, and sensory, tactile, haptic, or kinesthetic feedback.

Visually, the user may see a character 104 (and 304, if applicable) and/or at least one portion or segment 410 thereof while it is being traced. Additionally, in some aspects, lighting element(s) 222 may illuminate sequentially to indicate to the user how a given grooved character 104/304 and/or segment 410 thereof is to be correctly and/or preferably traced by illuminating, for example and not limitation, the next portion or segment 410 of the grooved character 104/304 to be traced (or the next portion of such portion or segment 410 to be traced). In some additional aspects, lighting element(s) 222 may indicate to the user the order of grooved character(s) 104/304 in at least one sequence to be traced to form at least one word, number, sound (e.g., digraph), and/or sentence by illuminating, for example and not limitation, the next grooved character 104/304 to be traced in the sequence. Additionally, the user may hear one or more noises (such as, by way of example and not limitation, a clicking sound) as at least one portion of insertion device 206 (such as, for example and not limitation, distal end 208) physically contacts and interacts with at least one portion of one or more protruding elements 108 (not shown in FIG. 8) as it slidably moves past protruding element(s) 108 while temporarily displacing at least one portion of each of protruding element(s) 108. One or more audio emitting devices 224 may also provide one or more forms of audio feedback such as, by way of example and not limitation, a chime or bell ring that may be played when/as the user performs a correct tracing, a buzzer or beep that may be played when/as the user performs an incorrect tracing, and phrases in various languages such as "Good job!", "You can do it!", "Trace the letter 'A'," and the like to encourage, motivate, and/or direct the user. By way of further example and not limitation, audio emitting device(s) 224 may provide audio feedback in the form of stating a word, number, sound (e.g., digraph), and/or sentence that has been successfully traced upon successful completion of tracing of the last character of the word/number/sound/sentence. Furthermore, the user may experience sensory/tactile/haptic/kinesthetic feedback as at least one portion of insertion device 206 (such as, for example and not limitation, distal end 208) physically contacts and interacts with at least one portion of one or more protruding elements 108 as it slidably moves past protruding element(s) 108 and temporarily at least partially displaces at least one portion of each of protruding element(s) 108, thereby causing insertion device 206 to experience one or more vibratory or similar sensations that may be felt by the user's finger(s), thumb(s), hand(s), and/or similar body part(s). The physical act of tracing a given grooved character 104/304 and/or segment 410 thereof may add to the user's kinesthetic learning experience. By stimulating multiple senses during the learning of one or more correct and/or preferred character formation techniques, the user may be more likely to absorb and retain knowledge of the correct/preferred technique(s), thereby increasing cognitive learning efficiency and effectiveness of the technique(s).

At step 812, the user receives at least one indication regarding an accuracy evaluation of at least one grooved character 104 (and 304, if applicable) and/or at least one segment 410 tracing attempt and/or at least one attempt to trace one or more grooved characters 104 (and 304, if applicable) and/or one or more portions or segments 410 thereof in the form of one or more letters, numbers, punctuation marks, and/or symbols that comprise one or more words, numbers, sounds (e.g., digraphs), and/or sentences. In some nonlimiting exemplary embodiments, the accuracy evaluation may comprise at least one indication of a correct tracing of one or more grooved characters 104 (and 304, if applicable) and/or at least one portion or segment 410 thereof or an indication of an incorrect tracing of one or more grooved characters 104 (and 304, if applicable) and/or at least one portion or segment 410 thereof. By way of example and not limitation, such indication may comprise at least one output from at least one indicator device, such as at least one form of visual output such as, for example and not limitation, an illumination and/or animation presented via lighting element(s) 222, at least one form of audio output from audio emitting device(s) 224, and/or at least one form of tactile output (such as a vibration and/or pulsation) from at least one sensory device. In some additional nonlimiting exemplary embodiments, lighting element(s) 222 may display at least one green light illumination when a grooved character 104/304 (or word, number, sound (e.g., digraph), and/or sentence) and/or at least one portion or segment 410 thereof is being or has been traced correctly, and may display no light or at least one red light illumination when a grooved character 104/304 (or word, number, sound (e.g., digraph), and/or sentence) and/or at least one portion or segment 410 thereof has been or is being traced incompletely/incorrectly (such as, for example and not limitation, the user did not start and/or stop the tracing at the correct/preferred start location 404 and/or end location 406, and/or the user incorrectly removed insertion device 206 from and then reinserted it into a grooved character 104/304 and/or at least one portion or segment 410 thereof during a tracing attempt) and/or the user did not complete the tracing of all the grooved character(s) 104/304 and/or segment(s) 410 thereof that comprise a word, number, sound (e.g., digraph), and/or sentence that is being traced. In some additional aspects, lighting element(s) 222 may be configured to be illuminated as the user traces a particular grooved character 104/304 and/or at least one portion or segment 410 thereof and, in such aspects, by way of example and not limitation, lighting element(s) 222 may comprise, for example and not limitation, a meter or bar form that gets fuller and/or brighter as more lighting elements 222 become illuminated as the user's tracing of the grooved character 104/304 (or word, number, sound (e.g., digraph), and/or sentence) and/or at least one portion or segment 410 thereof progresses and/or lighting element(s) 222 may be configured behind grooved character(s) 104/304 and/or at least one portion or segment 410 thereof and such lighting element(s) 222 may be configured to become illuminated so as to correspond to the portion(s) or segment(s) 410 of grooved character(s) 104/304 (or word(s), number(s), sound(s) (e.g., digraph(s)), and/or sentence(s)) that have been successfully traced.

In some additional nonlimiting exemplary embodiments, audio emitting device(s) 224 may be configured to produce various sounds to indicate to the user when the tracing of a grooved character 104/304 (or word, number, sound (e.g., digraph) and/or sentence) and/or at least one portion or segment 410 thereof is being or has been done correctly or incorrectly. By way of example and not limitation, such sounds may comprise a chime and/or bell sound that may be played when a grooved character 104/304 (or word, number, sound (e.g., digraph) and/or sentence) and/or at least one portion or segment 410 thereof has been or is being traced correctly and/or a buzzer and/or beep sound that may be played when a grooved character 104/304 (or word, number, sound (e.g., digraph) and/or sentence) and/or at least one portion or segment 410 thereof has been or is being traced incorrectly. By way of further example and not limitation, audio emitting device(s) 224 may be configured to play one or more phrases in various languages to the user to indicate correct/preferred, incorrect, and/or incomplete character 104/304 (or word, number, sound (e.g., digraph), and/or sentence) and/or segment 410 tracing attempts and/or to encourage, motivate, and/or direct the user, wherein such phrases may include, for example and not limitation, the name of the grooved character 104/304 (or word, number, sound (e.g., digraph), and/or sentence) being traced, "Good job!", "You can do it!", "Almost there!", and "Good try!". By way of still further example and not limitation, one or more sensory devices may be configured to indicate to the user when the tracing of a grooved character 104/304 (or word, number, sound (e.g., digraph), and/or sentence) and/or at least one portion or segment 410 thereof is being or has been done correctly or incorrectly. By way of yet further example and not limitation, relatively soft, short, and/or quick vibrations and/or pulsations may be produced by the sensory device(s) in various sequences when/as the user performs a correct tracing, while longer, harder and/or more intense vibrations and/or pulsations may be produced in various sequences when/as the user performs an incorrect tracing.

In some aspects, the accuracy evaluation of the at least one attempt to trace one or more grooved characters 104 (and 304, if applicable) and/or one or more portions or segments 410 thereof may be at least partially based on at least one detection made by at least one sensing device (such as, for example and not limitation, one or more motion detectors, one or more pressure sensors, one or more proximity sensors, one or more position sensors, and the like) which may be communicatively coupled (such as, for example and not limitation, via wireless connectivity (e.g., via one or more Bluetooth® (a wireless technology standard standardized as IEEE 802.15.1) transceivers or antennas), via hardwired connectivity, or via direct integration) to/with at least one portion of at least one grooved character 104 (and 304, if applicable) (such as a start location 404 and/or end location 406 thereof), to at least one portion of at least one segment 410 (such as a start location 404 and/or end location 406 thereof), to at least one portion of at least one protruding element 108, to at least one portion of insertion device 206, to at least one computer processor, to at least one computer component, to at least one software module, to at least one portion of medium 102 (and/or at least one portion of secondary medium 302, if applicable), to at least one portion of casing component 202, and/or to any other appropriate portion(s) and/or component(s) of handwriting learning apparatus 100 as may be apparent to those skilled in the relevant art(s) after reading the description herein. The sensing device(s) may be housed within any appropriate portion of medium 102 (and/or at any appropriate portion of secondary medium 302, (if applicable), casing component 202 (if applicable), insertion device 206, and/or any other appropriate portion(s) of handwriting learning apparatus 100 as may be apparent to those skilled in the relevant art(s) after reading the description herein. In some nonlimiting exemplary embodiments, the sensing device(s) may be configured to detect pressure (e.g., pressure applied by a user via insertion device 206), at least one physical presence (e.g., the physical presence of at least one portion of insertion device 206), friction (e.g., friction between insertion device 206 and one or more protruding elements 108 within at least one portion or segment 410 of at least one grooved character 104 and/or friction between insertion device 206 and one or more portions of at least one inner surface 106 of at least one grooved character 104 (and 304, if applicable) and/or at least one segment 410 thereof), and/or movement (e.g., the movement of at least one portion of insertion device 206) within and/or upon at least one portion of the one or more portions of handwriting learning apparatus 100 to which the sensing device(s) may be communicatively coupled. In order to communicate any accuracy evaluation(s) to the at least one indicator device, the sensing device(s) may also be communicatively coupled (such as, for example and not limitation, via wireless connectivity (e.g., via one or more Bluetooth® (a wireless technology standard standardized as IEEE 802.15.1) transceivers or antennas), via hardwired connectivity, or via direct integration) to/with the indicator device(s) when appropriate. In some additional aspects, the one or more computer processors, computer components, and/or software modules may include computational instructions, or code, that may be executed in order to, among other things, receive at least one detection from the sensing device(s), determine whether the detection(s) represent a correct or incorrect tracing of one or more grooved characters 104 (and 304, if applicable) and/or one or more portions or segments 410 thereof, and/or initiate at least one output from the indicator device(s) to present the character tracing accuracy evaluation(s) to the user by controlling the functioning of the indicator device(s) that may be included with handwriting learning apparatus 100.

At step 814, the user determines whether to trace more grooved character(s) 104 (and 304, if applicable) and/or one or more portions or segments 410 thereof. Such determination may be made at least partially with regard to whether the user has the time and/or desire to trace additional character(s) 104/304 or segment(s) 410 thereof, whether any segments 410 remain to be traced for a grooved character 104/304 that comprises multiple segments 410, and/or whether any more character(s) 104/304 or segment(s) 410 thereof remain in the form of letters, numbers, punctuation marks, and/or symbols in a sequence of one or more words, numbers, sounds (e.g., digraphs), and/or sentences being traced. In some aspects, the user may decide to repeat the tracing of one or more previously traced grooved character(s) 104/304 or segment(s) 410 thereof (including one or more character(s) 104/304 or segment(s) 410 thereof in the form of one or more letters, numbers, punctuation marks, and/or symbols in a sequence of one or more previously traced words, numbers, sounds (e.g., digraphs, and/or sentences). If the determination is affirmative, process 800 proceeds back to step 806. If the determination is negative, process 800 proceeds to step 816.

At step 816, the user prepares handwriting learning apparatus 100 for storage and/or cleaning. This may involve, by way of example and not limitation, at least partially disassembling handwriting learning apparatus 100, securing insertion device 206 back into slot 210, and/or placing handwriting learning apparatus 100 into one or more storage containers, such as, by way of example and not limitation, a box, receptacle, and/or bag, as well as any similar container(s) as may be apparent to those skilled the relevant art(s) after reading the description herein. Such container(s) may completely or partially contain at least one portion of handwriting learning apparatus 100.

The disassembling of handwriting learning apparatus 100 may at least partially comprise, by way of example and not limitation, removing medium 102 from casing component 202 and/or removing secondary medium 302 from medium 102 and/or casing component 202. By way of further example and not limitation, the various portions of handwriting learning apparatus 100 may be separated by being pulled apart in order to disengage and/or separate one or more catches, detents, tabs, ridges, channels, grooves, nooks, adhesives, hook-and-loop fasteners, and/or similar structures and/or mechanisms associated or integrated with medium 102, casing component 202, and/or secondary medium 302 as may be apparent to those skilled in the relevant art(s) after reading the description herein. Additionally, by way of yet further example and not limitation, medium 102, casing component 202, and/or secondary medium 302 may be disassembled from each other by disengaging one or more nails, nuts, bolts, screws, washers, clips, clamps, clasps, hooks, pins, brackets, and/or similar connective and/or fastening elements that may be used to keep the various portions of handwriting learning apparatus 100 secured together as may be apparent to those skilled in the relevant art(s) after reading the description herein. By way of still further example and not limitation, insertion device 206 may be secured into slot 210 by being pushed, snapped, and/or slid therein and then held in place via a friction fit; via one or more structures and/or mechanisms such as one or more catches, detents, tabs, ridges, channels, grooves, nooks, crannies, and the like; and/or via one or more connective and/or fastening elements such as one or more nails, nuts, bolts, screws, washers, clips, clamps, clasps, hooks, pins, brackets, adhesives, hook-and-loop fasteners, and the like.

Handwriting learning apparatus 100 may be cleaned using any appropriate cleaning material(s) and/or technique(s) as may be apparent to those skilled in the relevant art(s) after reading the description herein, including being wiped with a damp cloth or disinfecting wipe, being soaked in water (if appropriate), being swept for dust, and the like. In some aspects, any computer processors, computer components, software modules, and/or other electronic components included with handwriting learning apparatus 100 may be separated or removed therefrom prior to cleaning in order to prevent or minimize damage to those element(s).

Once handwriting learning apparatus 100 has been prepared for storage and/or has been cleaned, it may be placed in a proper storage location, such as a shelf, drawer, or other appropriate location as may be apparent to those skilled in the relevant art(s) after reading the description herein.

At step 818, process 800 is terminated and process 800 ends.

Figure 9:
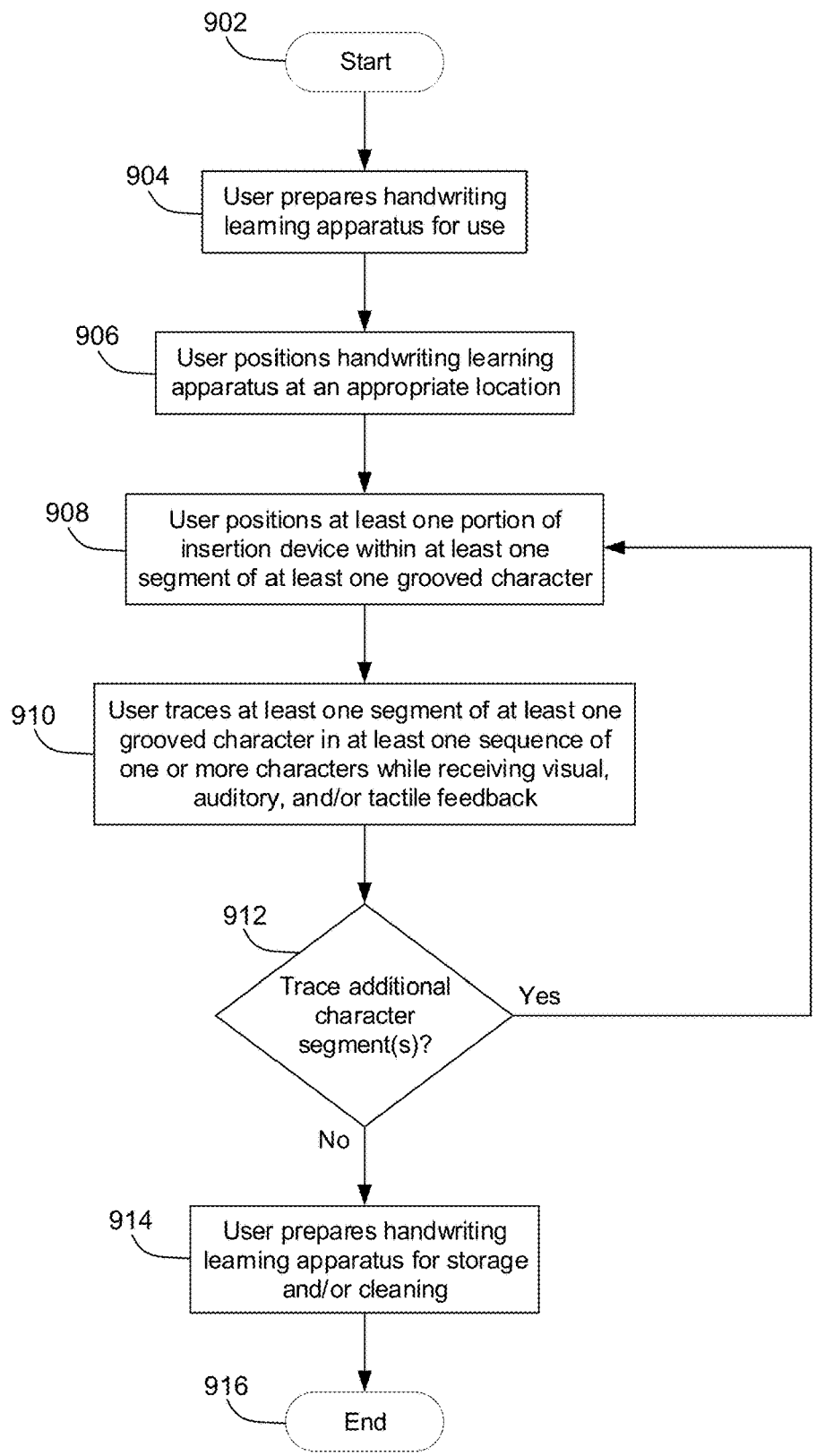
FIG. 9 is a flowchart illustrating a second exemplary process for using a handwriting learning apparatus to learn how to correctly and/or preferably form one or more characters that comprise one or more words, numbers, sounds (e.g., digraphs), and/or sentences, according to an aspect of the present disclosure.

Referring now to FIG. 9, a flowchart illustrating a second exemplary process 900 for using handwriting learning apparatus 100 to learn how to correctly and/or preferably form one or more characters that comprise one or more words, numbers, sounds (e.g., digraphs), and/or sentences, according to an aspect of the present disclosure, is shown.

Process 900 begins at step 902 with control passing immediately to step 904.

At step 904, a user prepares handwriting learning apparatus 100 (not shown in FIG. 9) for use. In some aspects, by way of example and not limitation, this may involve the user removing handwriting learning apparatus 100 from a storage location and/or assembling at least one portion of handwriting learning apparatus 100. By way of further example and not limitation, in some additional aspects, handwriting learning apparatus 100 may be at least partially assembled by attaching medium 102 (not shown in FIG. 9) to casing component 202 (not shown in FIG. 9) and/or attaching secondary medium 302 (not shown in FIG. 9) to medium 102 and, when applicable, to casing component 202. In some nonlimiting exemplary embodiments, medium 102 may be attached to casing component 202 by being received by recessed area 204 (not shown in FIG. 9). By way of still further example and not limitation, recessed area 204 may receive medium 102 when side(s) 112 (not shown in FIG. 9) and (if applicable) corner(s) 110 (not shown in FIG. 9) of medium 102 substantially line up with side portion(s) 214 (not shown in FIG. 9) and (if applicable) corner(s) 216 (not shown in FIG. 9) of casing component 202. In some additional aspects, medium 102 may be snapped, locked, or otherwise secured into place within recessed area 204 using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein.

In some additional nonlimiting exemplary embodiments, secondary medium 302 may be secured to a front surface portion of medium 102 such that side(s) 308 (not shown in FIG. 9) and (if applicable) corner(s) 306 (not shown in FIG. 9) of secondary medium 302 substantially line up with side(s) 112 and (if applicable) corner(s) 110 of medium 102. By way of example and not limitation, secondary medium 302 may be snapped, locked, or otherwise secured into place upon medium 102 by using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein. In still some additional aspects, secondary medium 302 may be secured to a front surface portion of medium 102 such that side(s) 308 and (if applicable) corner(s) 306 of secondary medium 302 also substantially line up with side portion(s) 214 and (if applicable) corner(s) 216 of casing component 202. In such aspects, secondary medium 302 may be snapped, locked, or otherwise secured into place upon and/or within casing component 202 by using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein.

In some aspects, the user may also need to remove insertion device 206 (not shown in FIG. 9) from a storage location within or upon handwriting learning apparatus 100, such as, by way of example and not limitation, from within slot 210 (not shown in FIG. 9) integrated with or secured to medium 102, secondary medium 302, and/or casing component 202. In some instances, to assist with the removal of insertion device 206 from slot 210, the user may use retrieval recess 212 (not shown in FIG. 9) to help grip or grasp insertion device 206 and/or to obtain better leverage to pry and/or pull insertion device 206 from slot 210, such as, for example and not limitation, by using a portion of one or more of the user's fingers, a portion of the user's thumb(s), and/or one or more tools.

In some aspects, the user may also need to remove handwriting learning apparatus 100 from one or more storage containers, such as, by way of example and not limitation, a box, receptacle, and/or bag, as well as any similar container(s) as may be apparent to those skilled the relevant art(s) after reading the description herein. Such container(s) may completely or partially contain at least one portion of handwriting learning apparatus 100.

Once handwriting learning apparatus 100 has been prepared for use, process 900 proceeds to step 906.

At step 906, the user positions handwriting learning apparatus 100 at an appropriate location. By way of example and not limitation, an appropriate location may comprise at least a portion of any surface or may comprise a position at least partially upon one or more supplementary devices upon which one or more words, numbers, sounds (e.g., digraphs), and/or sentences are to be traced and/or written by leaving a physical and/or digital mark. In aspects wherein one or more grooved character(s) 104/304 may be arranged as one or more words, numbers, sounds (e.g., digraphs), and/or sentences within handwriting learning apparatus 100, handwriting learning apparatus 100 may be positioned such that any given word(s)/number(s)/sound(s)/sentence(s) to be traced and/or written upon the supplementary device(s) fit appropriately. If no supplementary devices are being used, then any location may be appropriate for handwriting learning apparatus 100, including upon at least a portion of one or more at least partially rigid surfaces. Other appropriate locations may be used as well as may be apparent to those skilled in the relevant art(s) after reading the description herein.

At step 908, the user positions at least one portion of insertion device 206, such as, by way of example and not limitation, distal end 208 (not shown in FIG. 9) within at least one portion or segment 410 (not shown in FIG. 9) of at least one grooved character 104 to be traced, typically at a start location 404 (not shown in FIG. 9) associated therewith. In some aspects, the at least one grooved character 104 to be traced may comprise, by way of example and not limitation, at least one letter in at least one sequence to form at least one word, such as, by way of further example and not limitation, at least one word from the Dolch sight word list and/or at least one word of any language; at least one number in at least one sequence to form at least one single and/or multidigit number; at least one letter in at least one sequence to form a combination that represents at least one sound (e.g., such as a digraph); and/or at least one word, number, punctuation mark, sound (e.g., digraph), and/or symbol in at least one sequence to form at least one sentence. In aspects wherein handwriting learning apparatus 100 may comprise a secondary medium 302, at least one portion of insertion device 206 may also be positioned within at least one portion or segment 410 of at least one grooved character 304 (not shown in FIG. 9) to be traced, typically at a start location 404 associated therewith.

As a nonlimiting example, insertion device 206 may be held within the user's hand (typically in the user's writing hand) in a relatively vertical orientation substantially perpendicular to medium 102, casing component 202 (if applicable), secondary medium 302 (if applicable), and/or handwriting learning apparatus 100, generally. By way of example and not limitation, in some aspects, the user may push insertion device 206 into grooved character(s) 104 (and, if applicable, 304) and/or at least one portion or segment 410 thereof until at least one portion of insertion device 206 (such as, for example, distal end 208) makes physical contact with a portion of casing component 202 and/or the top surface portion of one or more supplementary devices, such as, by way of further example and not limitation, a piece of paper, a dry-erase board, a chalkboard, an interactive whiteboard (such as, for example and not limitation, a SMART Board® available from the Smart Technologies Corporation of Calgary, Alberta, Canada), an interactive touchscreen monitor, a tablet computer surface or device, a smartphone, and the like.

At step 910, the user engages in the tracing of at least one grooved character 104 (and 304, if applicable) and/or at least one portion or segment 410 thereof by sliding insertion device 206 therein, typically from a grooved character 104

(and 304, if applicable) and/or segment 410 start location 404 to a grooved character 104 (and 304, if applicable) and/or segment 410 end location 406 (not shown in FIG. 9). By way of example and not limitation, the at least one grooved character 104 (and 304, if applicable) may comprise at least one letter in at least one sequence to form at least one word such as, by way of further example and not limitation, at least one word from the Dolch sight word list and/or at least one word of any language; at least one number in at least one sequence to form at least one single and/or multidigit number; at least one letter in at least one sequence to form a combination that represents at least one sound (e.g., such as a digraph); and/or at least one word, number, punctuation mark, sound (e.g., digraph), and/or symbol in at least one sequence to form at least one sentence. While engaging in such tracing, the user may experience at least one of: visual feedback, auditory feedback, and sensory, tactile, haptic, or kinesthetic feedback.

Visually, the user may see a character 104 (and 304, if applicable) and/or at least one portion or segment 410 thereof while it is being traced. Additionally, in some aspects, lighting element(s) 222 may illuminate sequentially to indicate to the user how a given grooved character 104/304 and/or segment 410 thereof is to be correctly and/or preferably traced by illuminating, for example and not limitation, the next portion or segment 410 of the grooved character 104/304 to be traced (or the next portion of such portion or segment 410 to be traced). In some additional aspects, lighting element(s) 222 may indicate to the user the order of grooved character(s) 104/304 in at least one sequence to be traced to form at least one word, number, sound (e.g., digraph) and/or sentence by illuminating, for example and not limitation, the next grooved character 104/304 to be traced in the sequence. Additionally, the user may hear one or more noises (such as, by way of example and not limitation, a clicking sound) as at least one portion of insertion device 206 (such as, for example and not limitation, distal end 208) physically contacts and interacts with at least one portion of one or more protruding elements 108 (not shown in FIG. 9) as it slidably moves past protruding element(s) 108 while temporarily displacing at least one portion of each of protruding element(s) 108. One or more audio emitting devices 224 may also provide one or more forms of audio feedback such as, by way of example and not limitation, a chime or bell ring that may be played when/as the user performs a correct tracing, a buzzer or beep that may be played when/as the user performs an incorrect tracing, and phrases in various languages such as "Good job!", "You can do it!", "Trace the letter 'A'," and the like to encourage, motivate, and/or direct the user. By way of further example and not limitation, audio emitting device(s) 224 may provide audio feedback in the form of stating a word, number, sound (e.g., digraph), and/or sentence that has been successfully traced upon successful completion of tracing of the last character of the word/number/sound/sentence. Furthermore, the user may experience sensory/tactile/haptic/kinesthetic feedback as at least one portion of insertion device 206 (such as, for example and not limitation, distal end 208) physically contacts and interacts with at least one portion of one or more protruding elements 108 as it slidably moves past protruding element(s) 108 and temporarily at least partially displaces at least one portion of each of protruding element(s) 108, thereby causing insertion device 206 to experience one or more vibratory or similar sensations that may be felt by the user's finger(s), thumb(s), hand(s), and/or similar body part(s). The physical act of tracing a given grooved character 104/304 and/or segment 410 thereof may add to the user's kinesthetic learning experience. By stimulating multiple senses during the learning of one or more correct and/or preferred character formation techniques, the user may be more likely to absorb and retain knowledge of the correct/preferred technique(s), thereby increasing cognitive learning efficiency and effectiveness of the technique(s).

At step 912, the user determines whether to trace more grooved character(s) 104 (and 304, if applicable) and/or one or more portions or segments 410 thereof. Such determination may be made at least partially with regard to whether the user has the time and/or desire to trace additional character(s) 104/304 or segment(s) 410 thereof, whether any segments 410 remain to be traced for a grooved character 104/304 that comprises multiple segments 410, and/or whether any more character(s) 104/304 or segment(s) 410 thereof remain in the form of letters, numbers, punctuation marks, and/or symbols in a sequence of one or more words, numbers, sounds (e.g., digraphs), and/or sentences being traced. In some aspects, the user may decide to repeat the tracing of one or more previously traced grooved character(s) 104/304 or segment(s) 410 thereof (including one or more character(s) 104/304 or segment(s) 410 thereof in the form of one or more letters, numbers, punctuation marks, and/or symbols in a sequence of one or more previously traced words, numbers, sounds (e.g., digraphs, and/or sentences). If the determination is affirmative, process 900 proceeds back to step 908. If the determination is negative, process 900 proceeds to step 914.

At step 914, the user prepares handwriting learning apparatus 100 for storage and/or cleaning. This may involve, by way of example and not limitation, at least partially disassembling handwriting learning apparatus 100, securing insertion device 206 back into slot 210, and/or placing handwriting learning apparatus 100 into one or more storage containers, such as, by way of example and not limitation, a box, receptacle, and/or bag, as well as any similar container(s) as may be apparent to those skilled the relevant art(s) after reading the description herein. Such container(s) may completely or partially contain at least a portion of handwriting learning apparatus 100.

The disassembling of handwriting learning apparatus 100 may at least partially comprise, by way of example and not limitation, removing medium 102 from casing component 202 and/or removing secondary medium 302 from medium 102 and/or casing component 202. By way of further example and not limitation, the various portions of handwriting learning apparatus 100 may be separated by being pulled apart in order to disengage and/or separate one or more catches, detents, tabs, ridges, channels, grooves, nooks, adhesives, hook-and-loop fasteners, and/or similar structures and/or mechanisms associated or integrated with medium 102, casing component 202, and/or secondary medium 302 as may be apparent to those skilled in the relevant art(s) after reading the description herein. Additionally, by way of yet further example and not limitation, medium 102, casing component 202, and/or secondary medium 302 may be disassembled from each other by disengaging one or more nails, nuts, bolts, screws, washers, clips, clamps, clasps, hooks, pins, brackets, and/or similar connective and/or fastening elements that may be used to keep the various portions of handwriting learning apparatus 100 secured together as may be apparent to those skilled in the relevant art(s) after reading the description herein. By way of still further example and not limitation, insertion device 206 may be secured into slot 210 by being pushed, snapped, and/or slid therein and then held in place via a friction fit; via one or more structures and/or mechanisms such as one or more catches, detents, tabs, ridges, channels, grooves, nooks, crannies, and the like; and/or via one or more connective and/or fastening elements such as one or more nails, nuts, bolts, screws, washers, clips, clamps, clasps, hooks, pins, brackets, adhesives, hook-and-loop fasteners, and the like.

Handwriting learning apparatus 100 may be cleaned using any appropriate cleaning material(s) and/or technique(s) as may be apparent to those skilled in the relevant art(s) after reading the description herein, including being wiped with a damp cloth or disinfecting wipe, being soaked in water (if appropriate), being swept for dust, and the like. In some aspects, any computer processors, computer components, software modules, and/or other electronic components included with handwriting learning apparatus 100 may be separated or removed therefrom prior to cleaning in order to prevent or minimize damage to those element(s).

Once handwriting learning apparatus 100 has been prepared for storage and/or has been cleaned, it may be placed in a proper storage location, such as a shelf, drawer, or other appropriate location as may be apparent to those skilled in the relevant art(s) after reading the description herein.

At step 916, process 900 is terminated and process 900 ends.

Figure 10:
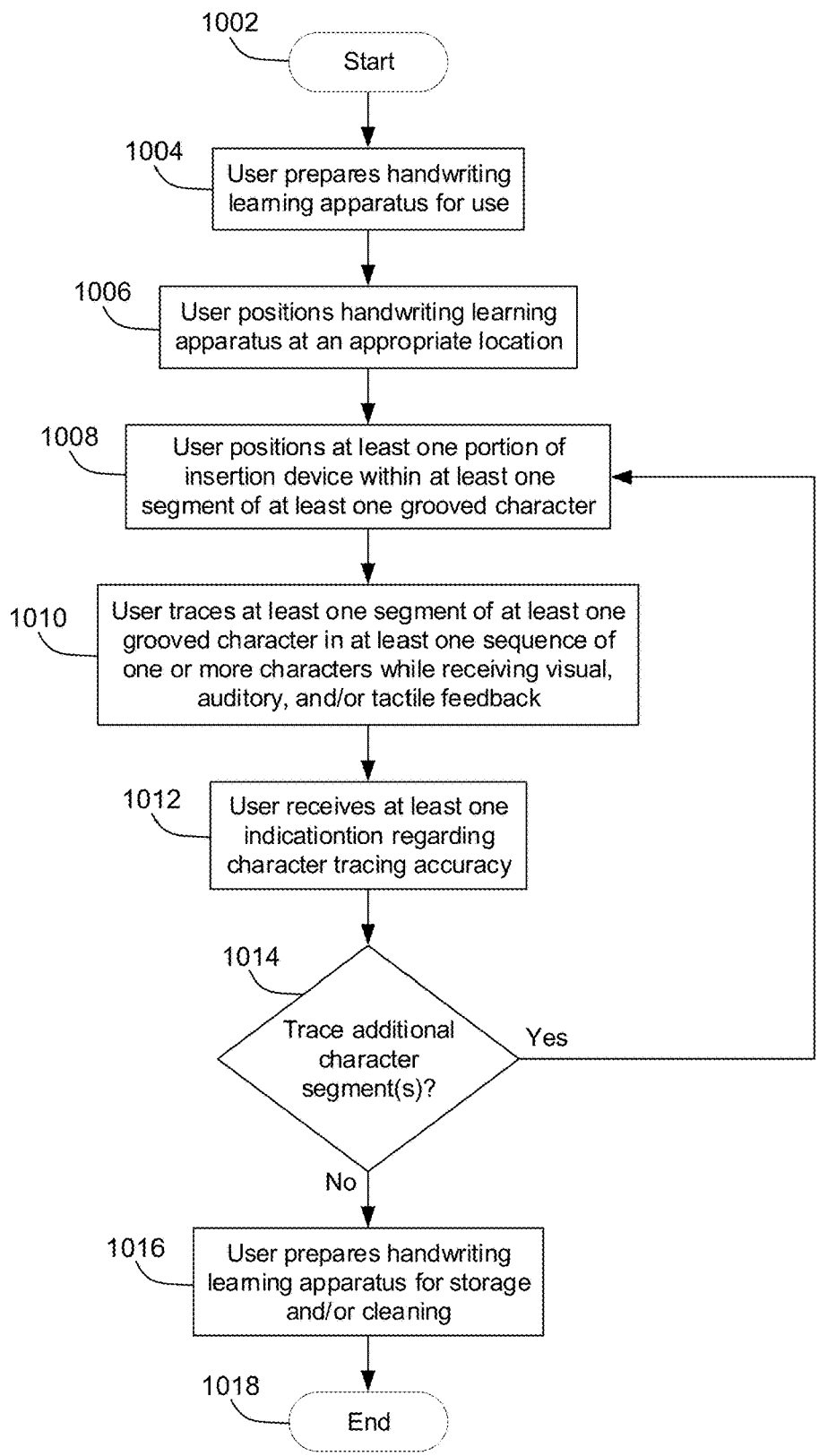
FIG. 10 is a flowchart illustrating a second exemplary process for using a handwriting learning apparatus to learn how to correctly and/or preferably form one or more characters that comprise one or more words, numbers, sounds (e.g., digraphs), and/or sentences while receiving at least one indication regarding character formation accuracy, according to an aspect of the present disclosure.

Referring now to FIG. 10, a flowchart illustrating a second exemplary process 1000 for using handwriting learning apparatus 100 to learn how to correctly and/or preferably form one or more characters that comprise one or more words, numbers, sounds (e.g., digraphs), and/or sentences while receiving at least one indication regarding character formation accuracy, according to an aspect of the present disclosure, is shown.

Process 1000 begins at step 1002 with control passing immediately to step 1004.

At step 1004, a user prepares handwriting learning apparatus 100 (not shown in FIG. 10) for use. In some aspects, by way of example and not limitation, this may involve the user removing handwriting learning apparatus 100 from a storage location and/or assembling at least one portion of handwriting learning apparatus 100. By way of further example and not limitation, in some additional aspects, handwriting learning apparatus 100 may be at least partially assembled by attaching medium 102 (not shown in FIG. 10) to casing component 202 (not shown in FIG. 10) and/or attaching secondary medium 302 (not shown in FIG. 10) to medium 102 and, when applicable, to casing component 202. In some nonlimiting exemplary embodiments, medium 102 may be attached to casing component 202 by being received by recessed area 204 (not shown in FIG. 10). By way of still further example and not limitation, recessed area 204 may receive medium 102 when side(s) 112 (not shown in FIG. 10) and (if applicable) corner(s) 110 (not shown in FIG. 10) of medium 102 substantially line up with side portion(s) 214 (not shown in FIG. 10) and (if applicable) corner(s) 216 (not shown in FIG. 10) of casing component 202. In some additional aspects, medium 102 may be snapped, locked, or otherwise secured into place within recessed area 204 using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein.

In some additional nonlimiting exemplary embodiments, secondary medium 302 may be secured to a front surface portion of medium 102 such that side(s) 308 (not shown in FIG. 10) and (if applicable) corner(s) 306 (not shown in FIG. 10) of secondary medium 302 substantially line up with side(s) 112 and (if applicable) corner(s) 110 of medium 102. By way of example and not limitation, secondary medium 302 may be snapped, locked, or otherwise secured into place upon medium 102 by using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein. In still some additional aspects, secondary medium 302 may be secured to a front surface portion of medium 102 such that side(s) 308 and (if applicable) corner(s) 306 of secondary medium 302 also substantially line up with side portion(s) 214 and (if applicable) corner(s) 216 of casing component 202. In such aspects, secondary medium 302 may be snapped, locked, or otherwise secured into place upon and/or within casing component 202 by using one or more catches, detents, tabs, ridges, channels, grooves, nooks, nails, nuts, bolts, screws, washers, clips, clamps, clasps, hooks, pins, brackets, adhesives, hook-and-loop fasteners, and/or similar structures, mechanisms, and/or connective and/or fastening elements as may be apparent to those skilled in the relevant art(s) after reading the description herein.

In some aspects, the user may also need to remove insertion device 206 (not shown in FIG. 10) from a storage location within or upon handwriting learning apparatus 100, such as, by way of example and not limitation, from within slot 210 (not shown in FIG. 10) integrated with or secured to medium 102, secondary medium 302, and/or casing component 202. In some instances, to assist with the removal of insertion device 206 from slot 210, the user may use retrieval recess 212 (not shown in FIG. 10) to help grip or grasp insertion device 206 and/or obtain better leverage to pry and/or pull insertion device 206 from slot 210, such as, for example and not limitation, by using a portion of one or more of the user's fingers, a portion of the user's thumb(s), and/or one or more tools.

In some aspects, the user may also need to remove handwriting learning apparatus 100 from one or more storage containers, such as, by way of example and not limitation, a box, receptacle, and/or bag, as well as any similar container(s) as may be apparent to those skilled the relevant art(s) after reading the description herein. Such container(s) may completely or partially contain at least one portion of handwriting learning apparatus 100.

In some aspects, such as when handwriting learning apparatus 100 may comprise one or more computer processors, computer components, software modules, and/or other electronic components, handwriting learning apparatus 100 may require the receipt of at least one form of user authentication prior to use. By way of example and not limitation, such user authentication may comprise the user submitting a username, password, passcode, key code, pin number, visual identification, facial recognition, fingerprint scan, retinal scan, voice authentication, and/or any similar identifying and/or security elements as may be apparent to those skilled in the relevant art(s) after reading the description herein as being able to securely determine the identity of the user.

Once handwriting learning apparatus 100 has been prepared for use, process 1000 proceeds to step 1006.

At step 1006, the user positions handwriting learning apparatus 100 at an appropriate location. By way of example and not limitation, an appropriate location may comprise at least a portion of any surface or may comprise a position at least partially upon one or more supplementary devices upon which one or more words, numbers, sounds (e.g., digraphs), and/or sentences are to be traced and/or written by leaving a physical and/or digital mark. In aspects wherein one or more grooved character(s) 104/304 may be arranged as one or more words, numbers, sounds (e.g., digraphs), and/or sentences within handwriting learning apparatus 100, handwriting learning apparatus 100 may be positioned such that any given word(s)/number(s)/sound(s)/sentence(s) to be traced and/or written upon the supplementary device(s) fit appropriately. If no supplementary devices are being used, then any location may be appropriate for handwriting learning apparatus 100, including upon at least a portion of one or more at least partially rigid surfaces. Other appropriate locations may be used as well as may be apparent to those skilled in the relevant art(s) after reading the description herein.

At step 1008, the user positions at least one portion of insertion device 206, such as, by way of example and not limitation, distal end 208 (not shown in FIG. 10) within at least one portion or segment 410 (not shown in FIG. 10) of at least one grooved character 104 to be traced, typically at a start location 404 (not shown in FIG. 10) associated therewith. In some aspects, the at least one grooved character 104 to be traced may comprise, by way of example and not limitation, at least one letter in at least one sequence to form at least one word, such as, by way of further example and not limitation, at least one word from the Dolch sight word list and/or at least one word of any language; at least one number in at least one sequence to form at least one single and/or multidigit number; at least one letter in at least one sequence to form a combination that represents at least one sound (e.g., such as a digraph); and/or at least one word, number, punctuation mark, sound (e.g., digraph), and/or symbol in at least one sequence to form at least one sentence. In aspects wherein handwriting learning apparatus 100 may comprise a secondary medium 302, at least one portion of insertion device 206 may also be positioned within at least one portion or segment 410 of at least one grooved character 304 (not shown in FIG. 10) to be traced, typically at a start location 404 associated therewith.

As a nonlimiting example, insertion device 206 may be held within the user's hand (typically in the user's writing hand) in a relatively vertical orientation substantially perpendicular to medium 102, casing component 202 (if applicable), secondary medium 302 (if applicable), and/or handwriting learning apparatus 100, generally. By way of example and not limitation, in some aspects, the user may push insertion device 206 into grooved character(s) 104 (and, if applicable, 304) and/or at least one portion or segment 410 thereof until at least one portion of insertion device 206 (such as, for example, distal end 208) makes physical contact with a portion of casing component 202 and/or the top surface portion of one or more supplementary devices, such as, by way of further example and not limitation, a piece of paper, a dry-erase board, a chalkboard, an interactive whiteboard (such as, for example and not limitation, a SMART Board® available from the Smart Technologies Corporation of Calgary, Alberta, Canada), an interactive touchscreen monitor, a tablet computer surface or device, a smartphone, and the like.

At step 1010, the user engages in the tracing of at least one grooved character 104 (and 304, if applicable) and/or at least one portion or segment 410 thereof by sliding insertion device 206 therein, typically from a grooved character 104 (and 304, if applicable) and/or segment 410 start location 404 to a grooved character 104 (and 304, if applicable) and/or segment 410 end location 406 (not shown in FIG. 10). By way of example and not limitation, the at least one grooved character 104 (and 304, if applicable) may comprise at least one letter in at least one sequence to form at least one word such as, by way of further example and not limitation, at least one word from the Dolch sight word list and/or at least one word of any language; at least one number in at least one sequence to form at least one single and/or multidigit number; at least one letter in at least one sequence to form a combination that represents at least one sound (e.g., such as a digraph); and/or at least one word, number, punctuation mark, sound (e.g., digraph), and/or symbol in at least one sequence to form at least one sentence. While engaging in such tracing, the user may experience at least one of: visual feedback, auditory feedback, and sensory, tactile, haptic, or kinesthetic feedback.

Visually, the user may see a character 104 (and 304, if applicable) and/or at least one portion or segment 410 thereof while it is being traced. Additionally, in some aspects, lighting element(s) 222 may illuminate sequentially to indicate to the user how a given grooved character 104/304 and/or segment 410 thereof is to be correctly and/or preferably traced by illuminating, for example and not limitation, the next portion or segment 410 of the grooved character 104/304 to be traced (or the next portion of such portion or segment 410 to be traced). In some additional aspects, lighting element(s) 222 may indicate to the user the order of grooved character(s) 104/304 in at least one sequence to be traced to form at least one word, number, sound (e.g., digraph), and/or sentence by illuminating, for example and not limitation, the next grooved character 104/304 to be traced in the sequence. Additionally, the user may hear one or more noises (such as, by way of example and not limitation, a clicking sound) as at least one portion of insertion device 206 (such as, for example and not limitation, distal end 208) physically contacts and interacts with at least one portion of one or more protruding elements 108 (not shown in FIG. 10) as it slidably moves past protruding element(s) 108 while temporarily displacing at least one portion of each of protruding element(s) 108. One or more audio emitting devices 224 may also provide one or more forms of audio feedback such as, by way of example and not limitation, a chime or bell ring that may be played when/as the user performs a correct tracing, a buzzer or beep that may be played when/as the user performs an incorrect tracing, and phrases in various languages such as "Good job!", "You can do it!", "Trace the letter 'A'," and the like to encourage, motivate, and/or direct the user. By way of further example and not limitation, audio emitting device(s) 224 may provide audio feedback in the form of stating a word, number, sound (e.g., digraph), and/or sentence that has been successfully traced upon successful completion of tracing of the last character of the word/number/sound/sentence. Furthermore, the user may experience sensory/tactile/haptic/kinesthetic feedback as at least one portion of insertion device 206 (such as, for example and not limitation, distal end 208) physically contacts and interacts with at least one portion of one or more protruding elements 108 as it slidably moves past protruding element(s) 108 and temporarily at least partially displaces at least one portion of each of protruding element(s) 108, thereby causing insertion device 206 to experience one or more vibratory or similar sensations that may be felt by the user's finger(s), thumb(s), hand(s), and/or similar body part(s). The physical act of tracing a given grooved character 104/304 and/or segment 410 thereof may add to the user's kinesthetic learning experience. By stimulating multiple senses during the learning of one or more correct and/or preferred character formation techniques, the user may be more likely to absorb and retain knowledge of the correct/preferred technique(s), thereby increasing cognitive learning efficiency and effectiveness of the technique(s).

At step 1012, the user receives at least one indication regarding an accuracy evaluation of at least one grooved character 104 (and 304, if applicable) and/or at least one segment 410 tracing attempt and/or at least one attempt to trace one or more grooved characters 104 (and 304, if applicable) and/or one or more portions or segments 410 thereof in the form of one or more letters, numbers, punctuation marks, and/or symbols that comprise one or more words, numbers, sounds (e.g., digraphs), and/or sentences. In some nonlimiting exemplary embodiments, the accuracy evaluation may comprise at least one indication of a correct tracing of one or more grooved characters 104 (and 304, if applicable) and/or at least one portion or segment 410 thereof or an indication of an incorrect tracing of one or more grooved characters 104 (and 304, if applicable) and/or at least one portion or segment 410 thereof. By way of example and not limitation, such indication may comprise at least one output from at least one indicator device, such as at least one illumination and/or other visual output from lighting element(s) 222, at least one form of audio output from audio emitting device(s) 224, and/or at least one form of tactile output (e.g., a vibration and/or pulsation) from at least one sensory device. In some additional nonlimiting exemplary embodiments, lighting element(s) 222 may display at least one green light illumination when a grooved character 104/304 (or word, number, sound (e.g., digraph), and/or sentence) and/or at least one portion or segment 410 thereof is being or has been traced correctly, and may display no light or at least one red light illumination when a grooved character 104/304 (or word, number, sound (e.g., digraph), and/or sentence) and/or at least one portion or segment 410 thereof has been or is being traced incompletely/incorrectly (such as, for example and not limitation, the user did not start and/or stop the tracing at the correct/preferred start location 404 and/or end location 406, and/or the user incorrectly removed insertion device 206 from and then reinserted it into a grooved character 104/304 and/or at least one portion or segment 410 thereof during a tracing attempt) and/or the user did not complete the tracing of all the grooved character(s) 104/304 and/or segment(s) 410 thereof that comprise a word, number, sound (e.g., digraph), and/or sentence that is being traced. In some additional aspects, lighting element(s) 222 may be configured to be illuminated as the user traces a particular grooved character 104/304 and/or at least one portion or segment 410 thereof and, in such aspects, by way of example and not limitation, lighting element(s) 222 may comprise, for example and not limitation, a meter or bar form that gets fuller and/or brighter as more lighting elements 222 become illuminated as the user's tracing of the grooved character 104/304 (or word, number, sound (e.g., digraph), and/or sentence) and/or at least one portion or segment 410 thereof progresses and/or lighting element(s) 222 may be configured behind grooved character(s) 104/304 and/or at least one portion or segment 410 thereof and such lighting element(s) 222 may be configured to become illuminated so as to correspond to the portion(s) or segment(s) 410 of grooved character(s) 104/304 (or word(s), number(s), sound(s) (e.g., digraph(s)), and/or sentence(s)) that has/have been successfully traced.

In some additional nonlimiting exemplary embodiments, audio emitting device(s) 224 may be configured to produce various sounds to indicate to the user when the tracing of a grooved character 104/304 (or word, number, sound (e.g., digraph), and/or sentence) and/or at least one portion or segment 410 thereof is being or has been done correctly or incorrectly. By way of example and not limitation, such sounds may comprise a chime or bell sound that may be played when a grooved character 104/304 (or word, number, sound (e.g., digraph), and/or sentence) and/or at least one portion or segment 410 thereof has been or is being traced correctly and/or a buzzer and/or beep sound that may be played when a grooved character 104/304 (or word, number, sound (e.g., digraph), and/or sentence) and/or at least one portion or segment 410 thereof has been or is being traced incorrectly. By way of further example and not limitation, audio emitting device(s) 224 may be configured to play one or more phrases in various languages to the user to indicate correct/preferred, incorrect, and/or incomplete character 104/304 (or word, number, sound (e.g., digraph) and/or sentence) and/or segment 410 tracing attempts and/or to encourage, motivate, and/or direct the user, wherein such phrases may include, for example and not imitation, the name of the grooved character 104/304 (or word, number, sound (e.g., digraph), and/or sentence) being traced, "Good job!", "You can do it!", "Almost there!", and "Good try!". By way of still further example and not limitation, one or more sensory devices may be configured to indicate to the user when the tracing of a grooved character 104/304 (or word, number, sound (e.g., digraph) and/or sentence) and/or at least one portion or segment 410 thereof is being or has been done correctly or incorrectly. By way of yet further example and not limitation, relatively soft, short, and/or quick vibrations and/or pulsations may be produced by the sensory device(s) in various sequences when/as the user performs a correct tracing, while longer, harder, and/or more intense vibrations and/or pulsations may be produced in various sequences when/as the user performs an incorrect tracing.

In some aspects, the accuracy evaluation of the at least one attempt to trace one or more grooved characters 104 (and 304, if applicable) and/or one or more portions or segments 410 thereof may be at least partially based on at least one detection made by at least one sensing device (such as, for example and not limitation, one or more motion detectors, one or more pressure sensors, one or more proximity sensors, one or more position sensors, and the like) which may be communicatively coupled (such as, for example and not limitation, via wireless connectivity (e.g., via one or more Bluetooth® (a wireless technology standard standardized as IEEE 802.15.1) transceivers or antennas), via hardwired connectivity, or via direct integration) to/with at least one portion of at least one grooved character 104 (and 304, if applicable) (such as a start location 404 and/or end location 406 thereof), to at least one portion of at least one segment 410 (such as a start location 404 and/or end location 406 thereof), to at least one portion of at least one protruding element 108, to at least one portion of insertion device 206, to at least one computer processor, to at least one computer component, to at least one software module, to at least one portion of medium 102 (and/or at least one portion of secondary medium 302, (if applicable), to at least one portion of casing component 202, and/or to any other appropriate portion(s) and/or component(s) of handwriting learning apparatus 100 as may be apparent to those skilled in the relevant art(s) after reading the description herein. The sensing device(s) may be housed within any appropriate portion of medium 102 (and/or any appropriate portion of secondary medium 302, (if applicable), casing component 202 (if applicable), insertion device 206, and/or any other appropriate portion(s) of handwriting learning apparatus 100 as may be apparent to those skilled in the relevant art(s) after reading the description herein. In some nonlimiting exemplary embodiments, the sensing device(s) may be configured to detect pressure (e.g., pressure applied by a user via insertion device 206), at least one physical presence (e.g., the physical presence of at least one portion of insertion device 206), friction (e.g., friction between insertion device 206 and one or more protruding elements 108 within at least one portion or segment 410 of at least one grooved character 104 and/or friction between insertion device 206 and one or more portions of at least one inner surface 106 of at least one grooved character 104 (and 304, if applicable) and/or at least one segment 410 thereof), and/or movement (e.g., the movement of at least one portion of insertion device 206) within and/or upon at least one portion of the one or more portions of handwriting learning apparatus 100 to which the sensing device(s) may be communicatively coupled. In order to communicate any accuracy evaluation(s) to the at least one indicator device, the sensing device(s) may also be communicatively coupled (such as, for example and not limitation, via wireless connectivity (e.g., via one or more Bluetooth® (a wireless technology standard standardized as IEEE 802.15.1) transceivers or antennas), via hardwired connectivity, or via direct integration) to/with the indicator device(s) when appropriate. In some additional aspects, the one or more computer processors, computer components, and/or software modules may include computational instructions, or code, that may be executed in order to, among other things, receive at least one detection from the sensing device(s), determine whether the detection(s) represent a correct or incorrect tracing of one or more grooved characters 104 (and 304, if applicable) and/or one or more portions or segments 410 thereof, and/or initiate at least one output from the indicator device(s) to present the character tracing accuracy evaluation(s) to the user by controlling the functioning of the indicator device(s) that may be included with handwriting learning apparatus 100.

At step 1014, the user determines whether to trace more grooved character(s) 104 (and 304, if applicable) and/or one or more portions or segments 410 thereof. Such determination may be made at least partially with regard to whether the user has the time and/or desire to trace additional character(s) 104/304 or segment(s) 410 thereof, whether any segments 410 remain to be traced for a grooved character 104/304 that comprises multiple segments 410, and/or whether any more character(s) 104/304 or segment(s) 410 thereof remain in the form of letters, numbers, punctuation marks, and/or symbols in a sequence of one or more words, numbers, sounds (e.g., digraphs), and/or sentences being traced. In some aspects, the user may decide to repeat the tracing of one or more previously traced grooved character(s) 104/304 or segment(s) 410 thereof (including one or more character(s) 104/304 or segment(s) 410 thereof in the form of one or more letters, numbers, punctuation marks, and/or symbols in a sequence of one or more previously traced words, numbers, sounds (e.g., digraphs, and/or sentences). If the determination is affirmative, process 1000 proceeds back to step 1008. If the determination is negative, process 1000 proceeds to step 1016.

At step 1016, the user prepares handwriting learning apparatus 100 for storage and/or cleaning. This may involve, by way of example and not limitation, at least partially disassembling handwriting learning apparatus 100, securing insertion device 206 back into slot 210, and/or placing handwriting learning apparatus 100 into one or more storage containers, such as, by way of example and not limitation, a box, receptacle, and/or bag, as well as any similar container(s) as may be apparent to those skilled the relevant art(s) after reading the description herein. Such container(s) may completely or partially contain at least one portion of handwriting learning apparatus 100.

The disassembling of handwriting learning apparatus 100 may at least partially comprise, by way of example and not limitation, removing medium 102 from casing component 202 and/or removing secondary medium 302 from medium 102 and/or casing component 202. By way of further example and not limitation, the various portions of handwriting learning apparatus 100 may be separated by being pulled apart in order to disengage and/or separate one or more catches, detents, tabs, ridges, channels, grooves, nooks, adhesives, hook-and-loop fasteners, and/or similar structures and/or mechanisms associated or integrated with medium 102, casing component 202, and/or secondary medium 302 as may be apparent to those skilled in the relevant art(s) after reading the description herein. Additionally, by way of yet further example and not limitation, medium 102, casing component 202, and/or secondary medium 302 may be disassembled from each other by disengaging one or more nails, nuts, bolts, screws, washers, clips, clamps, clasps, hooks, pins, brackets, and/or similar connective and/or fastening elements that may be used to keep the various portions of handwriting learning apparatus 100 secured together as may be apparent to those skilled in the relevant art(s) after reading the description herein. By way of still further example and not limitation, insertion device 206 may be secured into slot 210 by being pushed, snapped, and/or slid therein and then held in place via a friction fit; via one or more structures and/or mechanisms such as one or more catches, detents, tabs, ridges, channels, grooves, nooks, crannies, and the like; and/or via one or more connective and/or fastening elements such as one or more nails, nuts, bolts, screws, washers, clips, clamps, clasps, hooks, pins, brackets, adhesives, hook-and-loop fasteners, and the like.

Handwriting learning apparatus 100 may be cleaned using any appropriate cleaning material(s) and/or technique(s) as may be apparent to those skilled in the relevant art(s) after reading the description herein, including being wiped with a damp cloth or disinfecting wipe, being soaked in water (if appropriate), being swept for dust, and the like. In some aspects, any computer processors, computer components, software modules, and/or other electronic components included with handwriting learning apparatus 100 may be separated or removed therefrom prior to cleaning in order to prevent or minimize damage to those element(s).

Once handwriting learning apparatus 100 has been prepared for storage and/or has been cleaned, it may be placed in a proper storage location, such as a shelf, drawer, or other appropriate location as may be apparent to those skilled in the relevant art(s) after reading the description herein.

At step 1018, process 1000 is terminated and process 1000 ends.

Figure 11:
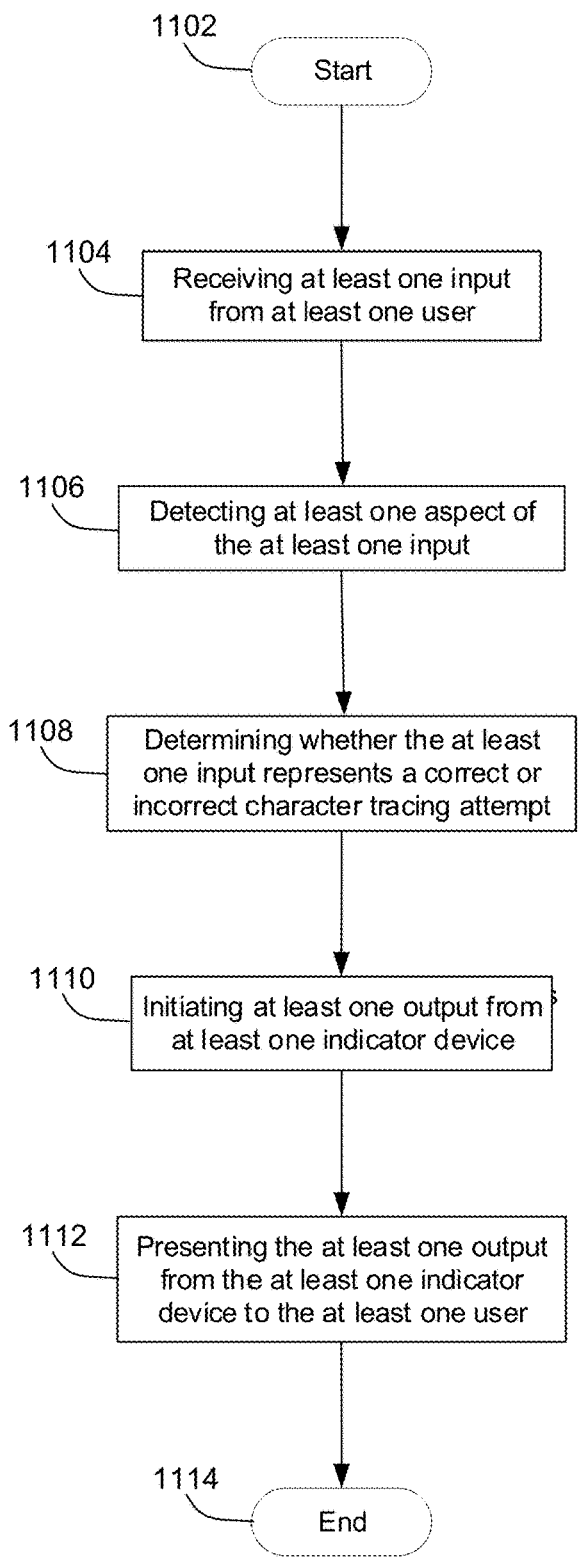
FIG. 11 is a flowchart illustrating an exemplary process for using a handwriting learning apparatus to determine whether one or more characters have been traced in a correct and/or preferred manner, according to an aspect of the present disclosure.

Referring now to FIG. 11, a flowchart illustrating an exemplary process 1100 for using handwriting learning apparatus 100 to determine whether one or more characters have been traced in a correct and/or preferred manner, according to an aspect of the present disclosure, is shown.

Process 1100 begins at step 1102 with control passing immediately to step 1104.

At step 1104, handwriting learning apparatus 100 receives at least one input from at least one user. By way of example and not limitation, the at least one input may comprise at least one attempt to trace one or more grooved characters 104 (not shown in FIG. 11) (and 304 (not shown in FIG. 11), when appropriate) and/or one or more portions or segments 410 (not shown in FIG. 11) thereof. By way of further example and not limitation, in some aspects, a tracing attempt may comprise the user positioning at least one portion of insertion device 206 (not shown in FIG. 11), such as, by way of example and not limitation, distal end 208 (not shown in FIG. 11) within at least one portion or segment 410 of at least one grooved character 104 (and 304, when appropriate) to be traced, typically at a start location 404 (not shown in FIG. 11) associated therewith. In some additional aspects, the at least one grooved character 104 (and 304, when appropriate) to be traced may comprise, by way of still further example and not limitation, at least one letter in at least one sequence to form at least one word, such as, by way of yet further example and not limitation, at least one word from the Dolch sight word list and/or at least one word of any language; at least one number in at least one sequence to form at least one single and/or multidigit number; at least one letter in at least one sequence to form a combination that represents at least one sound (e.g., such as a digraph) and/or at least one word, number, punctuation mark, sound (e.g., digraph), and/or symbol in at least one sequence to form at least one sentence.

As a nonlimiting example, insertion device 206 may be held within the user's hand (typically in the user's writing hand) in a relatively vertical orientation substantially perpendicular to medium 102 (not shown in FIG. 11), casing component 202 (not shown in FIG. 11) (if applicable), secondary medium 302 (if applicable), and/or handwriting learning apparatus 100, generally. By way of example and not limitation, in some aspects, the user may push insertion device 206 into grooved character(s) 104 (and, if applicable, 304) and/or at least one portion or segment 410 thereof until at least one portion of insertion device 206 (such as, for example, distal end 208) makes physical contact with a portion of casing component 202 and/or the top surface portion of one or more supplementary devices, such as, by way of further example and not limitation, a piece of paper, a dry-erase board, a chalkboard, an interactive whiteboard (such as, for example and not limitation, a SMART Board® available from the Smart Technologies Corporation of Calgary, Alberta, Canada), a tablet computer surface or device, an interactive touchscreen monitor, a smartphone, and the like. In some additional nonlimiting exemplary embodiments, insertion device 206 may comprise a form configured to physically and/or digitally mark a given supplementary device.

At step 1106, handwriting learning apparatus 100 detects at least one aspect of the at least one received input. In some nonlimiting exemplary embodiments, such detection may be accomplished via one or more sensing devices (such as, for example and not limitation, one or more motion detectors, one or more pressure sensors, one or more proximity sensors, one or more position sensors, and the like) associated with handwriting learning apparatus 100. The sensing device(s) may be communicatively coupled, (such as, by way of example and not limitation, via wireless connectivity (e.g., via one or more Bluetooth® (a wireless technology standard standardized as IEEE 802.15.1) transceivers or antennas), via hardwired connectivity, or via direct integration) to/with at least one portion of at least one grooved character 104 (and 304, if applicable) (such as a start location 404 and/or end location 406 (not shown in FIG. 11) thereof), to at least one portion of at least one segment 410 (such as a start location 404 and/or end location 406 thereof), to at least one portion of at least one protruding element 108 (not shown in FIG. 11), to at least one portion of insertion device 206, to at least one computer processor, to at least one computer component, to at least one software module, to at least one portion of medium 102 (and/or at least one portion of secondary medium 302, if applicable), to at least one portion of casing component 202, and/or to any other appropriate portion(s) and/or component(s) of handwriting learning apparatus 100 as may be apparent to those skilled in the relevant art(s) after reading the description herein. The sensing device(s) may be housed within any appropriate portion of medium 102 (and/or any appropriate portion of secondary medium 302, (if applicable), casing component 202 (if applicable), insertion device 206, and/or any other appropriate portion(s) of handwriting learning apparatus 100 as may be apparent to those skilled in the relevant art(s) after reading the description herein. In some aspects, by way of example and not limitation, the at least one aspect detected by the sensing device(s) may comprise at least one pressure (e.g., pressure applied by the user via insertion device 206), at least one physical presence (e.g., the physical presence of at least one portion of insertion device 206), at least one friction (e.g., friction between insertion device 206 and one or more protruding elements 108 within at least one portion or segment 410 of at least one grooved character 104 and/or friction between insertion device 206 and one or more portions of at least one inner surface 106 of at least one grooved character 104 (and 304, if applicable) and/or at least one segment 410 thereof), and/or at least one movement (e.g., the movement of at least one portion of insertion device 206) detection within and/or upon at least one portion of the one or more portions of handwriting learning apparatus 100 to which the sensing device(s) may be communicatively coupled.

At step 1108, handwriting learning apparatus 100 determines whether the at least one received input represents a correct or incorrect attempt to trace one or more grooved characters 104 (and 304, if applicable) and/or one or more portions or segments 410 thereof in a correct/preferred manner (e.g., for example and not limitation, handwriting learning apparatus 100 may determine whether the user slid insertion device 206 from a grooved character 104 (and 304, if applicable) and/or segment 410 start location 404 to a grooved character 104 (and 304, if applicable) and/or segment 410 end location 406). Such determination may be accomplished, in some aspects, at least partially, based on analysis performed via computing functionality by one or more computer processors, computer components, and/or software modules that may be associated with handwriting learning apparatus 100 on the at least one aspect detected by the sensing device(s) at step 1106. In aspects wherein handwriting learning apparatus 100 may be used with one or more supplementary devices that include one or more computer processors, computer components, and/or software modules of their own, then the determination may be at least partially accomplished via analysis performed by the computing functionality of such supplementary device(s).

At step 1110, handwriting learning apparatus 100 initiates at least one output from at least one indicator device. In some nonlimiting exemplary embodiments, the initiation may be performed, at least partially, by the one or more computer processors, computer components, and/or software modules that may be utilized to determine whether one or more grooved characters 104 (and 304, if applicable)

and/or one or more portions or segments 410 thereof in have been successfully traced in a correct/preferred manner. By way of example and not limitation, the at least one output from the at least one indicator device may comprise at least one visual output (such as, for example and not limitation, at least one illumination and/or at least one animation) from lighting element 222, at least one audio output from audio emitting device 224, and/or at least one type of tactile output (e.g., a vibration and/or pulsation) from at least one sensory device.

At step 1112, handwriting learning apparatus 100 presents the at least one output from the at least one indicator device to the user. By way of example and not limitation, this may be accomplished when the user sees at least one visual output (such as, for example and not limitation, at least one illumination and/or animation) from lighting element 222, hears at least one audio output (such as, for example and not limitation, at least one chime, bell ring, buzzer, beep, and/or phrase) from audio emitting device 224, and/or feels at least one type of tactile output (such as, for example and not limitation, at least one vibration and/or pulsation) from the at least one sensory device. Depending on the type of output presented, the user may discern if a tracing attempt of one or more grooved characters 104 (and 304, if applicable) and/or one or more portions or segments 410 thereof was successful (done in a correct/preferred way) or not (by way of example and not limitation, a green illumination of one or more lighting element(s) 222, one or more chimes from audio emitting device(s) 224, and/or one or more relatively soft and/or short vibrations and/or pulsations from the sensory device(s) may indicate a correct tracing attempt of one or more grooved characters 104 (and 304, if applicable) and/or one or more portions or segments 410 thereof while a red illumination of one or more lighting element(s) 222, one or more buzzer sounds from audio emitting device(s) 224, and/or one or more relatively long vibrations and/or pulsations from the sensory device(s) may indicate an incorrect tracing attempt of one or more grooved characters 104 (and 304, if applicable) and/or one or more portions or segments 410 thereof.

At step 1114, process 1100 is terminated and process 1100 ends.

Figure 12:
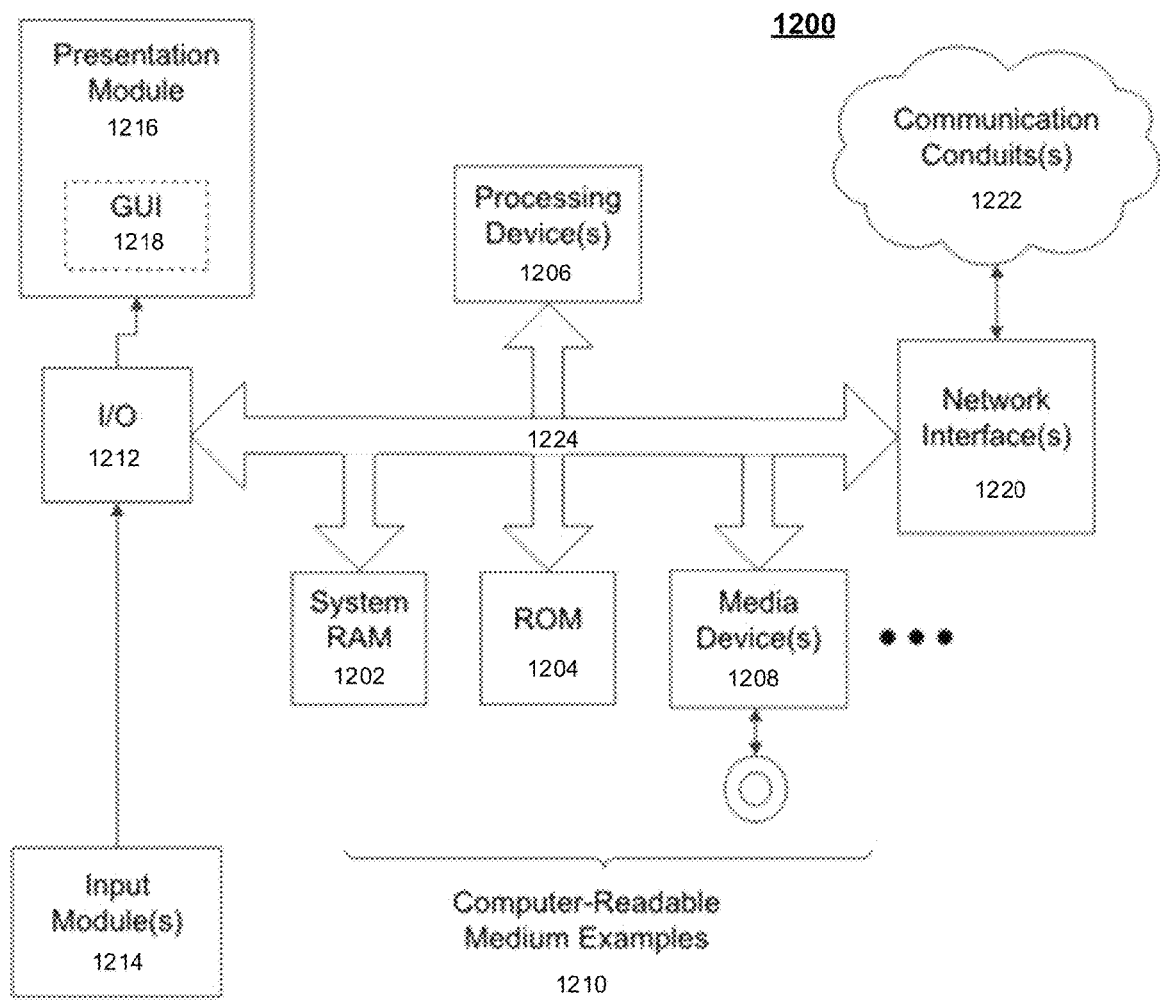
FIG. 12 a block diagram of an exemplary computing system useful for implementing one or more aspects of the present disclosure.
Figure 12:

Referring now to FIG. 12, a block diagram of an exemplary computing system 1200 useful for implementing one or more aspects of the present disclosure is shown.

FIG. 12 sets forth illustrative computing functionality 1200, which in all cases, represents one or more physical and tangible processing mechanisms.

Computing functionality 1200 may comprise volatile and non-volatile memory, such as RAM 1202 and ROM 1204, as well as one or more processing devices 1206 (e.g., one or more central processing units (CPUs), one or more graphical processing units (GPUs), and the like). Computing functionality 1200 also optionally comprises various media devices 1208, such as a hard disk module, an optical disk module, and so forth. Computing functionality 1200 may perform various operations identified when the processing device(s) 1206 execute(s) instructions that are maintained by memory (e.g., RAM 1202, ROM 1204, and the like).

More generally, instructions and other information may be stored on any computer readable medium 1210, including, but not limited to, static memory storage devices, magnetic storage devices, and optical storage devices. The term "computer readable medium" also encompasses plural storage devices. In all cases, computer readable medium 1210 represents some form of physical and tangible entity.

By way of example and not limitation, computer readable medium 1210 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 1202, ROM 1204, EEPROM, Flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as wired network or direct-wired connection, and wireless media such as acoustic, RF, infrared, and other wireless media. Combinations of any of the above are also included within the scope of computer readable medium.

Computing functionality 1200 may also comprise an input/output module 1212 for receiving various inputs (via input modules 1214), and for providing various outputs (via one or more output modules). One particular output module mechanism may be a presentation module 1216 and an associated GUI 1218. Computing functionality 1200 may also include one or more network interfaces 1220 for exchanging data with other devices via one or more communication conduits 1222. In some aspects, one or more communication buses 1224 communicatively couple the above-described components together.

Communication conduit(s) 1222 may be implemented in any manner (e.g., by a local area network, a wide area network (e.g., the Internet), and the like, or any combination thereof). Communication conduit(s) 1222 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein (except with regard to casing component 202) generally represent software, firmware, hardware, or any combination thereof. In the case of a software implementation, the module or component represents program code that performs specified tasks when executed on one or more processors. The program code may be stored in one or more computer readable memory devices, as described with reference to FIG. 12. The features of the present disclosure described herein are platform-independent, meaning the techniques can be implemented on a variety of commercial computing platforms having a variety of processors (e.g., desktop, laptop, notebook, tablet computer, personal digital assistant (PDA), mobile telephone, smart telephone, gaming console, and the like).

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents. Various configurations of medium 102, grooved character(s) 104/304, protruding element(s) 108, casing component 202, insertion device 206, and/or secondary medium 302, as well as any other portion(s) or component(s) of handwriting learning apparatus 100, including the various indicator devices, sensing devices, computer processors, computer components, and/or software modules that may be used therewith may be used without departing from the spirit and scope of the present disclosure. Additionally, those skilled in the relevant art(s) will appreciate that additional methods of use and/or alternative orders of the exemplary methods given may be engaged in using handwriting learning apparatus 100; thus, the present disclosure should not be limited to the examples given herein. Furthermore, although various shapes, sizes, proportions, and configurations for the various portions and components of handwriting learning apparatus 100 have been given for exemplary purposes, it will be apparent to those skilled in the relevant art(s) that those may also be adjusted without departing from the sprit and scope of the present disclosure.

In addition, it should be understood that the figures in the attachments, which highlight the structure, methodology, functionality, and advantages of the present disclosure, are presented for example purposes only. The present disclosure is sufficiently flexible and configurable, such that it may be implemented in ways other than that shown in the accompanying figures (e.g., implementation within configurations and methods other than those mentioned herein). As will be appreciated by those skilled in the relevant art(s) after reading the description herein, certain features from different aspects of the apparatuses and methods of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A handwriting learning apparatus configured to facilitate at least one user learning a correct technique for forming at least one segment of at least one character by hand, wherein the handwriting learning apparatus comprises:
   at least one insertion device;
   at least one substantially planar at least partially rigid medium, wherein the at least one medium comprises:
      at least one groove that defines the shape of at least one segment of at least one character, wherein the at least one groove extends through the medium to form opposing inner lateral side surfaces and comprises a width between the opposing inner lateral side surfaces; and
   at least one protruding element extending outwardly from at least one portion of at least one of the opposing inner lateral side surfaces of the at least one groove, wherein the at least one insertion device is configured to be at least partially removably received by the at least one groove, wherein the at least one protruding element is at least partially flexible to allow sliding of the insertion device in a first direction within the at least one groove and prevent sliding of the insertion device in in a second direction within the at least one groove, and wherein the second direction is the opposite of the first direction.

2. The handwriting learning apparatus of claim 1, wherein the at least one insertion device comprises on elongated shape with at least one distal end;
   wherein the at least one distal end of the at least one insertion device is configured to be removably received by the at least one groove;
   wherein the at least one distal end of the at least one insertion device is further configured to be slidable within the at least one groove between a groove start location and a groove end location;
   wherein the at least one distal end of the at least one insertion device comprises a width that is substantially similar to the width of the at least one groove; and
   wherein the at least one protruding element allows the at least one distal end of the at least one insertion device to temporarily at least partially displace at least one portion of the at least one protruding element as the at least one distal end of the at least one insertion device slidably moves by and physically contacts the at least one portion of the at least one protruding element.

3. The handwriting learning apparatus of claim 2, wherein the at least one protruding element is configured at an angle relative to the at least one portion of the at least one of the opposing inner lateral side surfaces of the at least one groove; and
   wherein the angle of the at least one protruding element is configured to allow the at least one distal end of the at least one insertion device to slide in only a single direction within the at least one groove.

4. The handwriting learning apparatus of claim 2, further comprising at least one sensing device; and
   wherein the at least one sensing device is communicatively coupled to at least one of: at least one portion of the at least one groove, the at least one portion of the at least one protruding element, at least one portion of the at least one medium, at least one portion of the at least one insertion device, at least one computer processor, at least one computer component, and at least one software module.

5. The handwriting learning apparatus of claim 4, wherein the at least one portion of the at least one groove comprises at least one of: the groove start location and the groove end location.

6. The handwriting learning apparatus of claim 5, further comprising at least one indicator device communicatively coupled to the at least one sensing device; and
   wherein the at least one indicator device is configured to present at least one output to the at least one user in order to communicate at least one of: the at least one sensing device detecting that the at least one groove has been traced correctly via the at least one insertion device from the groove start location to the groove end location, the at least one sensing device detecting that the at least one groove has not been traced correctly via the at least one insertion device from the groove start location to the groove end location, the at least one sensing device detecting that the at least one groove is being traced correctly via the at least one insertion device from the groove start location to the groove end location, the at least one sensing device detecting that the at least one groove is not being traced correctly via the at least one insertion device from the groove start location to the groove end location, and an indication to the at least one user as to which at least one groove is to be traced next via the at least one insertion device.

7. The handwriting learning apparatus of claim 6, wherein the at least one indicator device comprises at least one of: a lighting element, an audio emitting device, and a sensory device and the at least one sensing device comprises at least one of: a motion detector, a pressure sensor, a proximity sensor, a position sensor, an accelerometer, a tilt sensor, a tactile sensor, a force gauge, a force sensor, a tribometer, a microwave sensor, an acoustic sensor, and an infrared sensor.

8. The handwriting learning apparatus of claim 6, wherein the at least one output presented by the at least one indicator device comprises at least one of: at least one visual output, at least one audio output, and at least one tactile output.

9. The handwriting learning apparatus of claim 8, wherein the at least one visual output comprises at least one of: at least one lighting element illumination and at least one animation;
wherein the at least one audio output comprises at least one of: at least one chime, at least one ring, at least one beep, at least one buzzer, and at least one phrase; and
wherein the at least one tactile output comprises at least one of: at least one short vibration, at least one long vibration, at least one soft vibration, at least one hard vibration, and at least one pulsation.

10. The handwriting learning apparatus of claim 2, wherein the at least one protruding element includes a plurality of protruding elements.

11. The handwriting learning apparatus of claim 10, wherein the plurality of protruding elements extend from at least one of the opposing inner lateral side surfaces of the at least one groove at an angle between 30 and 60 degrees.

12. The handwriting learning apparatus of claim 10, wherein the plurality of protruding elements extend from at least one of the opposing inner lateral side surfaces of the at least one groove at an angle between 60 and 90 degrees.

13. The handwriting learning apparatus of claim 1, wherein the at least one medium comprises a plurality of grooves that define the shapes of a plurality of segments of a plurality of characters.

14. The handwriting learning apparatus of claim 1, wherein the at least one character comprises at least one of: a lowercase letter of the English alphabet, an uppercase letter of the English alphabet, a punctuation mark, a number, a symbol, a hieroglyph, a shape, a character of a foreign language, an uppercase letter of a foreign language, and a lowercase letter of a foreign language.

15. The handwriting learning apparatus of claim 1, further comprising at least one braille symbol that corresponds to each at least one character.

16. The handwriting learning apparatus of claim 1, wherein the at least one medium is configured to be received by a top surface portion of at least one supplementary device.

17. The handwriting learning apparatus of claim 16, wherein the at least one supplementary device comprises at least one of: a dry-erase board, a chalkboard, an interactive whiteboard, an interactive touchscreen monitor, a tablet computer, a smartphone, and a piece of paper; and
wherein the at least one insertion device comprises at least one of: a pen, a pencil, a marker, a digital stylus, a colored pencil, a crayon, a drawing stylus, a piece of chalk, and a dry-erase marker.

18. The handwriting learning apparatus of claim 1, further comprising a second at least one substantially planar at least partially rigid medium;
wherein the second at least one medium comprises a second at least one groove substantially similar to the at least one groove of the at least one medium;
wherein the second at least one medium does not comprise the at least one protruding element; and
wherein the second at least one medium is configured to be removably placed over and received by the at least one medium such that the at least one grooves of the at least one medium and the second at least one medium substantially align.

19. The handwriting learning apparatus of claim 1, further comprising at least one substantially planar at least partially rigid casing component;
wherein the at least one casing component comprises at least one recessed area configured to removably receive at least one portion of the at least one medium; and
wherein the at least one casing component is configured to physically contact at least one distal end of the at least one insertion device as it is removably received by and slidably moves within at least one portion of the at least one groove.

20. The handwriting learning apparatus of claim 1, wherein the at least one medium is configured to be received by a top surface portion of a touchscreen device, and wherein the at least one insertion device is configured to be at least partially removably received by the at least one groove into physical contact with the top surface portion of the touchscreen device.

* * * * *